United States Patent
LaChapelle et al.

(10) Patent No.: US 12,481,031 B2
(45) Date of Patent: Nov. 25, 2025

(54) HYBRID PULSED/COHERENT LIDAR SYSTEM WITH SPECTRAL SIGNATURES

(71) Applicant: Luminar Technologies, Inc., Orlando, FL (US)

(72) Inventors: Joseph G. LaChapelle, Philomath, OR (US); Jason M. Eichenholz, Orlando, FL (US); Alex Michael Sincore, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 874 days.

(21) Appl. No.: 17/689,223

(22) Filed: Mar. 8, 2022

(65) Prior Publication Data

US 2022/0291349 A1 Sep. 15, 2022

Related U.S. Application Data

(60) Provisional application No. 63/159,095, filed on Mar. 10, 2021.

(51) Int. Cl.
*G01S 7/481* (2006.01)
*G01S 7/486* (2020.01)
(Continued)

(52) U.S. Cl.
CPC .......... *G01S 7/4816* (2013.01); *G01S 7/4865* (2013.01); *G01S 7/4868* (2013.01); *G01S 7/489* (2013.01);
(Continued)

(58) Field of Classification Search
CPC .. H01S 3/0085; H01S 3/06754; H01S 3/2375; H01S 5/005; H01S 5/0085;
(Continued)

(56) References Cited

U.S. PATENT DOCUMENTS 10,802,120 B1   10/2020   LaChapelle et al.
2001/0009458 A1  7/2001   Asaka et al.
(Continued)

FOREIGN PATENT DOCUMENTS

WO   2022/035537   2/2022

OTHER PUBLICATIONS

International Search Report and Written Opinion for PCT/US2022/019268 dated Aug. 4, 2022.
(Continued)

*Primary Examiner* — Md M Rahman
(74) *Attorney, Agent, or Firm* — Van Pelt, Yi & James LLP

(57) ABSTRACT

In one embodiment, a lidar system includes a light source configured to emit (i) local-oscillator light and (ii) pulses of light. Additionally, the light source is configured to impart a spectral signature of one or more different spectral signatures to each of the emitted pulses of light, where the emitted pulses of light include an emitted pulse of light having a particular spectral signature of the one or more different spectral signatures. The lidar system also includes a receiver configured to detect the local-oscillator light and a received pulse of light, the received pulse of light including a portion of the emitted pulse of light scattered by a target located a distance from the lidar system. The receiver includes a detector configured to produce a photocurrent signal corresponding to the local-oscillator light and the received pulse of light. The receiver also includes a pulse-detection circuit and a frequency-detection circuit.

39 Claims, 32 Drawing Sheets

(51) Int. Cl.
*G01S 7/4865* (2020.01)
*G01S 7/489* (2006.01)
*G01S 17/10* (2020.01)
*G01S 17/894* (2020.01)
*G01S 17/931* (2020.01)

(52) U.S. Cl.
CPC ............ *G01S 17/10* (2013.01); *G01S 17/894* (2020.01); *G01S 17/931* (2020.01)

(58) Field of Classification Search
CPC .. H01S 5/0265; H01S 5/06216; H01S 5/1014; H01S 5/50; G01S 17/32; G01S 7/4818; G01S 17/89; G01S 7/4817; G01S 7/4917
USPC ........................................................ 356/4.01
See application file for complete search history.

(56) References Cited

U.S. PATENT DOCUMENTS

| | | | |
|---|---|---|---|
| 2002/0071109 A1 | 6/2002 | Allen et al. |
| 2006/0227317 A1 | 10/2006 | Henderson et al. |
| 2007/0024842 A1 | 2/2007 | Nishizawa et al. |
| 2010/0128744 A1 | 5/2010 | Deladurantaye |
| 2015/0230978 A1 | 8/2015 | Vogler |
| 2016/0291135 A1 | 10/2016 | Ando |
| 2017/0155225 A1 | 6/2017 | Villeneuve |
| 2018/0180739 A1 | 6/2018 | Droz |
| 2019/0107606 A1 | 4/2019 | Russell |
| 2019/0154816 A1 | 5/2019 | Hughes |
| 2019/0221988 A1 | 7/2019 | Villeneuve |
| 2019/0346568 A1 | 11/2019 | Feng |
| 2020/0003900 A1 | 1/2020 | Stochino |
| 2020/0168649 A1 | 5/2020 | Ingelberts |
| 2020/0252133 A1 | 8/2020 | Hong |
| 2020/0295529 A1 | 9/2020 | Ooi |
| 2022/0209493 A1 | 6/2022 | Wang |

OTHER PUBLICATIONS

Author Unknown, Optical heterodyne detection, Wikipedia, The Wayback Machine, Apr. 26, 2020, 8 pages, https://web.archive.org/web/20200618185753/https://en.wikipedia.org/wiki/Optical_heterodyne_detection.

Rustige et al., A New Concept for Spatially Resolved Coherent Detection with Vertically Illuminated Photodetectors Targeting Ranging Applications, Proc. SPIE vol. 11682, Optical Components and Materials XVIII, Mar. 5, 2021, 7 pages.

HYBRID PULSED/COHERENT LIDAR SYSTEM WITH SPECTRAL SIGNATURES

REFERENCE TO RELATED APPLICATIONS

This application claims the benefit of U.S. Provisional Patent Application No. 63/159,095, filed 10 Mar. 2021, which is incorporated by reference herein in its entirety.

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

DESCRIPTION OF EXAMPLE EMBODIMENTS

Figure 1:
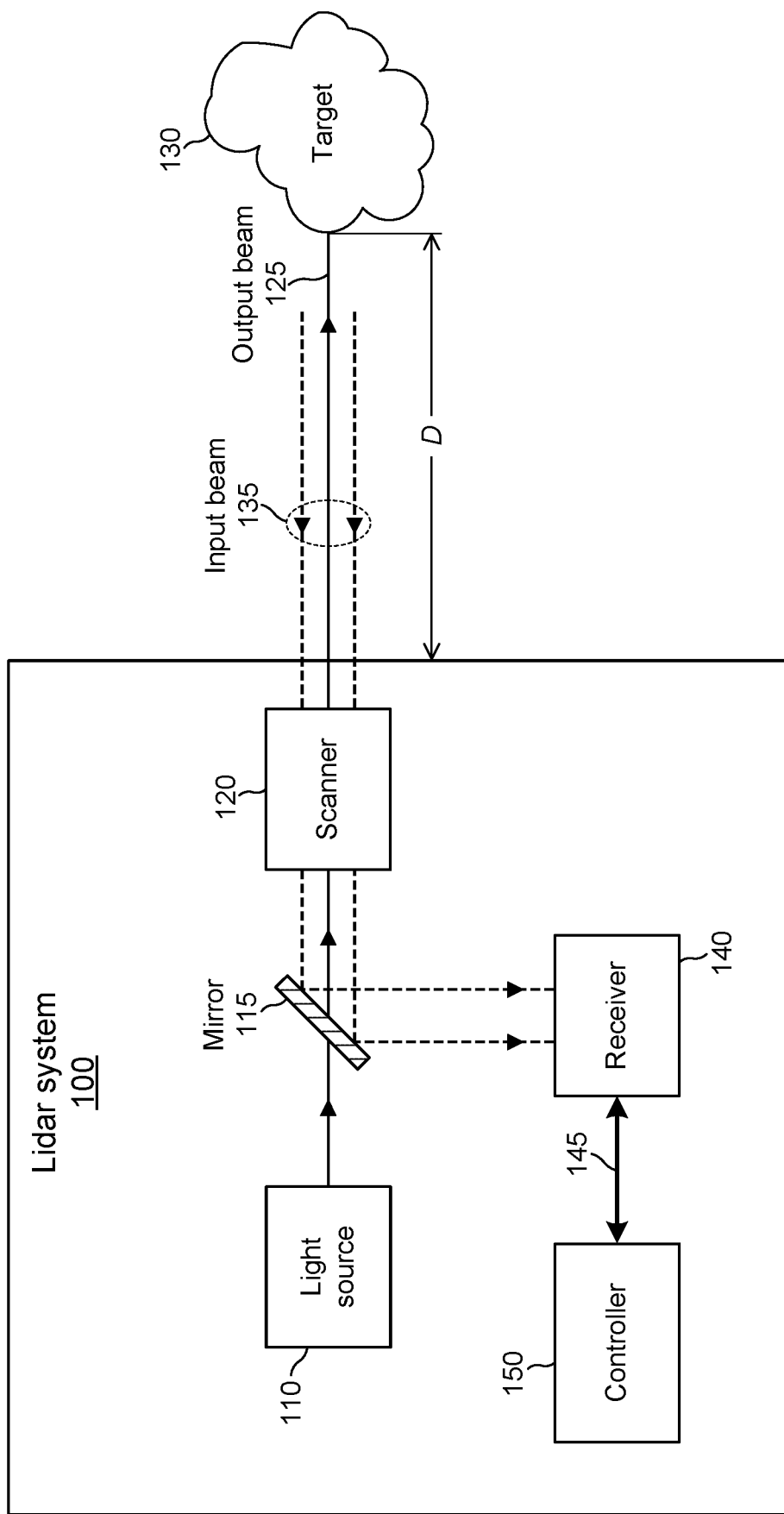
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150 (which may be referred to as a processor). The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (µJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may include or may be referred to as an optical signal, output optical signal, emitted optical signal, output light, emitted pulse of light, laser beam, light beam, optical beam, emitted beam, emitted light, or beam. In particular embodiments, input beam 135 may include or may be referred to as a received optical signal, received pulse of light, input pulse of light, input optical signal, return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of $\Delta T$ (e.g., $\Delta T$ represents a round-trip time of flight for an emitted pulse of light to travel from the lidar system 100 to the target 130 and back to the lidar system 100), then the distance D from the target 130 to the lidar system 100 may be expressed as $D=c \cdot \Delta T/2$, where c is the speed of light (approximately $3.0 \times 10^8$ m/s). As an example, if a time of flight is measured to be $\Delta T=300$ ns, then the distance from the target 130 to the lidar system 100 may be determined to be approximately D=45.0 m. As another example, if a time of flight is measured to be $\Delta T=1.33$ µs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration ($\Delta\tau$) of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 80 kHz to 10 MHz or a pulse period (e.g., a time between consecutive pulses) of approximately 100 ns to 12.5 µs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 µs. As another example, light source 110 may have a pulse repetition frequency (which may be referred to as a repetition rate) that can be varied from approximately 200 kHz to 3 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 µJ, 0.1 µJ, 0.5 µJ, 1 µJ, 2 µJ, 10 µJ, 100 µJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E=P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 µJ has a peak power of approximately 1 kW. The average power ($P_{av}$) of an output beam 125 can be related to the pulse repetition frequency (PRF) and pulse energy by the expression $P_{av}$=PRF·E. For example, if the pulse repetition frequency is 500 kHz, then the average power of an output beam 125 with 1-μJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm. As another example, light source 110 may include a laser diode that emits light at a wavelength between 1500 nm and 1510 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-power optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a semiconductor optical amplifier (SOA). The SOA may include an active optical waveguide configured to receive light from the seed laser diode and amplify the light as it propagates through the waveguide. The optical gain of the SOA may be provided by pulsed or direct-current (DC) electrical current supplied to the SOA. The SOA may be integrated on the same chip as the seed laser diode, or the SOA may be a separate device with an anti-reflection coating on its input facet or output facet. As another example, light source 110 may include a seed laser diode followed by a SOA, which in turn is followed by a fiber-optic amplifier. For example, the seed laser diode may produce relatively low-power seed pulses which are amplified by the SOA, and the fiber-optic amplifier may further amplify the optical pulses.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., band-pass or interference filters), beam splitters, polarizers, polarizing beam splitters, wave plates (e.g., half-wave or quarter-wave plates), diffractive elements, holographic elements, isolators, optical splitters, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a 0-degree rotation by a scanning mirror results in a 20-degree angular scan of output beam 125).

In particular embodiments, a scanning mirror (which may be referred to as a scan mirror) may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 1° to 30° angular range. As another example, a scanner 120 may include a scanning mirror that is attached to or is part of a MEMS device configured to scan over a 1° to 30° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is different from the first direction (e.g., the first and second directions may be approximately orthogonal to one another, or the second direction may be oriented at any suitable non-zero angle with respect to the first direction). As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, InGaAs, InAsSb (indium arsenide antimonide), AlAsSb (aluminum arsenide antimonide), or AlInAsSb (aluminum indium arsenide antimonide). The active region may refer to an area over which a detector may receive or detect input light. An active region may have any suitable size or diameter, such as for example, a diameter of approximately 10 µm, 25 µm, 50 µm, 80 µm, 100 µm, 200 µm, 500 µm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100 or outside the lidar system 100. In particular embodiments, a controller 150 may include any suitable arrangement or combination of logic circuitry, analog circuitry, or digital circuitry.

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating distance ($D_{OP}$) of the lidar system 100. In particular embodiments, an operating distance (which may be referred to as an operating range) of a lidar system 100 may refer to a distance over which the lidar system 100 is configured to sense or identify targets 130 located within a field of regard of the lidar system 100. The operating distance of lidar system 100 may be any suitable distance, such as for example, 25 m, 50 m, 100 m, 200 m, 250 m, 500 m, or 1 km. As an example, a lidar system 100 with a 200-m operating distance may be configured to sense or identify various targets 130 located up to 200 m away from the lidar system 100. The operating distance $D_{OP}$ of a lidar system 100 may be related to the time T between the emission of successive optical signals by the expression $D_{OP}=c \cdot \tau/2$. For a lidar system 100 with a 200-m operating distance ($D_{OP}$=200 m), the time T between successive pulses (which may be referred to as a pulse period, a pulse repetition interval (PRI), or a time period between pulses) is approximately 2 $D_{OP}/c \approx 1.33$ μs. The pulse period τ may also correspond to the time of flight for a pulse to travel to and from a target 130 located a distance $D_{OP}$ from the lidar system 100. Additionally, the pulse period τ may be related to the pulse repetition frequency (PRF) by the expression τ=1/PRF. For example, a pulse period of 1.33 μs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1:2014 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm. As another example, lidar system 100 may have an operating wavelength between approximately 1500 nm and approximately 1510 nm.

In particular embodiments, one or more lidar systems 100 may be integrated into a vehicle. As an example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information (e.g., about the surrounding environment) or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., brakes, accelerator, steering mechanism, lights, or turn signals). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, an emitted optical signal, or emitted light) may include pulses of light, CW light, amplitude-modulated light, frequency-modulated (FM) light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may be a pulsed lidar system and may include a light source 110 configured to produce pulses of light. Alternatively, a lidar system 100 may be configured to operate as a frequency-modulated continuous-wave (FMCW) lidar system and may include a light source 110 configured to produce CW light or a frequency-modulated optical signal.

In particular embodiments, a lidar system 100 may be a FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined based on the round-trip time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a frequency of received light (which includes emitted light scattered by the remote target) relative to a frequency of local-oscillator (LO) light. A round-trip time for the emitted light to travel to a target 130 and back to the lidar system may correspond to a frequency difference between the received scattered light and the LO light. A larger frequency difference may correspond to a longer round-trip time and a greater distance to the target 130. The frequency difference between the received scattered light and the LO light may be referred to as a beat frequency.

For example, for a linearly chirped light source (e.g., a frequency modulation that produces a linear change in frequency with time), the larger the frequency difference between the LO light and the received light, the farther away the target 130 is located. The frequency difference may be determined by mixing the received light with the LO light (e.g., by coupling the two beams onto a detector so that they are coherently mixed or combined together, or by mixing analog electric signals corresponding to the received light and the emitted light) to produce a beat signal and determining the beat frequency of the beat signal. For example, an electrical signal from an APD may be analyzed using a fast Fourier transform (FFT) technique to determine the frequency difference between the emitted light and the received light. If a linear frequency modulation m (e.g., in units of Hz/s) is applied to a CW laser, then the round-trip time $\Delta T$ may be related to the frequency difference between the received scattered light and the emitted light $\Delta \Phi$ by the expression $\Delta T = \Delta \Phi / m$. Additionally, the distance D from the target 130 to the lidar system 100 may be expressed as $D = c \cdot \Delta \Phi / (2m)$, where c is the speed of light. For example, for a light source 110 with a linear frequency modulation of $10^{12}$ Hz/s (or, 1 MHz/µs), if a frequency difference (between the received scattered light and the emitted light) of 330 kHz is measured, then the distance to the target is approximately 50 meters (which corresponds to a round-trip time of approximately 330 ns). As another example, a frequency difference of 1.33 MHz corresponds to a target located approximately 200 meters away.

A light source 110 for a FMCW lidar system may include (i) a direct-emitter laser diode, (ii) a seed laser diode followed by a SOA, (iii) a seed laser diode followed by a fiber-optic amplifier, or (iv) a seed laser diode followed by a SOA and then a fiber-optic amplifier. A seed laser diode or a direct-emitter laser diode may be operated in a CW manner (e.g., by driving the laser diode with a substantially constant DC current), and a frequency modulation may be provided by an external modulator (e.g., an electro-optic phase modulator may apply a frequency modulation to seed-laser light). Alternatively, a frequency modulation may be produced by applying a current modulation to a seed laser diode or a direct-emitter laser diode. The current modulation (which may be provided along with a DC bias current) may produce a corresponding refractive-index modulation in the laser diode, which results in a frequency modulation of the light emitted by the laser diode. The current-modulation component (and the corresponding frequency modulation) may have any suitable frequency or shape (e.g., piecewise linear, sinusoidal, triangle-wave, or sawtooth). For example, the current-modulation component (and the resulting frequency modulation of the emitted light) may increase or decrease monotonically over a particular time interval. As another example, the current-modulation component may include a triangle or sawtooth wave with an electrical current that increases or decreases linearly over a particular time interval, and the light emitted by the laser diode may include a corresponding frequency modulation in which the optical frequency increases or decreases approximately linearly over the particular time interval. For example, a light source 110 that emits light with a linear frequency change of 200 MHz over a 2-µs time interval may be referred to as having a frequency modulation m of $10^{14}$ Hz/s (or, 100 MHz/µs).

Figure 2:
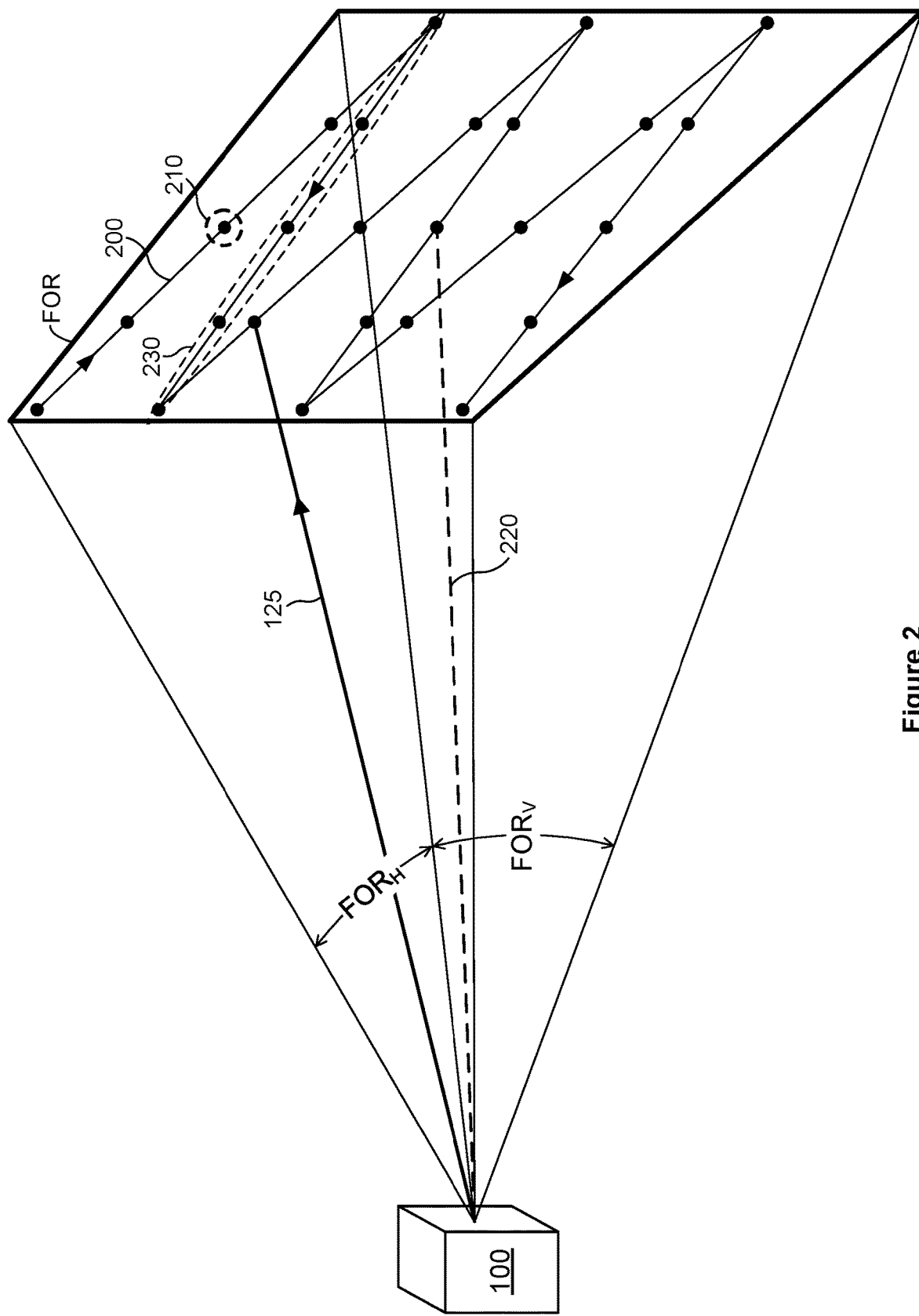
FIG. 2 illustrates an example scan pattern produced by a lidar system.

FIG. 2 illustrates an example scan pattern 200 produced by a lidar system 100. A scanner 120 of the lidar system 100 may scan the output beam 125 (which may include multiple emitted optical signals) along a scan pattern 200 that is contained within a FOR of the lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a non-zero horizontal angle or a non-zero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, a pixel 210 may refer to a data element that includes (i) distance information (e.g., a distance from a lidar system 100 to a target 130 from which an associated pulse of light was scattered) or (ii) an elevation angle and an azimuth angle associated with the pixel (e.g., the elevation and azimuth angles along which the associated pulse of light was emitted). Each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100.

A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
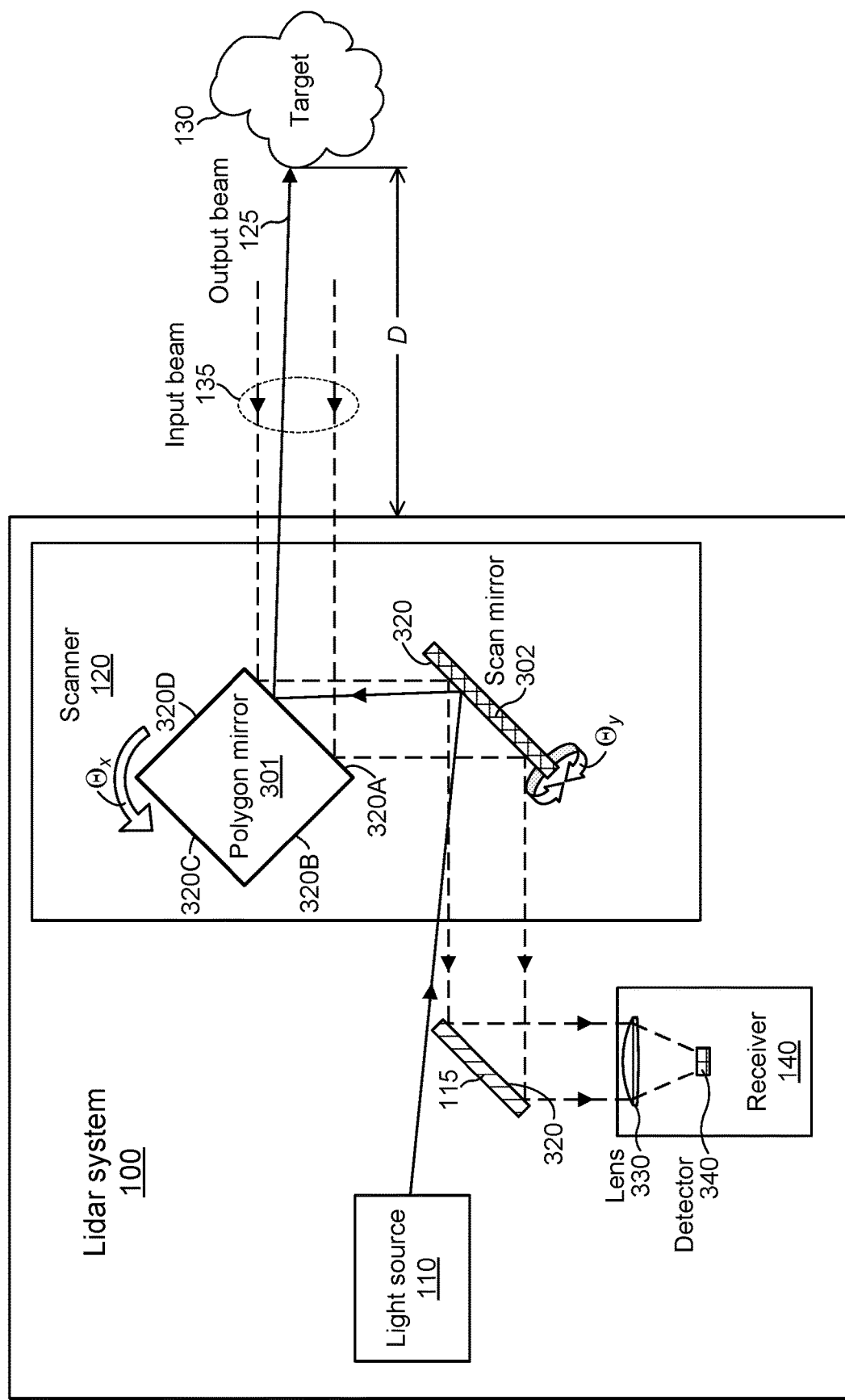
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a first direction and a scanning mirror 302 configured to scan output beam 125 along a second direction different from the first direction (e.g., the first and second directions may be approximately orthogonal to one another, or the second direction may be oriented at any suitable non-zero angle with respect to the first direction). In the example of FIG. 3, scanner 120 includes two scanning mirrors: (1) a polygon mirror 301 that rotates along the $\Theta_x$ direction and (2) a scanning mirror 302 that oscillates back and forth along the $\Theta_y$ direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. The detector 340 may be a PN photodiode, a PIN photodiode, an APD, a SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a $\Theta_x$ direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 320 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 320, and then the output beam 125 is directed to the polygon mirror 301, where it is reflected by reflective surface 320A.

Figure 4:
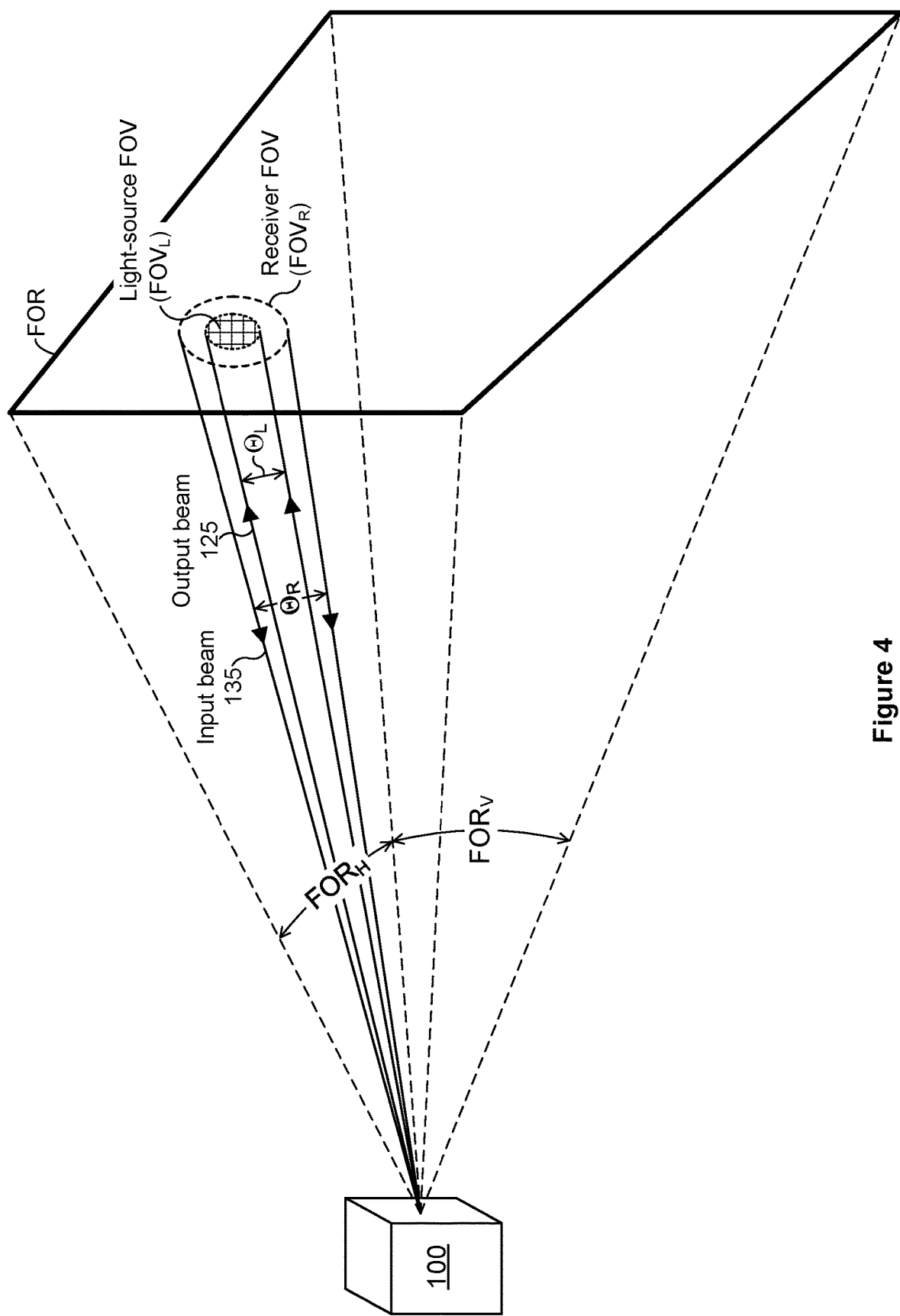
FIG. 4 illustrates an example light-source field of view ($FOV_L$) and receiver field of view ($FOV_R$) for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent OR that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent OR, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
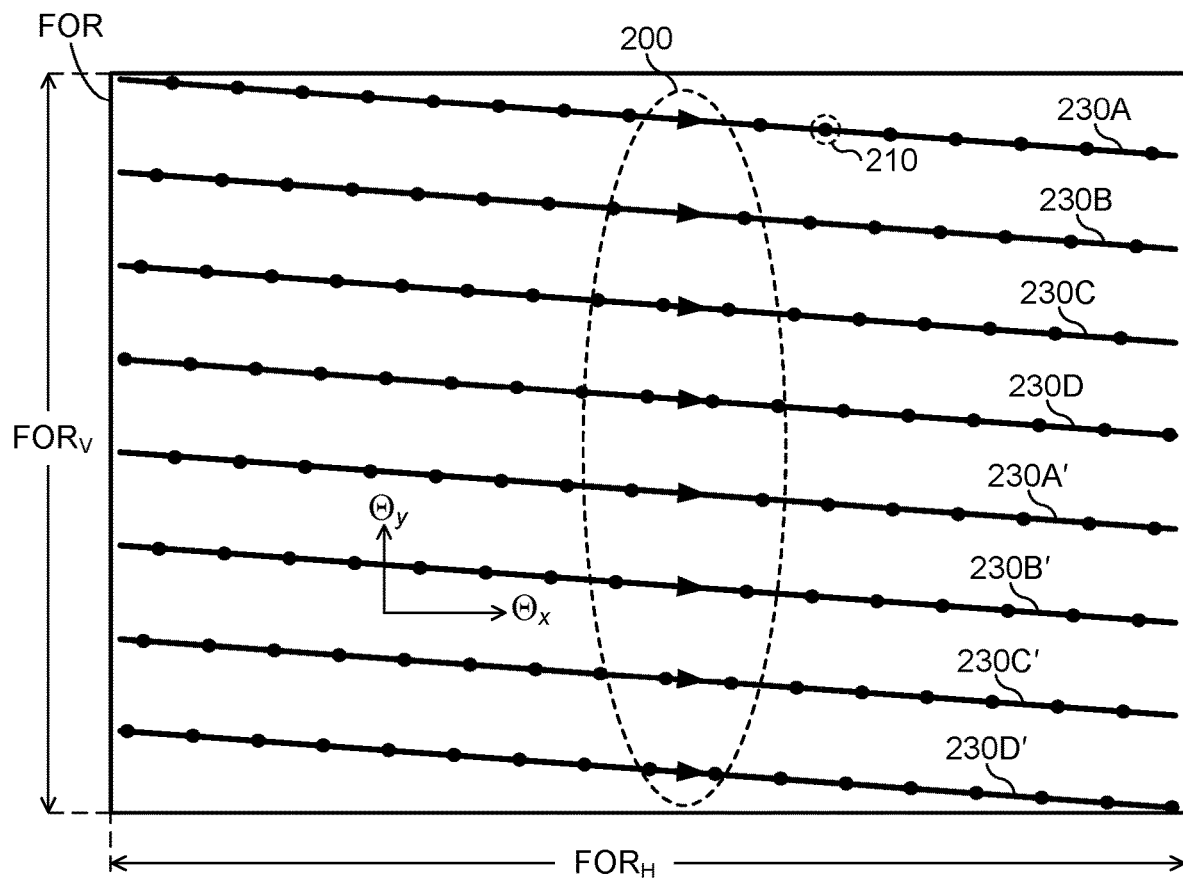
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 2 may be referred to as a bidirectional scan pattern, and the scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of a N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 5.

Figure 6:
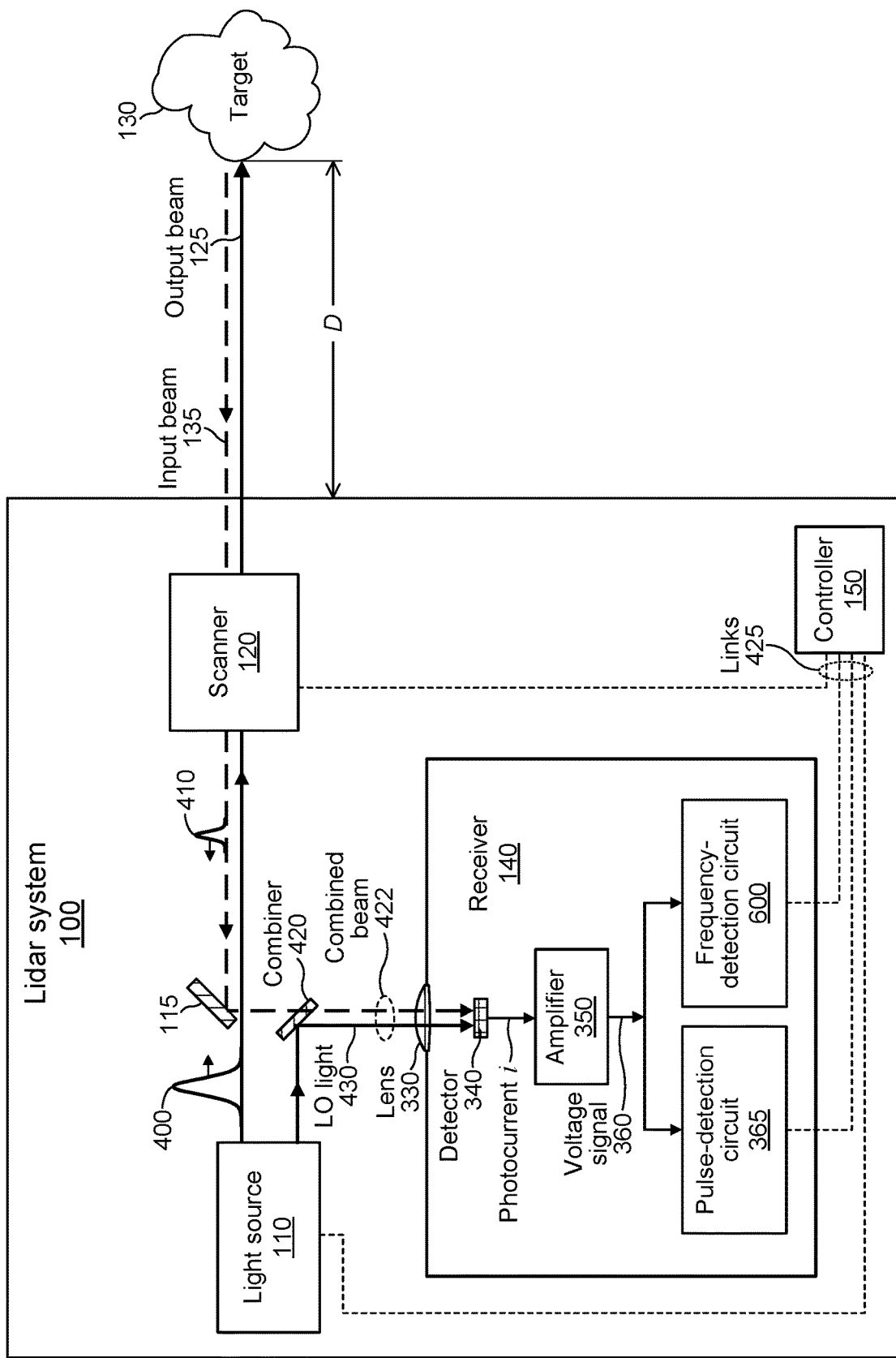
FIG. 6 illustrates an example lidar system with a light source that emits pulses of light and local-oscillator (LO) light.

FIG. 6 illustrates an example lidar system 100 with a light source 110 that emits pulses of light 400 and local-oscillator (LO) light 430. The lidar system 100 in FIG. 6 includes a light source 110, a scanner 120, a receiver 140, and a controller 150 (which may be referred to as a processor). The receiver 140 includes a detector 340, an amplifier 350, a pulse-detection circuit 365, and a frequency-detection circuit 600. The lidar system 100 illustrated in FIG. 6 may be referred to as a hybrid pulsed/coherent lidar system in which the light source 110 emits LO light 430 and pulses of light 400, where each emitted pulse of light 400 is coherent with a corresponding portion of the LO light 430. Additionally, the receiver 140 in a hybrid pulsed/coherent lidar system may be configured to detect the LO light 430 and a received pulse of light 410, where the LO light 430 and the received pulse of light 410 (which includes scattered light from one of the emitted pulses of light 400) are coherently mixed together at the receiver 140. The LO light 430 may be referred to as a local-oscillator optical signal or a LO optical signal.

In particular embodiments, a hybrid pulsed/coherent lidar system 100 may include a light source 110 configured to emit pulses of light 400 and LO light 430. The emitted pulses of light 400 may be part of an output beam 125 that is scanned by a scanner 120 across a field of regard of the lidar system 100, and the LO light 430 may be sent to a receiver 140 of the lidar system 100. The light source 110 may include a seed laser that produces seed light 440 and the LO light 430. Additionally, the light source 110 may include an optical amplifier that amplifies the seed light to produce the emitted pulses of light 400. For example, the optical amplifier may be a pulsed optical amplifier that amplifies temporal portions of the seed light to produce the emitted pulses of light 400, where each amplified temporal portion of the seed light corresponds to one of the emitted pulses of light 400. The pulses of light 400 emitted by the light source 110 may have one or more of the following optical characteristics: a wavelength between 900 nm and 2000 nm; a pulse energy between 0.01 µJ and 100 µJ; a pulse repetition frequency between 80 kHz and 10 MHz; and a pulse duration between 0.1 ns and 100 ns. For example, the light source 110 may emit pulses of light 400 with a wavelength of approximately 1550 nm, a pulse energy of approximately 0.50 per pulse, a pulse repetition frequency of approximately 750 kHz, and a pulse duration of approximately 3 ns. As another example, the light source 110 may emit pulses of light with a wavelength from approximately 1500 nm to approximately 1510 nm.

In particular embodiments, a hybrid pulsed/coherent lidar system 100 may include a scanner 120 configured to scan an output beam 125 (which includes emitted pulses of light 400) across a field of regard of the lidar system 100. The scanner 120 may receive the output beam 125 from a light source 110, and the scanner 120 may include one or more scanning mirrors configured to scan the output beam 125. In addition to scanning the output beam 125, the scanner may also scan a FOV of the detector 340 across the field of regard so that the output beam 125 (which corresponds to the light-source FOV) and the detector FOV are scanned synchronously, where the scanning speeds of the light-source FOV and the detector FOV are equal. Additionally, the light-source FOV and the detector FOV may have the same relative position to one another as they are scanned across the field of regard (e.g., the light-source FOV and the detector FOV may be fully or partially overlapped, and the amount of overlap may remain approximately fixed as they are scanned). Alternatively, the lidar system 100 may be configured so that only the output beam 125 is scanned, and the detector has a static FOV that is not scanned. In this case, the input beam 135 (which includes received pulses of light 410) may bypass the scanner 120 and be directed to the receiver 140 without passing through the scanner 120.

In particular embodiments, a hybrid pulsed/coherent lidar system 100 may include an optical combiner 420 configured to optically combine LO light 430 with a received pulse of light 410. The optical combiner 420 in FIG. 6 may be a free-space optical beam combiner that reflects at least part of the LO light 430 and transmits at least part of the input beam 135 so that the LO light 430 and the input beam 135 are spatially overlapped and propagate substantially coaxially along the same path to the detector 340. As another example, the combiner 420 in FIG. 6 may be a mirror that reflects the LO light 430 and directs it to the detector 340, where it is combined with the input beam 135. As another example, a combiner 420 may include an integrated-optic component or a fiber-optic component that spatially overlaps the LO light 430 and the input beam 135 so that the LO light 430 and the input beam 135 propagate together in a waveguide or in a core of an optical fiber.

In particular embodiments, a hybrid pulsed/coherent lidar system 100 may include a receiver 140 that detects LO light 430 and received pulses of light 410. A received pulse of light 410 may include light from one of the emitted pulses of light 400 that is scattered by a target 130 located a distance from the lidar system 100. The receiver 140 may include one or more detectors 340, and the LO light 430 and a received pulse of light 410 may be coherently mixed together at one or more of the detectors 340. One or more of the detectors 340 may produce photocurrent signals that correspond to the coherent mixing of the LO light 430 and the received pulse of light 410. The lidar system 100 in FIG. 6 includes a receiver 140 with one detector 340 that receives the LO light 430 and the pulse of light 410, which are coherently mixed together at the detector 340. In response to the coherent mixing of the received LO light 430 and pulse of light 410, the detector 340 produces a photocurrent signal i that is amplified by an electronic amplifier 350.

In particular embodiments, a receiver 140 may include a pulse-detection circuit 365 that determines a time-of-arrival for a received pulse of light 410. The time-of-arrival for a received pulse of light 410 may correspond to a time associated with a rising edge, falling edge, peak, or temporal center of the received pulse of light 410. The time-of-arrival may be determined based at least in part on a photocurrent signal i produced by a detector 340 of the receiver 140. For example, a photocurrent signal i may include a pulse of current corresponding to the received pulse of light 410, and the electronic amplifier 350 may produce a voltage signal 360 with a voltage pulse that corresponds to the pulse of current. The pulse-detection circuit 365 (or a controller 150 coupled to the pulse-detection circuit) may determine the time-of-arrival for the received pulse of light 410 based on a characteristic of the voltage pulse (e.g., based on a time associated with a rising edge, falling edge, peak, or temporal center of the voltage pulse). For example, the pulse-detection circuit 365 may receive an electronic trigger signal (e.g., from the light source 110 or the controller 150) when a pulse of light 400 is emitted, and the pulse-detection circuit 365 may determine the time-of-arrival for the received pulse of light 410 based on a time associated with an edge, peak, or temporal center of the voltage signal 360. The time-of-arrival may be determined based on a difference between a time when the pulse 400 is emitted and a time when the received pulse 410 is detected.

In particular embodiments, a hybrid pulsed/coherent lidar system 100 may include a processor (e.g., controller 150) that determines the distance to a target 130 based at least in part on a time-of-arrival for a received pulse of light 410. The time-of-arrival for the received pulse of light 410 may correspond to a round-trip time ($\Delta T$) for at least a portion of an emitted pulse of light 400 to travel to the target 130 and back to the lidar system 100, where the portion of the emitted pulse of light 400 that travels back to the target 130 corresponds to the received pulse of light 410. The distance D to the target 130 may be determined from the expression $D=c \cdot \Delta T/2$. For example, if the pulse-detection circuit 365 determines that the time $\Delta T$ between emission of optical pulse 400 and receipt of optical pulse 410 is 1 µs, then the controller 150 may determine that the distance to the target 130 is approximately 150 m. In particular embodiments, a round-trip time may be determined by a receiver 140, by a controller 150, or by a receiver 140 and controller 150 together. For example, a receiver 140 may determine a round-trip time by subtracting a time when a pulse 400 is emitted from a time when a received pulse 410 is detected. As another example, a receiver 140 may determine a time when a pulse 400 is emitted and a time when a received pulse 410 is detected. These values may be sent to a controller 150, and the controller 150 may determine a round-trip time by subtracting the time when the pulse 400 is emitted from the time when the received pulse 410 is detected.

In particular embodiments, a controller 150 of a lidar system 100 may be coupled to one or more components of the lidar system 100 via one or more data links 425. Each link 425 in FIG. 6 represents a data link that couples the controller 150 to another component of the lidar system 100 (e.g., light source 110, scanner 120, receiver 140, pulse-detection circuit 365, or frequency-detection circuit 600). Each data link 425 may include one or more electrical links, one or more wireless links, or one or more optical links, and the data links 425 may be used to send data, signals, or commands to or from the controller 150. For example, the controller 150 may send a command via a link 425 to the light source 110 instructing the light source 110 to emit a pulse of light 400. As another example, the pulse-detection circuit 365 may send a signal via a link 425 to the controller with information about a received pulse of light 410 (e.g., a time-of-arrival for the received pulse of light 410). Additionally, the controller 150 may be coupled via a link (not illustrated in FIG. 6) to a processor of an autonomous-vehicle driving system. The autonomous-vehicle processor may receive point-cloud data from the controller 150 and may make driving decisions based on the received point-cloud data.

Figure 7:
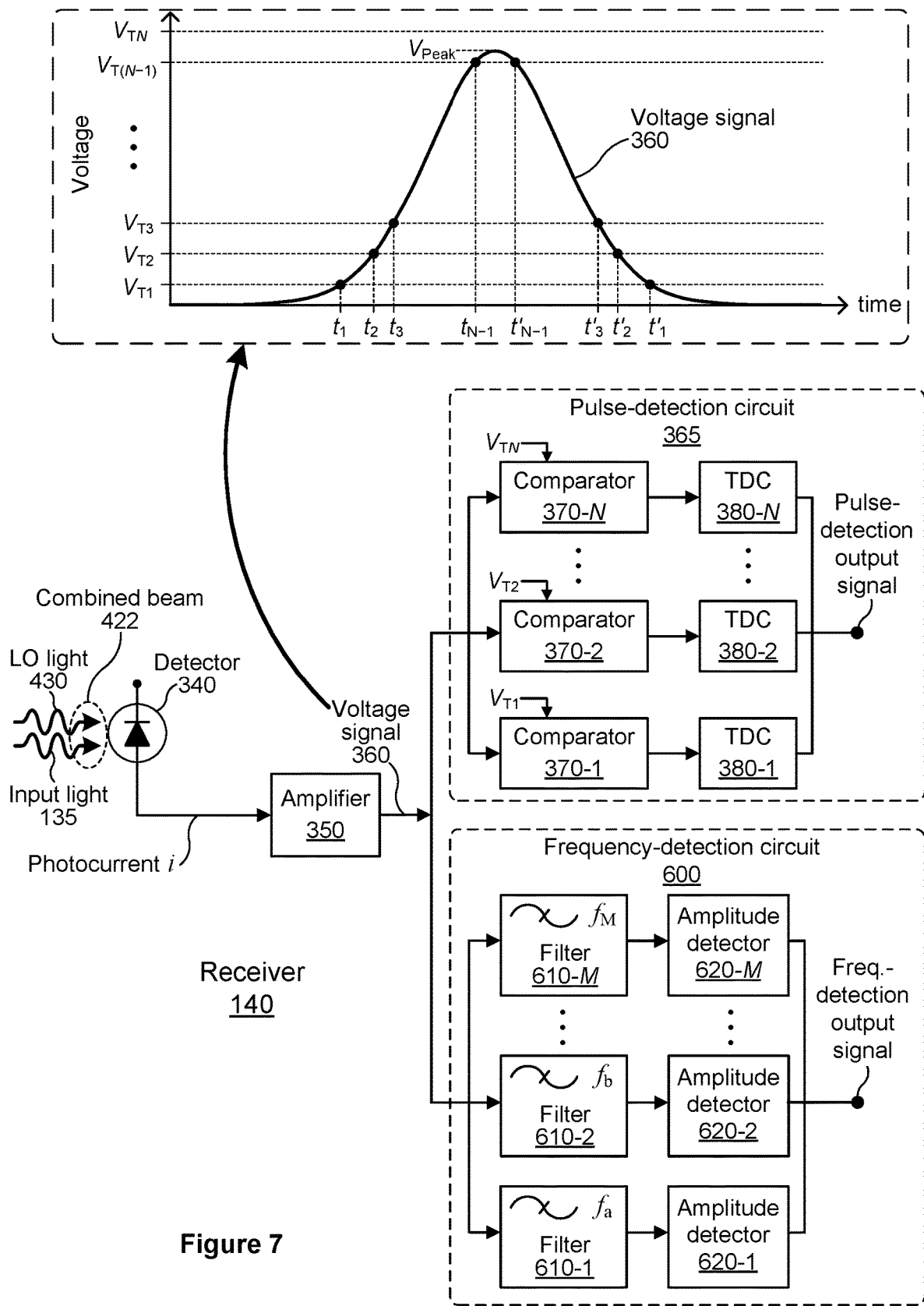
FIG. 7 illustrates an example receiver and an example voltage signal corresponding to a received pulse of light.

FIG. 7 illustrates an example receiver 140 and an example voltage signal 360 corresponding to a received pulse of light 410. A light source 110 of a lidar system 100 may emit a pulse of light 400, and a receiver 140 may be configured to detect a combined beam 422. The combined beam 422 in FIG. 7 includes LO light 430 and input light 135, where the input light 135 includes one or more received pulses of light 410. In particular embodiments, a receiver 140 of a lidar system 100 may include one or more detectors 340, one or more amplifiers 350, one or more pulse-detection circuits 365, or one or more frequency-detection circuits 600. A pulse-detection circuit 365 may include one or more comparators 370 or one or more time-to-digital converters (TDCs) 380. A frequency-detection circuit 600 may include one or more electronic filters 610 or one or more electronic amplitude detectors 620.

The receiver 140 illustrated in FIG. 7 includes a detector 340 configured to receive a combined beam 422 and produce a photocurrent i that corresponds to the coherent mixing of the LO light 430 and a received pulse of light 410 (which is part of the input light 135). The photocurrent i produced by the detector 340 may be referred to as a photocurrent signal or an electrical-current signal. The detector 340 may include an APD, PN photodiode, or PIN photodiode. For example, the detector 340 may include a silicon APD or PIN photodiode configured to detect light at an 800-1100 nm operating wavelength of a lidar system 100, or the detector 340 may include an InGaAs APD or PIN photodiode configured to detect light at a 1200-1600 nm operating wavelength. In FIG. 7, the detector 340 is coupled to an electronic amplifier 350 configured to receive the photocurrent i and produce a voltage signal 360 that corresponds to the received photocurrent. For example, the detector 340 may be an APD that produces a pulse of photocurrent in response to coherent mixing of LO light 430 and a received pulse of light 410, and the voltage signal 360 may be an analog voltage pulse that corresponds to the pulse of photocurrent. The amplifier 350 may include a transimpedance amplifier configured to receive the photocurrent i and amplify the photocurrent to produce a voltage signal that corresponds to the photocurrent signal. Additionally, the amplifier 350 may include a voltage amplifier that amplifies the voltage signal or an electronic filter (e.g., a low-pass or high-pass filter) that filters the photocurrent or the voltage signal.

In FIG. 7, the voltage signal 360 produced by the amplifier 350 is coupled to a pulse-detection circuit 365 and a frequency-detection circuit 600. The pulse-detection circuit 365 includes N comparators (comparators 370-1, 370-2, . . . , 370-N), and each comparator is supplied with a particular threshold or reference voltage ($V_{T1}$, $V_{T2}$, . . . , $V_{TN}$). For example, the pulse-detection circuit 365 may include N=10 comparators, and the threshold voltages may be set to 10 values between 0 volts and 1 volt (e.g., $V_{T1}$=0.1 V, $V_{T2}$=0.2 V, and $V_{T10}$=1.0 V). A comparator may produce an electrical-edge signal (e.g., a rising or falling electrical edge) when the voltage signal 360 rises above or falls below a particular threshold voltage. For example, comparator 370-2 may produce a rising edge when the voltage signal 360 rises above the threshold voltage $V_{T2}$. Additionally or alternatively, comparator 370-2 may produce a falling edge when the voltage signal 360 falls below the threshold voltage $V_{T2}$.

The pulse-detection circuit 365 in FIG. 7 includes N time-to-digital converters (TDCs 380-1, 380-2, . . . , 380-N), and each comparator is coupled to one of the TDCs. Each comparator-TDC pair in FIG. 7 (e.g., comparator 370-1 and TDC 380-1) may be referred to as a threshold detector. A comparator may provide an electrical-edge signal to a corresponding TDC, and the TDC may act as a timer that produces an electrical output signal (e.g., a digital signal, a digital word, or a digital value) that represents a time when the edge signal is received from the comparator. For example, if the voltage signal 360 rises above the threshold voltage $V_{T1}$, then the comparator 370-1 may produce a rising-edge signal that is supplied to the input of TDC 380-1, and the TDC 380-1 may produce a digital time value corresponding to a time when the edge signal was received by TDC 380-1. The digital time value may be referenced to the time when a pulse of light is emitted, and the digital time value may correspond to or may be used to determine a round-trip time for the pulse of light to travel to a target 130 and back to the lidar system 100. Additionally, if the voltage signal 360 subsequently falls below the threshold voltage $V_{T1}$, then the comparator 370-1 may produce a falling-edge signal that is supplied to the input of TDC 380-1, and the TDC 380-1 may produce a digital time value corresponding to a time when the edge signal was received by TDC 380-1.

In particular embodiments, a pulse-detection output signal may be an electrical signal that corresponds to a received pulse of light 410. For example, the pulse-detection output signal in FIG. 7 may be a digital signal that corresponds to the analog voltage signal 360, which in turn corresponds to the photocurrent signal i, which in turn corresponds to a received pulse of light 410. If an input light signal 135 includes a received pulse of light 410, the pulse-detection circuit 365 may receive a voltage signal 360 (corresponding to the photocurrent i) and produce a pulse-detection output signal that corresponds to the received pulse of light 410. The pulse-detection output signal may include one or more digital time values from each of the TDCs 380 that received one or more edge signals from a comparator 370, and the digital time values may represent the analog voltage signal 360. The pulse-detection output signal may be sent to a controller 150, and a time-of-arrival for the received pulse of light 410 may be determined based at least in part on the one or more time values produced by the TDCs. For example, the time-of-arrival may be determined from a time associated with the peak (e.g., $V_{peak}$) of the voltage signal 360 or from a temporal center of the voltage signal 360. Alternatively, the time-of-arrival may be determined from a time associated with a rising edge of the voltage signal 360. The pulse-detection output signal in FIG. 7 may correspond to the electrical output signal 145 in FIG. 1.

In particular embodiments, a pulse-detection output signal may include one or more digital values that correspond to a time interval between (1) a time when a pulse of light 400 is emitted and (2) a time when a received pulse of light 410 is detected by a receiver 140. The pulse-detection output signal in FIG. 7 may include digital values from each of the TDCs that receive an edge signal from a comparator, and each digital value may represent a time interval between the emission of an optical pulse 400 by a light source 110 and the receipt of an edge signal from a comparator. For example, a light source 110 may emit a pulse of light 400 that is scattered by a target 130, and a receiver 140 may receive a portion of the scattered pulse of light as an input pulse of light 410. When the light source emits the pulse of light 400, a count value of the TDCs may be reset to zero counts. Alternatively, the TDCs in receiver 140 may accumulate counts continuously over two or more pulse periods (e.g., for 10, 100, 1,000, 10,000, or 100,000 pulse periods), and when a pulse of light 400 is emitted, the current TDC count may be stored in memory. After the pulse of light 400 is emitted, the TDCs may accumulate counts that correspond to elapsed time (e.g., the TDCs may count in terms of clock cycles or some fraction of clock cycles).

In FIG. 7, when TDC 380-1 receives an edge signal from comparator 370-1, the TDC 380-1 may produce a digital signal that represents the time interval between emission of the pulse of light 400 and receipt of the edge signal. For example, the digital signal may include a digital value that corresponds to the number of clock cycles that elapsed between emission of the pulse of light 400 and receipt of the edge signal. Alternatively, if the TDC 380-1 accumulates counts over multiple pulse periods, then the digital signal may include a digital value that corresponds to the TDC count at the time of receipt of the edge signal. The pulse-detection output signal may include digital values corresponding to one or more times when a pulse of light 400 was emitted and one or more times when a TDC received an edge signal. A pulse-detection output signal from a pulse-detection circuit 365 may correspond to a received pulse of light 410 and may include digital values from each of the TDCs that receive an edge signal from a comparator. The pulse-detection output signal may be sent to a controller 150, and the controller may determine the distance to the target 130 based at least in part on the pulse-detection output signal. Additionally or alternatively, the controller 150 may determine an optical characteristic of a received pulse of light 410 based at least in part on the pulse-detection output signal received from the TDCs of a pulse-detection circuit 365.

In particular embodiments, a receiver 140 of a lidar system 100 may include one or more analog-to-digital converters (ADCs). As an example, instead of including multiple comparators and TDCs, a receiver 140 may include an ADC that receives a voltage signal 360 from amplifier 350 and produces a digital representation of the voltage signal 360. Although this disclosure describes or illustrates example receivers 140 that include one or more comparators 370 and one or more TDCs 380, a receiver 140 may additionally or alternatively include one or more ADCs. As an example, in FIG. 7, instead of the N comparators 370 and N TDCs 380, the receiver 140 may include an ADC configured to receive the voltage signal 360 and produce a digital output signal that includes digitized values that correspond to the voltage signal 360.

The example voltage signal 360 illustrated in FIG. 7 corresponds to a received pulse of light 410. The voltage signal 360 may be an analog signal produced by an electronic amplifier 350 and may correspond to a pulse of light detected by the receiver 140 in FIG. 7. The voltage levels on the y-axis correspond to the threshold voltages $V_{T1}$, $V_{T2}$, ..., $V_{TN}$ of the respective comparators 370-1, 370-2, ..., 370-N. The time values $t_1, t_2, t_3, ..., t_{N-1}$ correspond to times when the voltage signal 360 exceeds the corresponding threshold voltages, and the time values $t'_1, t'_2, t'_3, ..., t'_{N-1}$ correspond to times when the voltage signal 360 falls below the corresponding threshold voltages. For example, at time $t_1$ when the voltage signal 360 exceeds the threshold voltage $V_{T1}$, comparator 370-1 may produce an edge signal, and TDC 380-1 may output a digital value corresponding to the time $t_1$. Additionally, the TDC 380-1 may output a digital value corresponding to the time $t'_1$ when the voltage signal 360 falls below the threshold voltage $V_{T1}$. Alternatively, the receiver 140 may include an additional TDC (not illustrated in FIG. 7) configured to produce a digital value corresponding to time $t'_1$ when the voltage signal 360 falls below the threshold voltage $V_{T1}$. The pulse-detection output signal from pulse-detection circuit 365 may include one or more digital values that correspond to one or more of the time values $t_1, t_2, t_3, ..., t_{N-1}$ and $t'_1, t'_2, t'_3, ..., t'_{N-1}$. Additionally, the pulse-detection output signal may also include one or more values corresponding to the threshold voltages associated with the time values. Since the voltage signal 360 in FIG. 7 does not exceed the threshold voltage $V_{TN}$, the corresponding comparator 370-N may not produce an edge signal. As a result, TDC 380-N may not produce a time value, or TDC 380-N may produce a signal indicating that no edge signal was received.

In particular embodiments, a pulse-detection output signal produced by a pulse-detection circuit 365 of a receiver 140 may correspond to or may be used to determine an optical characteristic of a received pulse of light 410 detected by the receiver 140. An optical characteristic of a received pulse of light 410 may correspond to a peak optical intensity, a peak optical power, an average optical power, an optical energy, a shape or amplitude, a temporal duration, or a temporal center of the received pulse of light 410. For example, a pulse of light 410 detected by receiver 140 may have one or more of the following optical characteristics: a peak optical power between 1 nanowatt and 10 watts; a pulse energy between 1 attojoule and 10 nanojoules; and a pulse duration between 0.1 ns and 50 ns. In particular embodiments, an optical characteristic of a received pulse of light 410 may be determined from a pulse-detection output signal provided by one or more TDCs 380 of a pulse-detection circuit 365 (e.g., as illustrated in FIG. 7), or an optical characteristic may be determined from a pulse-detection output signal provided by one or more ADCs of a pulse-detection circuit 365.

In particular embodiments, a peak optical power or peak optical intensity of a received pulse of light 410 may be determined from one or more values of a pulse-detection output signal provided by a receiver 140. As an example, a controller 150 may determine the peak optical power of a received pulse of light 410 based on a peak voltage ($V_{peak}$) of the voltage signal 360. The controller 150 may use a formula or lookup table that correlates a peak voltage of the voltage signal 360 with a value for the peak optical power. In the example of FIG. 7, the peak optical power of a pulse of light 410 may be determined from the threshold voltage $V_{T(N-1)}$, which is approximately equal to the peak voltage $V_{peak}$ of the voltage signal 360 (e.g., the threshold voltage $V_{T(N-1)}$ may be associated with a pulse of light 410 having a peak optical power of 10 mW). As another example, a controller 150 may apply a curve-fit or interpolation operation to the values of a pulse-detection output signal to determine the peak voltage of the voltage signal 360, and this peak voltage may be used to determine the corresponding peak optical power of a received pulse of light 410.

In particular embodiments, an energy of a received pulse of light 410 may be determined from one or more values of a pulse-detection output signal. For example, a controller 150 may perform a summation of digital values that correspond to a voltage signal 360 to determine an area under the voltage-signal curve, and the area under the voltage-signal curve may be correlated with a pulse energy of a received pulse of light 410. As an example, the approximate area under the voltage-signal curve in FIG. 7 may be determined by subdividing the curve into M subsections (where M is approximately the number of time values included in the pulse-detection output signal) and adding up the areas of each of the subsections (e.g., using a numerical integration technique such as a Riemann sum, trapezoidal rule, or Simpson's rule). For example, the approximate area A under the voltage-signal curve 360 in FIG. 7 may be determined from a Riemann sum using the expression $A=\Sigma_{k=1}^{M} V_{Tk} \times \Delta t_k$, where $V_{Tk}$ is a threshold voltage associated with the time value $t_k$, and $\Delta t_k$ is a width of the subsection associated with time value $t_k$. In the example of FIG. 7, the voltage signal 360 may correspond to a received pulse of light 410 with a pulse energy of 1 picojoule.

In particular embodiments, a duration of a received pulse of light 410 may be determined from a duration or width of a corresponding voltage signal 360. For example, the difference between two time values of a pulse-detection output signal may be used to determine a duration of a received pulse of light 410. In the example of FIG. 7, the duration of the pulse of light 410 corresponding to voltage signal 360 may be determined from the difference ($t'_3-t_3$), which may correspond to a received pulse of light 410 with a pulse duration of 4 nanoseconds. As another example, a controller 150 may apply a curve-fit or interpolation operation to the values of the pulse-detection output signal, and the duration of the pulse of light 410 may be determined based on the curve-fit or interpolation. One or more of the approaches for determining an optical characteristic of a received pulse of light 410 as described herein may be implemented using a receiver 140 that includes multiple comparators 370 and TDCs 380 (as illustrated in FIG. 7) or using a receiver 140 that includes one or more ADCs.

In FIG. 7, the voltage signal 360 produced by amplifier 350 is coupled to a frequency-detection circuit 600 as well as a pulse-detection circuit 365. The pulse-detection circuit 365 may provide a pulse-detection output signal that is used to determine time-domain information for a received pulse of light 410 (e.g., a time-of-arrival, duration, or energy of the received pulse of light 410), and the frequency-detection circuit 600 may provide frequency-domain information for the received pulse of light 410. For example, the frequency-detection output signal of the frequency-detection circuit 600 may include amplitude information for particular frequency components of the received pulse of light 410. The frequency-detection output signal may include the amplitude of one or more frequency components of a spectral signature of a received pulse of light 410, and this amplitude information may be sent to a controller 150 for further processing. For example, the controller 150 may determine, based at least in part on the frequency-component information, whether a received pulse of light is a valid received pulse of light 410 or an interfering pulse of light.

In particular embodiments, a frequency-detection circuit 600 may include multiple parallel frequency-measurement channels, and each frequency-measurement channel may include a filter 610 and a corresponding amplitude detector 620. In FIG. 7, the frequency-detection circuit 600 includes M electronic filters (filters 610-1, 610-2, . . . , 610-M), where each filter is associated with a particular frequency component (frequencies $f_a$, $f_b$, . . . , $f_M$). Each filter 610 in FIG. 7 may include an electronic band-pass filter having a particular pass-band center frequency and width. For example, filter 610-2 may be a band-pass filter with a center frequency $f_b$ of 1 GHz and a pass-band width of 20 MHz. Each filter 610 may include a passive filter implemented with one or more passive electronic components (e.g., one or more resistors, inductors, or capacitors). Alternatively, each filter 610 may include an active filter that includes one or more active electronic components (e.g., one or more transistors or op-amps) along with one or more passive components.

In addition to the M electronic filters 610, the frequency-detection circuit 600 in FIG. 7 also includes M electronic amplitude detectors (amplitude detectors 620-1, 620-2, . . . , 620-M). An amplitude detector 620 may be configured to provide an output signal that corresponds to an amplitude (e.g., a peak value, a size, or an energy) of an electrical signal received from a filter 610. For example, filter 610-M may receive voltage signal 360 and provide to amplitude detector 620-M the portion of the voltage signal 360 having a frequency component at or near the frequency $f_M$. The amplitude detector 620-M may produce a digital or analog output signal that corresponds to the amplitude, peak value, size, or energy of the signal associated with the frequency component $f_M$. Each amplitude detector 620 may include a sample-and-hold circuit, a peak-detector circuit, an integrator circuit, or an ADC. For example, amplitude detector 620-M may include a sample-and-hold circuit and an ADC. The sample-and-hold circuit may produce an analog voltage corresponding to the amplitude of a signal received from filter 610-M, and the ADC may produce a digital signal that represents the analog voltage.

A frequency-detection circuit 600 may include 1, 2, 4, 8, 10, 20, 50, or any other suitable number of filters 610 and amplitude detectors 620, and each filter may have a center frequency between approximately 10 MHz and approximately 50 GHz. Additionally, each filter 610 may include a band-pass filter having a pass-band with a frequency width of approximately 1 MHz, 10 MHz, 20 MHz, 50 MHz, 100 MHz, 200 MHz, or any other suitable frequency width. For example, a frequency-detection circuit 600 may include 16 band-pass filters 610, each with a different center frequency between 100 MHz and 1 GHz. As another example, a frequency-detection circuit 600 may include four band-pass filters 610 with center frequencies of approximately 200 MHz, 400 MHz, 600 MHz, and 800 MHz, and each filter may have a pass-band with a frequency width of approximately 20 MHz. A 400-MHz filter with a 20-MHz pass-band may pass or transmit frequency components from approximately 390 MHz to approximately 410 MHz and may attenuate frequency components outside of that frequency range.

Figure 8:
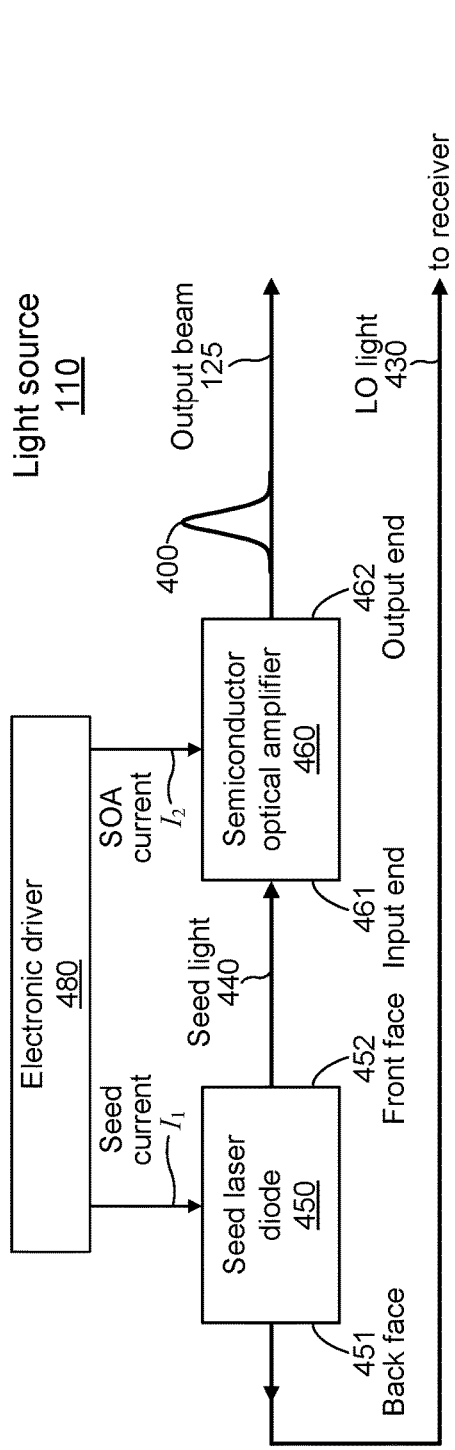
FIG. 8 illustrates an example light source that includes a seed laser diode and a semiconductor optical amplifier (SOA).

FIG. 8 illustrates an example light source 110 that includes a seed laser diode 450 and a semiconductor optical amplifier (SOA) 460. In particular embodiments, a light source 110 of a lidar system 100 may include (i) a seed laser 450 that produces seed light 440 and LO light 430 and (ii) a pulsed optical amplifier 460 that amplifies temporal portions of the seed light 440 to produce emitted pulses of light 400. In the example of FIG. 8, the seed laser is a seed laser diode 450 that produces seed light 440 and LO light 430. The seed laser diode 450 may include a Fabry-Perot laser diode, a quantum well laser, a DBR laser, a DFB laser, a VCSEL, a quantum dot laser diode, or any other suitable type of laser diode. In FIG. 8, the pulsed optical amplifier is a semiconductor optical amplifier (SOA) 460 that emits a pulse of light 400 that is part of the output beam 125. A SOA 460 may include a semiconductor optical waveguide that receives the seed light 440 from the seed laser diode 450 and amplifies a temporal portion of the seed light 440 as it propagates through the waveguide to produce an emitted pulse of light 400. A SOA 460 may have an optical power gain of 20 decibels (dB), 25 dB, 30 dB, 35 dB, 40 dB, 45 dB, or any other suitable optical power gain. For example, a SOA 460 may have a gain of 40 dB, and a temporal portion of seed light 440 with an energy of 20 pJ may be amplified by the SOA 460 to produce a pulse of light 400 with an energy of approximately 0.2 µJ. A light source 110 that includes a seed laser diode 450 that supplies seed light 440 that is amplified by a SOA 460 may be referred to as a master-oscillator power-amplifier laser (MOPA laser) or a MOPA light source. The seed laser diode 450 may be referred to as a master oscillator, and the SOA 460 may be referred to as a power amplifier.

In particular embodiments, a light source 110 may include an electronic driver 480 that (i) supplies electrical current to a seed laser 450 and (ii) supplies electrical current to a SOA 460. In FIG. 8, the electronic driver 480 supplies seed current $I_1$ to the seed laser diode 450 to produce the seed light 440 and the LO light 430. The seed current $I_1$ supplied to the seed laser diode 450 may be a substantially constant DC electrical current so that the seed light 440 and the LO light 430 each include continuous-wave (CW) light or light having a substantially constant optical power. For example, the seed current $I_1$ may include a DC current of approximately 1 mA, 10 mA, 100 mA, 200 mA, 500 mA, or any other suitable DC electrical current. Additionally or alternatively, the seed current $I_1$ may include a pulse of electrical current so that the seed light 440 includes seed pulses of light that are amplified by the SOA 460. The seed laser 450 may be pulsed with a pulse of current having a duration that is long enough so that the wavelength of the seed-laser light emitted by the seed laser 450 (e.g., seed light 440 and LO light 430) stabilizes or reaches a substantially constant value at some time during the pulse. For example, the duration of the current pulse may be between 50 ns and 2 µs, and the SOA 460 may be configured to amplify a 5-ns temporal portion of the seed light 440 to produce the emitted pulse of light 400. The temporal portion of the seed light 440 that is selected for amplification may be located in time near the middle or end of the electrical current pulse to allow sufficient time for the wavelength of the seed-laser light to stabilize.

In FIG. 8, the electronic driver 480 supplies SOA current $I_2$ to the SOA 460, and the SOA current $I_2$ provides optical gain to temporal portions of the seed light 440 that propagate through the waveguide of the SOA 460. The SOA current $I_2$ may include pulses of electrical current, where each pulse of current causes the SOA 460 to amplify one temporal portion of the seed light 440 to produce an emitted pulse of light 400. The SOA current $I_2$ may have a duration of approximately 0.5 ns, 1 ns, 2 ns, 5 ns, 10 ns, 20 ns, 50 ns, 100 ns, or any other suitable duration. The SOA current $I_2$ may have a peak amplitude of approximately 1 A, 2 A, 5 A, 10 A, 20 A, 50 A, 100 A, 200 A, 500 A, or any other suitable peak current. For example, the SOA current $I_2$ supplied to the SOA 460 may include a series of current pulses having a duration of approximately 5-10 ns and a peak current of approximately 100 A. The series of current pulses may result in the emission of a corresponding series of pulses of light 400, and each emitted pulse of light 400 may have a duration that is less than or equal to the duration of the corresponding electrical current pulse. For example, an electronic driver 480 may supply 5-ns duration current pulses to the SOA 460 at a repetition frequency of 700 kHz. This may result in emitted pulses of light 400 that have a duration of approximately 4 ns and a pulse repetition frequency of 700 kHz.

A pulsed optical amplifier may refer to an optical amplifier that is operated in a pulsed mode so that the output beam 125 emitted by the optical amplifier includes pulses of light 400. For example, a pulsed optical amplifier may include a SOA 460 that is operated in a pulsed mode by supplying the SOA 460 with pulses of current. The seed light 440 may include CW light or light having a substantially constant optical power, and each pulse of current supplied to the SOA 460 may amplify a temporal portion of seed light to produce an emitted pulse of light 400. As another example, a pulsed optical amplifier may include an optical amplifier along with an optical modulator. The optical modulator may be an acousto-optic modulator (AOM) or an electro-optic modulator (EOM) operated in a pulsed mode so that the modulator selectively transmits pulses of light. The SOA 460 may also be operated in a pulsed mode in synch with the optical modulator to amplify the temporal portions of the seed light, or the SOA 460 may be supplied with substantially DC current to operate as a CW optical amplifier. The optical modulator may be located between the seed laser diode 450 and the SOA 460, and the optical modulator may be operated in a pulsed mode to transmit temporal portions of the seed light 440 which are then amplified by the SOA 460. Alternatively, the optical modulator may be located after the SOA 460, and the optical modulator may be operated in a pulsed mode to transmit the emitted pulses of light 400.

The seed laser diode 450 illustrated in FIG. 8 includes a front face 452 and a back face 451. The seed light 440 is emitted from the front face 452 and directed to the input end 461 of the SOA 460. The LO light 430 is emitted from the back face 451 and directed to the receiver 140 of the lidar system 100. The seed light 440 or the LO light 430 may be emitted as a free-space beam, and a light source 110 may include one or more lenses (not illustrated in FIG. 10) that (i) collimate the LO light 430 emitted from the back face 451, (ii) collimate the seed light 440 emitted from the front face 452, or (iii) focus the seed light 440 into the SOA 460.

In particular embodiments a front face 452 or a back face 451 may include a discrete facet formed by a semiconductor-air interface (e.g., a surface formed by cleaving or polishing a semiconductor structure to form the seed laser diode 450). Additionally, the front face 452 or the back face 451 may include a dielectric coating that provides a reflectivity (at the seed-laser operating wavelength) of between approximately 50% and approximately 99.9%. For example, the back face 451 may have a reflectivity of 90% to 99.9% at a wavelength of the LO light 430. The average power of the LO light 430 emitted from the back face 451 may depend at least in part on the reflectivity of the back face 451, and a value for the reflectivity of the back face 451 may be selected to provide a particular average power of the LO light 430. For example, the back face 451 may be configured to have a reflectivity between 90% and 99%, and the seed laser diode 450 may emit LO light 430 having an average optical power of 10 µW to 1 mW. In some conventional laser diodes, the reflectivity of the back face may be designed to be relatively high or as close to 100% as possible in order to minimize the amount of light produced from the back face or to maximize the amount of light produced from the front face. In the seed laser diode 450 of FIG. 8, the reflectivity of the back face 451 may be reduced to a lower value compared to a conventional laser diode so that a particular power of LO light 430 is emitted from the back face 451. As an example, a conventional laser diode may have a back face with a reflectivity of greater than 98%, and a seed laser diode 450 may have a back face with a reflectivity between 90% and 98%.

In particular embodiments, the wavelength of the seed light 440 and the wavelength of the LO light 430 may be approximately equal. For example, a seed laser diode 450 may have a seed-laser operating wavelength of approximately 1508 nm, and the seed light 440 and the LO light 430 may each have the same wavelength of approximately 1508 nm. As another example, the wavelength of the seed light 440 and the wavelength of the LO light 430 may be equal to within some percentage (e.g., to within approximately 0.1%, 0.01%, or 0.001%) or to within some wavelength range (e.g., to within approximately 0.1 nm, 0.01 nm, or 0.001 nm). If the wavelengths are within 0.01% of 1508 nm, then the wavelengths of the seed light 440 and the LO light 430 may each be in the range from 1507.85 nm to 1508.15 nm).

Figure 9:
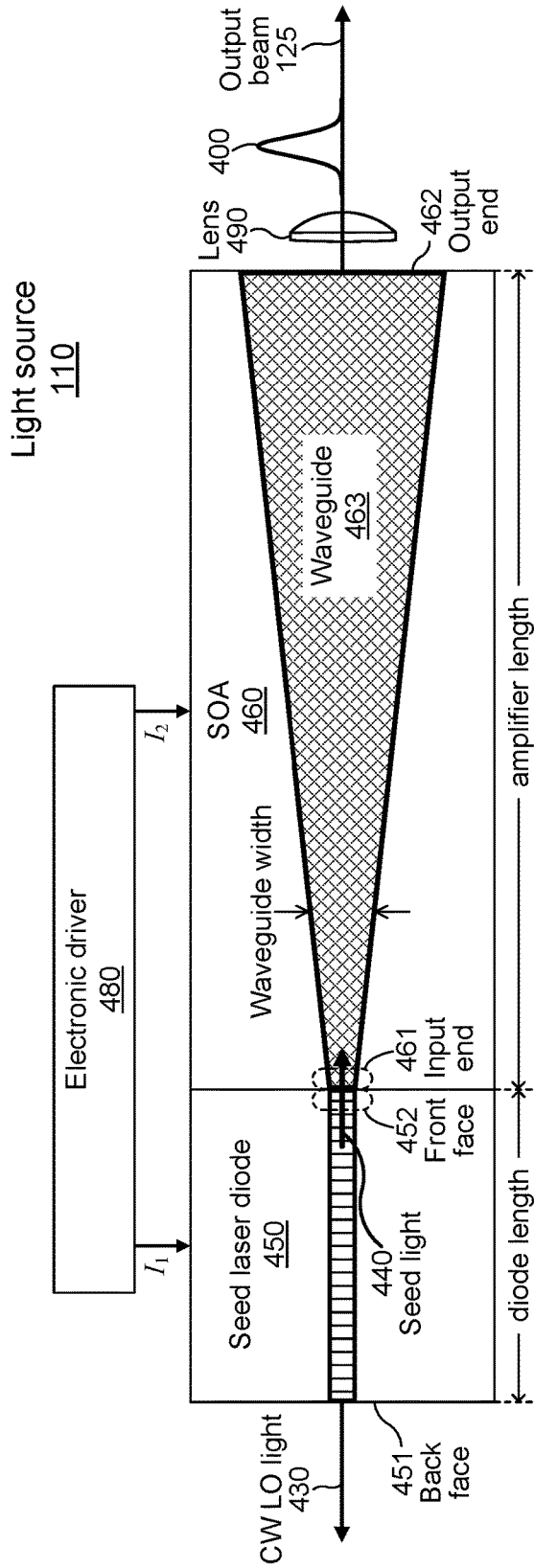
FIG. 9 illustrates an example light source that includes a semiconductor optical amplifier (SOA) with a tapered optical waveguide.

FIG. 9 illustrates an example light source 110 that includes a semiconductor optical amplifier (SOA) 460 with a tapered optical waveguide 463. In particular embodiments, a SOA 460 may include an input end 461, an output end 462, and an optical waveguide 463 extending from the input end 461 to the output end 462. The input end 461 may receive the seed light 440 from the seed laser diode 450. The waveguide 463 may amplify a temporal portion of the seed light 440 as the temporal portion propagates along the waveguide 463 from the input end 461 to the output end 462. The amplified temporal portion may be emitted from the output end 462 as an emitted pulse of light 400. The emitted pulse of light 400 may be part of the output beam 125, and the light source 110 may include a lens 490 configured to collect and collimate emitted pulses of light 400 from the output end 462 to produce a collimated output beam 125. The seed laser diode 450 in FIG. 9 may have a diode length of approximately 100 μm, 200 μm, 500 μm, 1 mm, or any other suitable length. The SOA 460 may have an amplifier length of approximately 1 mm, 2 mm, 3 mm, 5 mm, 10 mm, 20 mm, or any other suitable length. For example, the seed laser diode 450 may have a diode length of approximately 300 μm, and the SOA 460 may have an amplifier length of approximately 4 mm.

In particular embodiments, a waveguide 463 may include a semiconductor optical waveguide formed at least in part by the semiconductor material of the SOA 460, and the waveguide 463 may confine light along transverse directions while the light propagates through the SOA 460. In particular embodiments, a waveguide 463 may have a substantially fixed width or a waveguide 463 may have a tapered width. For example, a waveguide 463 may have a substantially fixed width of approximately 5 μm, 10 μm, 20 μm, 50 μm, 100 μm, 200 μm, 500 μm, or any other suitable width. In FIG. 9, the SOA 460 has a tapered waveguide 463 with a width that increases from the input end 461 to the output end 462. For example, the width of the tapered waveguide 463 at the input end 461 may be approximately equal to the width of the waveguide of the seed laser diode 450 (e.g., the input end 461 may have a width of approximately 1 μm, 2 μm, 5 μm, 10 μm, or 50 μm). At the output end 462 of the SOA 460, the tapered waveguide 463 may have a width of approximately 50 μm, 100 μm, 200 μm, 500 μm, 1 mm, or any other suitable width. As another example, the width of the tapered waveguide 463 may increase linearly from a width of approximately 20 μm at the input end 461 to a width of approximately 250 μm at the output end 462.

In particular embodiments, the input end 461 or the output end 462 of a SOA 460 may be a discrete facet formed by a semiconductor-air interface. Additionally, the input end 461 or the output end 462 may include a dielectric coating (e.g., an anti-reflection coating to reduce the reflectivity of the input end 461 or the output end 462). An anti-reflection (AR) coating may have a reflectivity at the seed-laser operating wavelength of less than 5%, 2%, 0.5%, 0.1%, or any other suitable reflectivity value. In FIG. 8, the input end 461 may have an AR coating that reduces the amount of seed light 440 reflected by the input end 461. In FIG. 8 or FIG. 9, the output end 462 may have an AR coating that reduces the amount of amplified seed light reflected by the output end 462. An AR coating applied to the input end 461 or the output end 462 may also prevent the SOA 460 from acting as a laser by emitting coherent light when no seed light 440 is present.

In particular embodiments, a light source 110 may include a seed laser diode 450 and a SOA 460 that are integrated together and disposed on or in a single chip or substrate. For example, a seed laser diode 450 and a SOA 460 may each be fabricated separately and then attached to the same substrate (e.g., using epoxy, adhesive, or solder). The substrate may be electrically or thermally conductive, and the substrate may have a coefficient of thermal expansion (CTE) that is approximately equal to the CTE of the seed laser 450 and the SOA 460. As another example, the seed laser diode 450 and the SOA 460 may be fabricated together on the same substrate (e.g., using semiconductor-fabrication processes, such as for example, lithography, deposition, and etching). The seed laser diode 450 and the SOA 460 may each include InGaAs or InGaAsP semiconductor structures, and the substrate may include indium phosphide (InP). The InP substrate may be n-doped or p-doped so that it is electrically conductive, and a portion of the InP substrate may act as an anode or cathode for both the seed laser diode 450 and the SOA 460. The substrate may be thermally coupled to (i) a heat sink that dissipates heat produced by the seed laser diode 450 or the SOA 460 or (ii) a temperature-control device (e.g., a thermoelectric cooler) that stabilizes the temperature of the seed laser diode 450 or the SOA 460 to a particular temperature setpoint or to within a particular temperature range. In the example of FIG. 8, the seed laser 450 and the SOA 460 may be separate devices that are not disposed on a single substrate, and the seed light 440 may be a free-space beam. Alternatively, in the example of FIG. 8, the seed laser 450 and the SOA 460 may be separate devices that are disposed together on a single substrate. In the example of FIG. 9, the seed laser 450 and the SOA 460 may be integrated together and disposed on or in a single chip or substrate.

In FIG. 9, rather than having a discrete facet formed by a semiconductor-air interface, the front face 452 of the seed laser diode 450 and the input end 461 of the SOA 460 may be coupled together without a semiconductor-air interface. For example, the seed laser diode 450 may be directly connected to the SOA 460 so that the seed light 440 is directly coupled from the seed laser diode 450 into the waveguide 463 of the SOA 460. The front face 452 may be butt-coupled or affixed (e.g., using an optically transparent adhesive) to the input end 461, or the seed laser diode 450 and the SOA 460 may be fabricated together so that there is no separate front face 452 or input end 461 (e.g., the front face 452 and the input end 461 may be merged together to form a single interface between the seed laser diode 450 and the SOA 460). Alternatively, the seed laser diode 450 may be coupled to the SOA 460 via a passive optical waveguide that transmits the seed light 440 from the front face 452 of the seed laser diode 450 to the input end 461 of the SOA 460.

In particular embodiments, during a period of time between two successive temporal portions of seed light 440, a SOA 460 may be configured to optically absorb most of the seed light 440 propagating in the SOA 460. The seed light 440 from the seed laser diode 450 may be coupled into the waveguide 463 of the SOA 460. Depending on the amount of SOA current $I_2$ supplied to the SOA 460, the seed light 440 may be optically amplified or optically absorbed while propagating along the waveguide 463. If the SOA current $I_2$ exceeds a threshold gain value (e.g., 100 mA) that overcomes the optical loss of the SOA 460, then the seed light 440 may be optically amplified by stimulated emission of photons. Otherwise, if the SOA current $I_2$ is less than the threshold gain value, then the seed light 440 may be optically absorbed. The process of optical absorption of the seed light 440 may include photons of the seed light 440 being absorbed by electrons located in the semiconductor structure of the SOA 460.

In particular embodiments, the SOA current $I_2$ may include pulses of current separated by a period of time that corresponds to the pulse period τ of the light source 110, and each pulse of current may result in the emission of a pulse of light 400. For example, if the SOA current $I_2$ includes 20-A current pulses with a 10-ns duration, then for each current pulse, a corresponding 10-ns temporal portion of the seed light 440 may be amplified, resulting in the emission of a pulse of light 400. During the time periods τ between successive pulses of current, the SOA current $I_2$ may be set to approximately zero or to some other value below the threshold gain value, and the seed light 440 present in the SOA 460 during those time periods may be optically absorbed. The optical absorption of the SOA 460 when the SOA current $I_2$ is zero may be greater than or equal to approximately 10 decibels (dB), 15 dB, 20 dB, 25 dB, or 30 dB. For example, if the optical absorption is greater than or equal to 20 dB, then less than or equal to 1% of the seed light 440 that is coupled into the input end 461 of the waveguide 463 may be emitted from the output end 462 as unwanted leakage light. Having most of the seed light 440 absorbed in the SOA 460 may prevent unwanted seed light 440 (e.g., seed light 440 located between successive pulses of light 400) from leaking out of the SOA 460 and propagating through the rest of the lidar system 100. Additionally, optically absorbing the unwanted seed light 440 may allow the seed laser 450 to be operated with a substantially constant current $I_1$ or a substantially constant output power so that the wavelengths of the seed light 440 and LO light 430 are stable and substantially constant.

In particular embodiments, a SOA 460 may be electrically configured as a diode with a p-doped region and a n-doped region that form a p-n junction. The SOA may include an anode and a cathode that convey SOA current $I_2$ from an electronic driver 480 into or out of the p-n junction of the SOA 460. The anode may correspond to the p-doped side of the semiconductor p-n junction, and the cathode may correspond to the n-doped side. For example, the anode of the SOA 460 may include or may be electrically coupled to the p-doped region of the SOA 460, and the p-doped region may be electrically coupled to an electrically conductive electrode material (e.g., gold) deposited onto a surface of the SOA 460. The cathode may include or may be electrically coupled to a n-doped substrate located on the opposite side of the SOA 460. Alternatively, the anode of the SOA 460 may include or may be electrically coupled to a p-doped substrate of the SOA 460, and the cathode may include or may be electrically coupled to an electrode and a n-doped region of the SOA 460. The anode and cathode may be electrically coupled to the electronic driver 480, and the driver 480 may supply a positive SOA current $I_2$ that flows from the driver 480 into the anode, through the SOA 460, out of the cathode, and back to the driver 480. A positive SOA current $I_2$ flowing through the SOA 460 may correspond to the p-n junction of the SOA being in a forward-biased state which allows the current to flow. When considering the electrical current as being made up of a flow of electrons, then for a positive SOA current, the electrons may be viewed as flowing in the opposite direction (e.g., from the driver 480 into the cathode, through the SOA 460, and out of the anode and back to the driver 480).

In particular embodiments, an electronic driver 480 may electrically couple the SOA anode to the SOA cathode during a period of time between two successive pulses of current. For example, for most or all of the time period $\tau$ between two successive pulses of current, the electronic driver 480 may electrically couple the anode and cathode of the SOA 460. Electrically coupling the anode and cathode may include electrically shorting the anode directly to the cathode or coupling the anode and cathode through a particular electrical resistance (e.g., approximately 1 Ω, 10Ω, or 100Ω). Alternatively, electrically coupling the anode and the cathode may include applying a reverse-bias voltage (e.g., approximately −1 V, −5 V, or −10 V) to the anode and cathode, where the reverse-bias voltage has a polarity that is opposite the forward-bias polarity associated with the applied pulses of current. By electrically coupling the anode to the cathode, the optical absorption of the SOA may be increased. For example, the optical absorption of the SOA 460 when the anode and cathode are electrically coupled may be increased (compared to the anode and cathode not being electrically coupled) by approximately 3 dB, 5 dB, 10 dB, 15 dB, or 20 dB. The optical absorption of the SOA 460 when the anode and cathode are electrically coupled may be greater than or equal to approximately 20 dB, 25 dB, 30 dB, 35 dB, or 40 dB. For example, the optical absorption of a SOA 460 when the SOA current $I_2$ is zero and the anode and cathode are not electrically coupled may be 20 dB. When the anode and cathode are electrically shorted together, the optical absorption may increase by 10 dB to an optical absorption of 30 dB. If the optical absorption of the SOA 460 is greater than or equal to 30 dB, then less than or equal to 0.1% of the seed light 440 that is coupled into the input end 461 of the waveguide 463 may be emitted from the output end 462 as unwanted leakage light.

In particular embodiments, a light source 110 that includes a seed laser diode 450 and a SOA 460 may be configured as a three-terminal device. A three-terminal light source may include (i) a common cathode and separate, electrically isolated anodes or (ii) a common anode and separate, electrically isolated cathodes. A seed laser diode 450 may be electrically configured as a diode with a p-doped region (coupled to a seed laser anode) and a n-doped region (coupled to a seed laser cathode), where the p-doped and n-doped regions form a p-n junction. Similarly, a SOA 460 may be electrically configured as a diode with a p-doped region (coupled to a SOA anode) and a n-doped region (coupled to a SOA cathode), where the p-doped and n-doped regions form a p-n junction. A seed laser diode 450 and a SOA 460 may each have a cathode and an anode, and a common-cathode configuration may refer to the cathodes of the seed laser diode 450 and the SOA 460 being electrically connected together into a single electrical terminal or contact that is connected to an electronic driver 480. A light source 110 configured as a three-terminal common-cathode device may include a seed laser anode, a SOA anode, and a common cathode. The seed laser anode and the SOA anode may be electrically isolated from one another, and the seed laser cathode and the SOA cathode may be electrically connected together to form the common cathode. Alternatively, a light source 110 may be configured as a three-terminal common-anode device that includes a seed laser cathode, a SOA cathode, and a common anode. The seed laser cathode and the SOA cathode may be electrically isolated from one another, and the seed laser anode and the SOA anode may be electrically connected together to form the common anode.

Two terminals (e.g., two anodes or two cathodes) being electrically isolated from one another may refer to the two terminals having greater than a particular value of electrical resistance between them (e.g., the resistance between two electrically isolated anodes may be greater than 1 kΩ, 10 kΩ, 100 kΩ, or 1 MΩ). Two terminals (e.g., two anodes or two cathodes) being electrically connected may refer to the two terminals having less than a particular value of electrical resistance between them (e.g., the resistance between two electrically connected cathodes may be less than 1 kΩ, 100 Ω, 10Ω, or 1Ω). A common-anode or common-cathode configuration may be provided by combining or electrically connecting the respective anodes or cathodes through an electrically conductive substrate. For example, a seed laser diode 450 and a SOA 460 may be fabricated separately and then affixed to an electrically conductive substrate so that their anodes or cathodes are electrically connected. As another example, a substrate may include an electrically conductive semiconductor material on which a seed laser diode 450 and SOA 460 are grown. The seed laser diode 450 and the SOA 460 may each include an InGaAs or InGaAsP semiconductor structure grown on an InP substrate. The InP substrate may be n-doped so that it is electrically conductive, and the cathodes of the seed laser diode 450 and the SOA 460 may each be electrically connected to the InP substrate so that the InP substrate acts as a common cathode. Alternatively, the InP substrate may be p-doped, and the anodes of the seed laser diode 450 and the SOA 460 may each be electrically connected to the InP substrate, which acts as a common anode.

One or more of the light sources 110 illustrated in FIGS. 8-11 and 28-29 and described herein may be configured as a three-terminal device (with a common cathode or a common anode). For example, the light source 110 in FIG. 9 may be configured as a three-terminal common-cathode device having separate electrical connections between the electronic driver 480 and each of these three electrical terminals or contacts: (i) seed laser anode, (ii) SOA anode, and (iii) common cathode. In a three-terminal common-cathode device, the seed laser anode and the SOA anode may be electrically isolated from one another, and an electronic driver 480 may drive the seed laser diode 450 and the SOA 460 by supplying separate electrical signals to the seed laser anode and the SOA anode. The common cathode may act as a common return path for currents from the seed laser diode 450 and the SOA 460 to combine and return to the electronic driver 480.

In particular embodiments, a light source 110 that includes a seed laser diode 450 and a SOA 460 may be configured as a four-terminal device. In a four-terminal light source 110, the seed laser anode and the SOA anode may be electrically isolated from one another, and instead of having a common cathode, the seed laser cathode and the SOA cathode may also be electrically isolated from one another. One or more of the light sources 110 described herein may be configured as a four-terminal device. For example, the light source 110 in each of FIGS. 8 and 9 may be configured as a four-terminal device with two electrically isolated anodes (seed laser anode and SOA anode) and two electrically isolated cathodes (seed laser cathode and SOA cathode). A four-terminal light source 110 may have separate electrical connections between an electronic driver 480 and each of these four electrical terminals or contacts: (i) seed laser anode, (ii) seed laser cathode, (iii) SOA anode, and (iv) SOA cathode. An electronic driver 480 may drive the anode and cathode of the seed laser diode 450 separately or independently from the anode and cathode of the SOA 460. As compared to a three-terminal light source 110, a light source configured as a four-terminal device may provide improved electrical isolation between the seed laser diode 450 and the SOA 460. For example, in a four-terminal light source 110, applying a pulse of current to the SOA 460 may result in a reduced amount of unwanted cross-talk current that is coupled to the seed laser diode 450.

Figure 10:
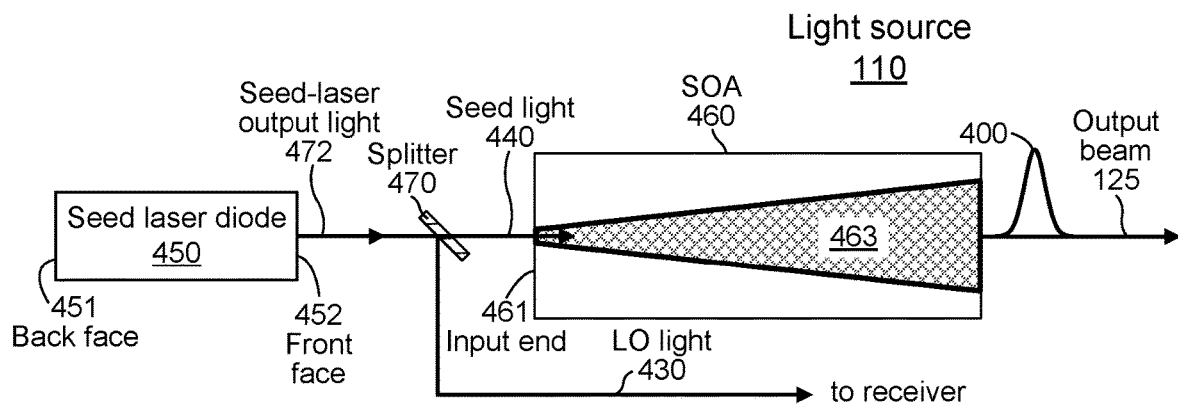
FIG. 10 illustrates an example light source with an optical splitter that splits output light from a seed laser diode to produce seed light and local-oscillator (LO) light.

FIG. 10 illustrates an example light source 110 with an optical splitter 470 that splits output light 472 from a seed laser diode 450 to produce seed light 440 and local-oscillator (LO) light 430. In particular embodiments, a light source 110 may include (i) a seed laser diode 450 with a front face 452 from which seed-laser output light 472 is emitted and (ii) an optical splitter 470 that splits off a portion of the output light 472 to produce seed light 440 and LO light 430. The optical splitter 470 may be located between the seed laser diode 450 and the SOA 460. In FIG. 10, the output light 472 emitted by the seed laser diode 450 is a free-space optical beam, and the optical splitter 470 is a free-space optical beam-splitter that produces the free-space beams: seed light 440 and LO light 430. In the examples of FIGS. 8 and 9, light emitted from the back face 451 of the seed laser diode 450 is used to produce the LO light 430. In contrast, in the example of FIG. 10, both the seed light 440 and the LO light 430 are produced from the output light 472 emitted from the front face 452 of the seed laser diode 450. The seed light 440 is transmitted through the splitter 470 and directed to the SOA 460, and the LO light 430 is reflected by the splitter 470 and directed to the receiver 140 of the lidar system 100. A light source 110 may include one or more lenses (not illustrated in FIG. 10) that collimate the seed-laser output light 472 or focus the seed light 440 into the waveguide 463 of the SOA 460.

The optical splitter 470 in FIG. 10 is a free-space optical splitter that receives the seed-laser output light 472 as a free-space optical beam and produces two free-space beams: seed light 440 and LO light 430. In FIG. 10, the free-space optical beam-splitter 470 reflects a first portion of the incident seed-laser output light 472 to produce the LO light 430 and transmits a second portion of the output light 472 to produce the seed light 440. Alternatively, the beam-splitter 470 may be arranged to reflect a portion of the output light 472 to produce the seed light 440 and transmit a portion of the output light 472 to produce the LO light 430. The free-space beam-splitter 470 in FIG. 10 may have a reflectivity of less than or equal to 1%, 2%, 5%, 10%, 20%, 50%, or any other suitable reflectivity value. For example, the splitter 470 may reflect 10% or less of the incident seed-laser output light 472 to produce the LO light 430, and the remaining 90% or more of the output light 472 may be transmitted through the splitter 470 to produce the seed light 440. As another example, if the output light 472 has an average power of 25 mW and the splitter 470 reflects approximately 4% of the output light 472, then the LO light 430 may have an average power of approximately 1 mW, and the seed light 440 may have an average power of approximately 24 mW. As used herein, a splitter 470 may refer to a free-space optical splitter, a fiber-optic splitter, or an optical-waveguide splitter. Additionally, an optical-waveguide splitter may be referred to as an integrated-optic splitter.

In particular embodiments, a light source 110 may include a fiber-optic splitter 470 that splits the seed-laser output light 472 to produce seed light 440 and LO light 430. Instead of using a free-space optical splitter 470 (as illustrated in FIG. 10), a light source 110 may use a fiber-optic splitter 470. The fiber-optic splitter 470 may include one input optical fiber and two or more output optical fibers, and light that is coupled into the input optical fiber may be split between the output optical fibers. The output light 472 may be coupled from the front face 452 of the seed laser diode 450 into the input optical fiber of the fiber-optic splitter 470, and the fiber-optic splitter 470 may split the output light 472 into the seed light 440 and the LO light 430. The output light 472 may be coupled into the input optical fiber using one or more lenses, or the output light 472 may be directly coupled into the input optical fiber (e.g., the input optical fiber may be butt-coupled to the front face 452 of the seed laser diode 450). The seed light 440 may be directed to the SOA 460 by a first output fiber, and the LO light 430 may be directed to a receiver 140 by a second output fiber. The seed light 440 may be coupled from the first output fiber into the waveguide 463 of the SOA 460 by one or more lenses, or the seed light 440 may be directly coupled into waveguide 463 (e.g., the first output fiber may be butt-coupled to the input end 461 of the SOA 460). A fiber-optic splitter 470 may split off less than or equal to 1%, 2%, 5%, 10%, 20%, 50%, or any other suitable amount of the output light 472 to produce the LO light 430, and the remaining light may form the seed light 440. For example, a fiber-optic splitter 470 may split off 10% or less of the output light 472 to produce the LO light 430, which is directed to one output fiber. The remaining 90% or more of the output light 472 may be directed to the other output fiber as the seed light 440.

Figure 11:
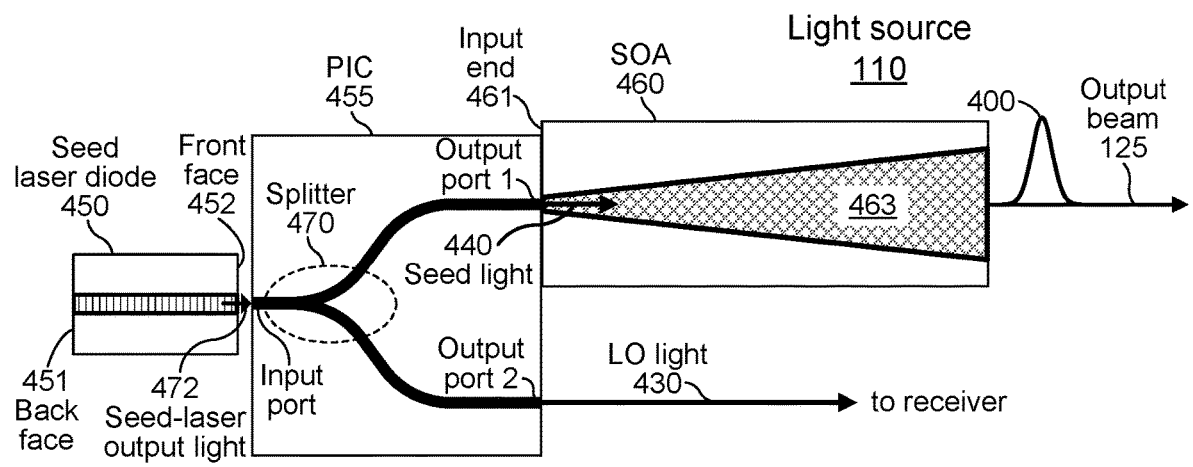
FIG. 11 illustrates an example light source with a photonic integrated circuit (PIC) that includes an optical-waveguide splitter.

FIG. 11 illustrates an example light source 110 with a photonic integrated circuit (PIC) 455 that includes an optical-waveguide splitter 470. In particular embodiments, a light source 110 may include an optical splitter 470 and a PIC 455, where the optical splitter 470 is an optical-waveguide splitter of the PIC. A PIC 455 (which may be referred to as a planar lightwave circuit (PLC), an integrated-optic device, an integrated optoelectronic device, or a silicon optical bench) may include one or more optical waveguides or one or more optical-waveguide devices (e.g., optical-waveguide splitter 470) integrated together into a single device. A PIC 455 may include or may be fabricated from a substrate that includes silicon, InP, glass (e.g., silica), a polymer, an electro-optic material (e.g., lithium niobate (LiNbO$_3$) or lithium tantalate (LiTaO$_3$)), or any suitable combination thereof. One or more optical waveguides may be formed on or in a PIC substrate using micro-fabrication techniques, such as for example, lithography, deposition, or etching. For example, an optical waveguide may be formed on a glass or silicon substrate by depositing and selectively etching material to form a ridge or channel waveguide on the substrate. As another example, an optical waveguide may be formed by implanting or diffusing a material into a substrate (e.g., by diffusing titanium into a LiNbO$_3$ substrate) to form a region in the substrate having a higher refractive index than the surrounding substrate material.

In particular embodiments, an optical-waveguide splitter 470 may include an input port and two or more output ports. In FIG. 11, the seed-laser output light 472 from the seed laser diode 450 is coupled into the input optical waveguide (input port) of the waveguide splitter 470, and the waveguide splitter 470 splits the output light 472 between two output waveguides, output port 1 and output port 2. The seed-laser output light 472 may be coupled from the front face 452 of the seed laser diode 450 to the input port of the splitter 470 using one or more lenses, or the seed laser diode 450 may be butt-coupled to the input port so that the output light 472 is directly coupled into the input port. The seed light 440 is formed by the portion of output light 472 that is sent by the splitter 470 to output port 1, and the LO light 430 is formed by the portion of output light 472 that is sent by the splitter 470 to output port 2. The waveguide splitter 470 directs the seed light 440 to output port 1, which is coupled to waveguide 463 of the SOA 460. Additionally, the waveguide splitter 470 directs the LO light 430 to output port 2, which sends the LO light 430 to a receiver 140. An optical-waveguide splitter 470 may split off less than or equal to 1%, 2%, 5%, 10%, 20%, 50%, or any other suitable amount of the output light 472 to produce the LO light 430, and the remaining light may form the seed light 440. For example, the optical-waveguide splitter 470 may send 10% or less of the output light 472 to output port 2 to produce the LO light 430, and the remaining 90% or more of the output light 472 may be sent to output port 1 to produce the seed light 440.

In particular embodiments, a light source 110 may include one or more discrete optical devices combined with a PIC 455. The discrete optical devices (which may include a seed laser diode 450, a SOA 460, one or more lenses, or one or more optical fibers) may be configured to couple light into the PIC 455 or to receive light emitted from the PIC 455. In the example of FIG. 11, the light source 110 includes a PIC 455, a seed laser diode 450, and a SOA 460. The seed laser diode 450 and the SOA 460 may each be attached or bonded to the PIC 455, or the seed laser diode 450, the SOA 460, and the PIC 455 may be attached to a common substrate. For example, the front face 452 of the seed laser diode 450 may be bonded to the input port of the PIC 455 so that the output light 472 is directly coupled into the input port. As another example, the input end 461 of the SOA 460 may be bonded to the output port 1 of the PIC 455 so that the seed light 440 is directly coupled into the waveguide 463 of the SOA 460. As another example, the light source 110 may include a lens (not illustrated in FIG. 11) attached to or positioned near output port 2, and the lens may collect and collimate the LO light 430. As another example, the light source 110 may include an optical fiber (not illustrated in FIG. 11) attached to or positioned near output port 2, and the LO light 430 may be coupled into the optical fiber, which directs the LO light 430 to a receiver 140.

Figure 12:
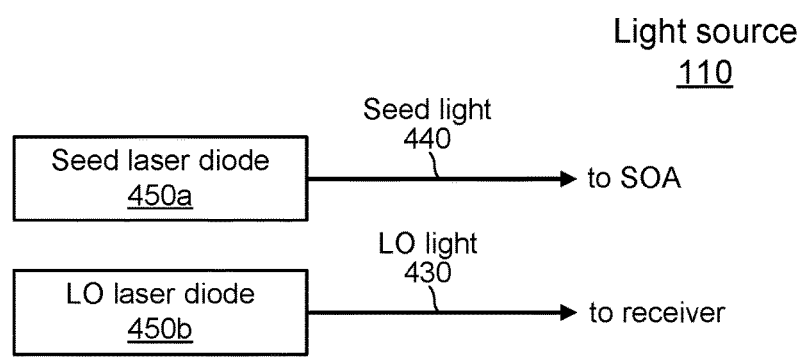
FIG. 12 illustrates an example light source that includes a seed laser diode and a local-oscillator (LO) laser diode.

FIG. 12 illustrates an example light source 110 that includes a seed laser diode 450a and a local-oscillator (LO) laser diode 450b. In particular embodiments, a seed laser of a light source 110 may include a seed laser diode 450a that produces seed light 440 and a LO laser diode 450b that produces LO light 430. Instead of having one laser diode that produces both the seed light 440 and the LO light 430 (e.g., as illustrated in FIGS. 8-11), a light source 110 may include two laser diodes, one to produce the seed light 440 and the other to produce the LO light 430. A light source 110 with two laser diodes may not include an optical splitter 470. Rather, the seed light 440 emitted by the seed laser diode 450a may be coupled to a SOA 460, and the LO light 430 emitted by the LO laser diode 450b may be sent to a receiver 140. For example, the seed laser diode 450a may be butt-coupled to the input end 461 of the SOA 460, and the LO light 430 from the LO laser diode 450b may be coupled into an optical fiber, which may direct the LO light 430 to a receiver 140.

In particular embodiments, a seed laser diode 450a and a LO laser diode 450b may be operated so that the seed light 440 and the LO light 430 have a particular frequency offset. For example, the seed light 440 and the LO light 430 may have an optical frequency offset of approximately 0 Hz, 1 kHz, 1 MHz, 100 MHz, 1 GHz, 2 GHz, 5 GHz, 10 GHz, 20 GHz, or any other suitable frequency offset. An optical frequency f (which may be referred to as a frequency or a carrier frequency) and a wavelength λ may be related by the expression λ·f=c. For example, seed light 440 with a wavelength of 1550 nm corresponds to seed light 440 with an optical frequency of approximately 193.4 terahertz (THz). In some cases herein, the terms wavelength and frequency may be used interchangeably when referring to an optical property of light. For example, LO light 430 having a substantially constant optical frequency may be equivalent to the LO light 430 having a substantially constant wavelength. As another example, LO light 430 having approximately the same wavelength as seed light 440 may also be referred to as the LO light 430 having approximately the same frequency as the seed light 440. As another example, LO light 430 having a particular wavelength offset from seed light 440 may also be referred to as the LO light 430 having a particular frequency offset from the seed light 440. An optical frequency offset (Δf) and a wavelength offset (Δλ) may be related by the expression Δf/f=−Δλ/λ. For example, for seed light 440 with a 1550-nm wavelength, LO light 430 that has a +10-GHz frequency offset from the seed light 440 corresponds to LO light 430 with a wavelength offset of approximately −0.08-nm from the 1550-nm wavelength of the seed light 440 (e.g., a wavelength for the LO light 430 of approximately 1549.92 nm).

In particular embodiments, a seed laser diode 450a or a LO laser diode 450b may be frequency locked so that they emit light having a substantially fixed wavelength or so that there is a substantially fixed frequency offset between the seed light 440 and the LO light 430. Frequency locking a laser diode may include locking the wavelength of the light emitted by the laser diode to a stable frequency reference using, for example, an external optical cavity, an atomic optical absorption line, or light injected into the laser diode. For example, the seed laser diode 450a may be frequency locked (e.g., using an external optical cavity), and some of the light from the seed laser diode 450a may be injected into the LO laser diode 450b to frequency lock the LO laser diode 450 to approximately the same wavelength as the seed laser diode 450a. As another example, the seed laser diode 450a and the LO laser diode 450b may each be separately frequency locked so that the two laser diodes have a particular frequency offset (e.g., a frequency offset of approximately 2 GHz).

Figure 13:
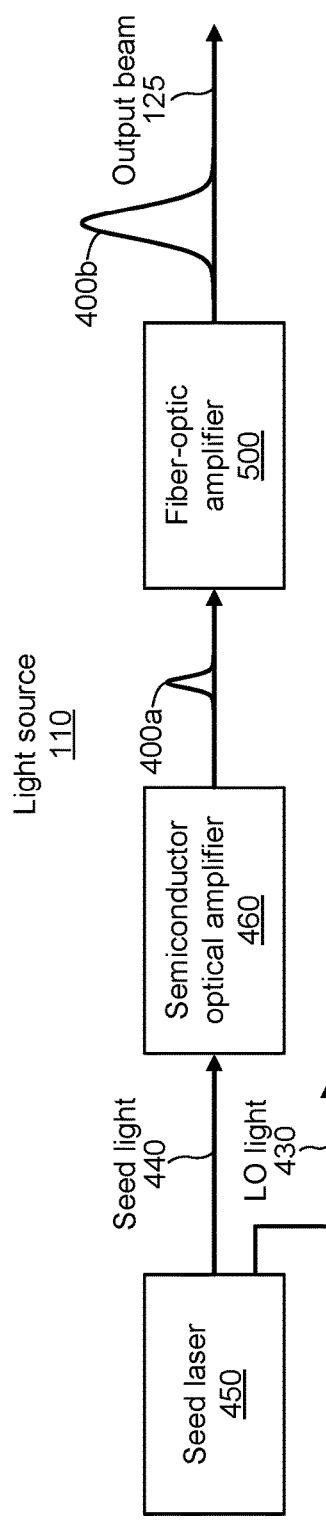
FIG. 13 illustrates an example light source that includes a seed laser, a semiconductor optical amplifier (SOA), and a fiber-optic amplifier.

FIG. 13 illustrates an example light source 110 that includes a seed laser 450, a semiconductor optical amplifier (SOA) 460, and a fiber-optic amplifier 500. In particular embodiments, in addition to a seed laser 450 and a pulsed optical amplifier 460, a light source 110 may also include a fiber-optic amplifier 500 that amplifies pulses of light 400a produced by the pulsed optical amplifier 460. In FIG. 13, the SOA 460 may amplify temporal portions of seed light 440 from the seed laser 450 to produce pulses of light 400a, and the fiber-optic amplifier 500 may amplify the pulses of light 400a from the SOA 460 to produce amplified pulses of light 400b. The amplified pulses of light 400b may be part of a free-space output beam 125 that is sent to a scanner 120 and scanned across a field of regard of a lidar system 100.

A SOA 460 and a fiber-optic amplifier 500 may each have an optical power gain of 10 dB, 15 dB, 20 dB, 25 dB, 30 dB, 35 dB, 40 dB, or any other suitable optical power gain. In the example of FIG. 13, the SOA 460 may have a gain of 30 dB, and the fiber-optic amplifier 500 may have a gain of 20 dB, which corresponds to an overall gain of 50 dB. A temporal portion of seed light 440 with an energy of 5 pJ may be amplified by the SOA 460 (with a gain of 30 dB) to produce a pulse of light 400a with an energy of approximately 5 nJ. The fiber-optic amplifier 500 may amplify the 5-nJ pulse of light 400a by 20 dB to produce an output pulse of light 400b with an energy of approximately 0.5 μJ. The seed laser 450 in FIG. 13 produces seed light 440 and LO light 430. The seed light 440 may be emitted from a front face 452 of a seed laser diode 450, and the LO light 430 may be emitted from a back face 451 of the seed laser diode 450. Alternatively, the light source 110 may include a splitter 470 that splits seed-laser output light 472 to produce the seed light 440 and the LO light 430.

Figure 14:
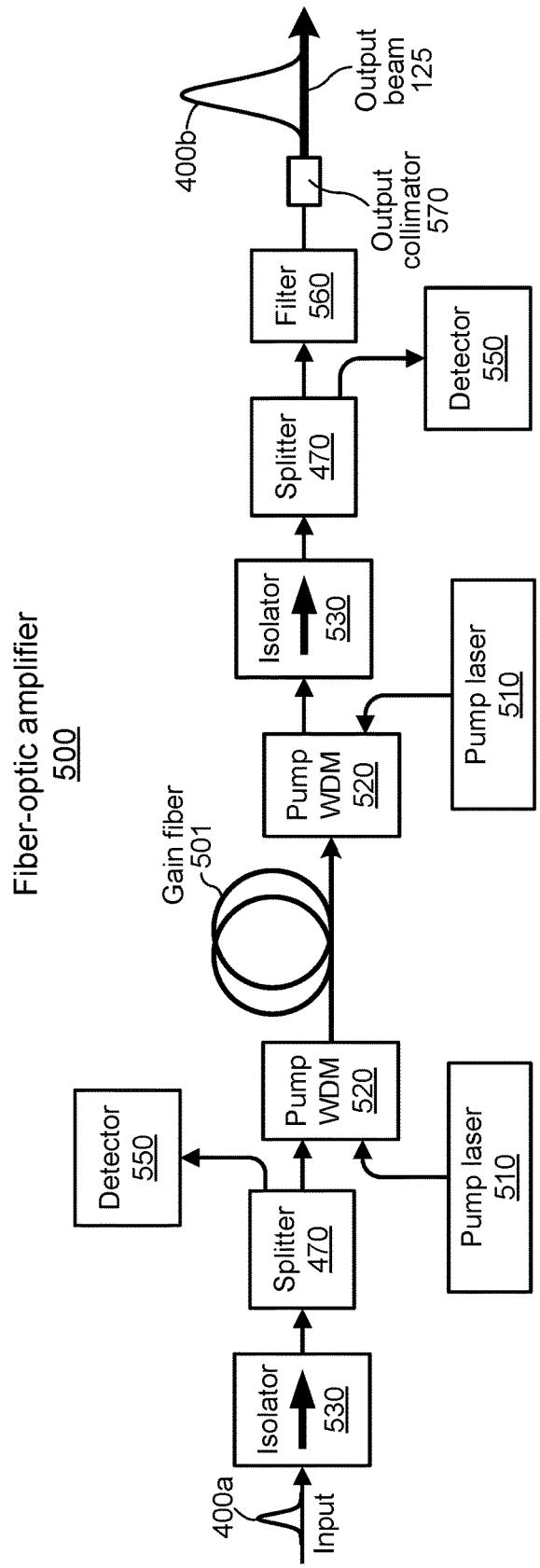
FIG. 14 illustrates an example fiber-optic amplifier.

FIG. 14 illustrates an example fiber-optic amplifier 500. In particular embodiments, a light source 110 of a lidar system 100 may include a fiber-optic amplifier 500 that amplifies pulses of light 400a produced by a SOA 460 to produce an output beam 125 with amplified pulses of light 400b. A fiber-optic amplifier 500 may be terminated by a lens (e.g., output collimator 570) that produces a collimated free-space output beam 125 which may be directed to a scanner 120. In particular embodiments, a fiber-optic amplifier 500 may include one or more pump lasers 510, one or more pump WDMs 520, one or more optical gain fibers 501, one or more optical isolators 530, one or more optical splitters 470, one or more detectors 550, one or more optical filters 560, or one or more output collimators 570.

A fiber-optic amplifier 500 may include an optical gain fiber 501 that is optically pumped (e.g., provided with energy) by one or more pump lasers 510. The optically pumped gain fiber 501 may provide optical gain to each input pulse of light 400a while propagating through the gain fiber 501. The pump-laser light may travel through the gain fiber 501 in the same direction (co-propagating) as the pulse of light 400a or in the opposite direction (counter-propagating). The fiber-optic amplifier 500 in FIG. 14 includes one co-propagating pump laser 510 on the input side of the amplifier 500 and one counter-propagating pump laser 510 on the output side. A pump laser 510 may produce light at any suitable wavelength to provide optical excitation to the gain material of gain fiber 501 (e.g., a wavelength of approximately 808 nm, 810 nm, 915 m, 940 nm, 960 nm, 976 nm, or 980 nm). A pump laser 510 may be operated as a CW light source and may produce any suitable amount of average optical pump power, such as for example, approximately 1 W, 2 W, 5 W, 10 W, or 20 W of pump power. The pump-laser light from a pump laser 510 may be coupled into gain fiber 501 via a pump wavelength-division multiplexer (WDM) 520. A pump WDM 520 may be used to combine or separate pump light and the pulses of light 400a that are amplified by the gain fiber 501.

The fiber-optic core of a gain fiber 501 may be doped with a gain material that absorbs pump-laser light and provides optical gain to pulses of light 400a as they propagate along the gain fiber 501. The gain material may include rare-earth ions, such as for example, erbium ($Er^{3+}$), ytterbium ($Yb^{3+}$), neodymium ($Nd^{3+}$), praseodymium ($Pr^{3+}$), holmium ($Ho^{3+}$), thulium ($Tm^{3+}$), dysprosium ($Dy^{3+}$), or any other suitable rare-earth element, or any suitable combination thereof. For example, the gain fiber 501 may include a core doped with erbium ions or with a combination of erbium and ytterbium ions. The rare-earth dopants absorb pump-laser light and are "pumped" or promoted into excited states that provide amplification to the pulses of light 400a through stimulated emission of photons. The rare-earth ions in excited states may also emit photons through spontaneous emission, resulting in the production of amplified spontaneous emission (ASE) light by the gain fiber 501.

A gain fiber 501 may include a single-clad or multi-clad optical fiber with a core diameter of approximately 6 μm, 7 μm, 8 μm, 9 μm, 10 μm, 12 μm, 20 μm, 25 μm, or any other suitable core diameter. A single-clad gain fiber 501 may include a core surrounded by a cladding material, and the pump light and the pulses of light 400a may both propagate substantially within the core of the gain fiber 501. A multi-clad gain fiber 501 may include a core, an inner cladding surrounding the core, and one or more additional cladding layers surrounding the inner cladding. The pulses of light 400a may propagate substantially within the core, while the pump light may propagate substantially within the inner cladding and the core. The length of gain fiber 501 in an amplifier 500 may be approximately 0.5 m, 1 m, 2 m, 4 m, 6 m, 10 m, 20 m, or any other suitable gain-fiber length.

A fiber-optic amplifier 500 may include one or more optical filters 560 located at the input or output side of the amplifier 500. An optical filter 560 (which may include an absorptive filter, dichroic filter, long-pass filter, short-pass filter, band-pass filter, notch filter, Bragg grating, or fiber Bragg grating) may transmit light over a particular optical pass-band and substantially block light outside of the pass-band. The optical filter 560 in FIG. 14 is located at the output side of the amplifier 500 and may reduce the amount of ASE from the gain fiber 501 that accompanies the output pulses of light 400b. For example, the filter 560 may transmit light at the wavelength of the pulses of light 400a (e.g., 1550 nm) and may attenuate light at wavelengths away from a 5-nm pass-band centered at 1550 nm.

A fiber-optic amplifier 500 may include one or more optical isolators 530. An isolator 530 may reduce or attenuate backward-propagating light, which may destabilize or cause damage to a seed laser diode 450, SOA 460, pump laser 510, or gain fiber 501. The isolators 530 in FIG. 14 may allow light to pass in the direction of the arrow drawn in the isolator and block light propagating in the reverse direction. Backward-propagating light may arise from ASE light from gain fiber 501, counter-propagating pump light from a pump laser 510, or optical reflections from one or more optical interfaces of a fiber-optic amplifier 500. An optical isolator 530 may prevent the destabilization or damage associated with backward-propagating light by blocking most of the backward-propagating light (e.g., by attenuating backward-propagating light by greater than or equal to 5 dB, 10 dB, 20 dB, 30 dB, 40 dB, 50 dB, or any other suitable attenuation value).

A fiber-optic amplifier 500 may include one or more optical splitters 470 and one or more detectors 550. A splitter 470 may split off a portion of light (e.g., approximately 0.1%, 0.5%, 1%, 2%, or 5% of light received by the splitter 470) and direct the split off portion to a detector 550. In FIG. 14, each splitter 470 may split off and send approximately 1% of each pulse of light (400a or 400b) to a detector 550. One or more detectors 550 may be used to monitor the performance or health of a fiber-optic amplifier 500. If an electrical signal from a detector 550 drops below a particular threshold level, then a controller 150 may determine that there is a problem with the amplifier 500 (e.g., there may be insufficient optical power in the input pulses of light 400a or a pump laser 510 may be failing). In response to determining that there is a problem with the amplifier 500, the controller 150 may shut down or disable the amplifier 500, shut down or disable the lidar system 100, or send a notification that the lidar system 100 is in need of service or repair.

In particular embodiments, a fiber-optic amplifier 500 may include an input optical fiber configured to receive input pulses of light 400a from a SOA 460. The input optical fiber may be part of or may be coupled or spliced to one of the components of the fiber-optic amplifier 500. For example, pulses of light 400a may be coupled into an optical fiber which is spliced to an input optical fiber of the isolator 530 located at the input to the amplifier 500. As another example, the pulses of light 400a from a SOA 460 may be part of a free-space beam that is coupled into an input optical fiber of fiber-optical amplifier 500 using one or more lenses. As another example, an input optical fiber of fiber-optic amplifier 500 may be positioned at or near the output end 462 of a SOA 460 so that the pulses of light 400a are directly coupled from the SOA 460 into the input optical fiber.

In particular embodiments, the optical components of a fiber-optic amplifier 500 may be free-space components, fiber-coupled components, or a combination of free-space and fiber-coupled components. As an example, each optical component in FIG. 14 may be a free-space optical component or a fiber-coupled optical component. As another example, the input pulses of light 400a may be part of a free-space optical beam, and the isolator 530, splitter 470, and pump WDM 520 located on the input side of the amplifier 500 may each be free-space optical components. Additionally, the light from the pump laser 510 on the input side may be a free-space beam that is combined with the input pulses of light 400a by the pump WDM 520 on the input side, and the combined pump-seed light may form a free-space beam that is coupled into the gain fiber 501 via one or more lenses.

Figure 15:
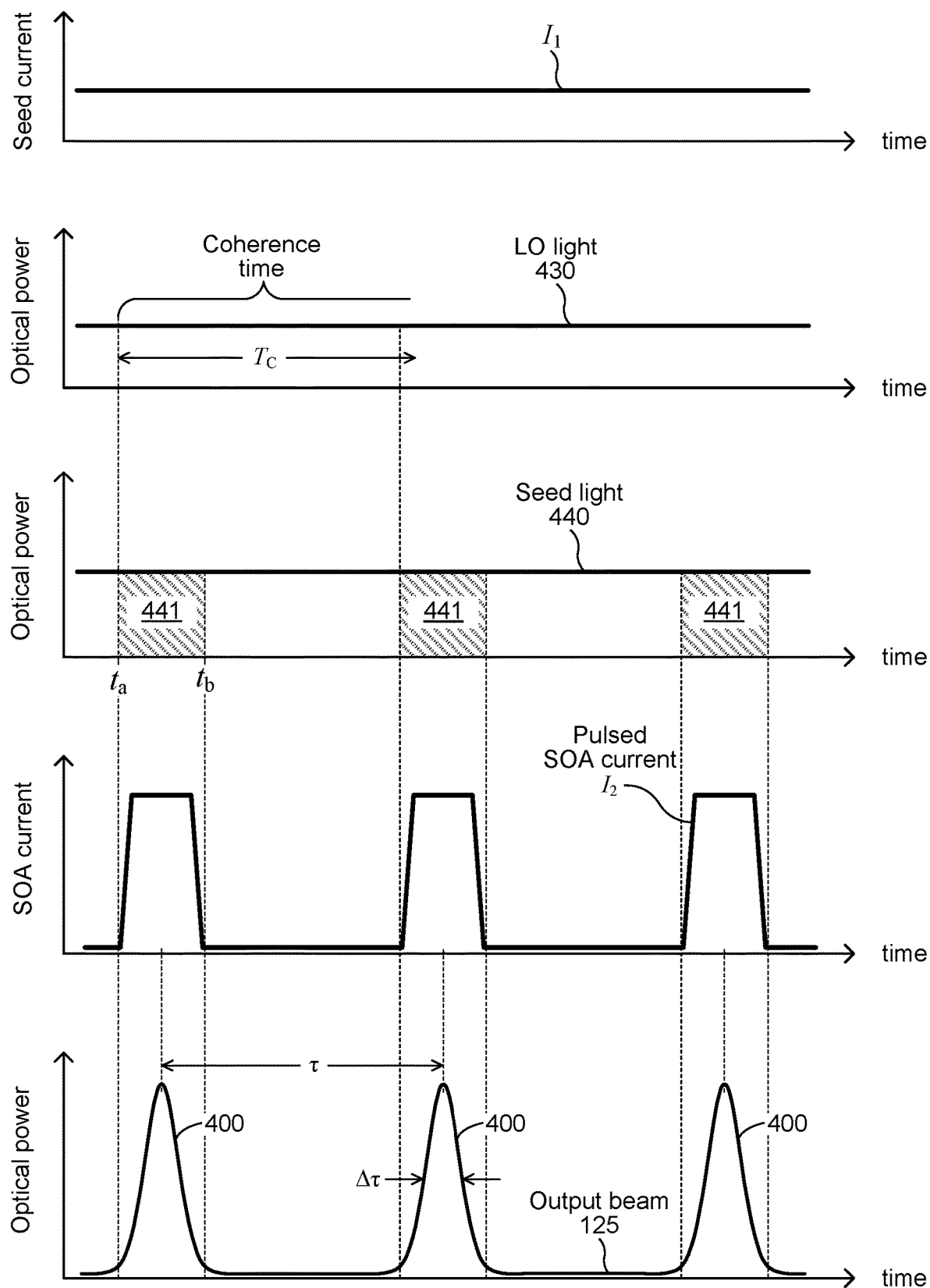
FIG. 15 illustrates example graphs of seed current ($I_1$), LO light, seed light, pulsed SOA current ($I_2$), and emitted optical pulses.

FIG. 15 illustrates example graphs of seed current ($I_1$), LO light 430, seed light 440, pulsed SOA current ($I_2$), and emitted optical pulses 400. Each of the parameters ($I_1$, LO light 430, seed light 440, $I_2$, and emitted optical pulses 400) in FIG. 15 is plotted versus time. The graph of seed current $I_1$ corresponds to a substantially constant DC electrical current that is supplied to a seed laser diode 450. Based on the DC electrical current $I_1$, the LO light 430 and seed light 440 produced by the seed laser diode 450 may each include CW light or light having a substantially constant optical power, as represented by the graphs of LO light 430 and seed light 440 in FIG. 15. For example, the LO light 430 may have a substantially constant average optical power of approximately 1 µW, 10 µW, 100 µW, 1 mW, 10 mW, 20 mW, 50 mW, or any other suitable average optical power. As another example, the seed light 440 may have a substantially constant average optical power of approximately 1 mW, 10 mW, 20 mW, 50 mW, 100 mW, 200 mW or any other suitable average optical power. As another example, the LO light 430 may have a substantially constant optical power of approximately 10 µW, and the seed light 440 may have a substantially constant optical power of approximately 100 mW. The LO light 430 or the seed light 440 having a substantially constant optical power may correspond to the optical power being substantially constant over particular time interval (e.g., a time interval greater than or equal to the pulse period τ, the coherence time $T_c$, or the time interval $t_b-t_a$). For example, the power of the LO light 430 may vary by less than ±1%, ±2%, or ±5% over a time interval greater than or equal to the pulse period τ.

In particular embodiments, CW light may refer to light having a substantially fixed or stable optical frequency or wavelength over a particular time interval (e.g., over pulse period τ, over coherence time $T_c$, or over the time interval $t_b-t_a$). Light with a substantially fixed or stable optical frequency may refer to light having a variation in optical frequency over a particular time interval of less than or equal to ±0.1%, ±0.01%, ±0.001%, ±0.0001%, ±0.00001%, ±0.000001%, or any other suitable variation. For example, if LO light 430 with a 1550-nm wavelength (which corresponds to an optical frequency of approximately 193.4 THz) has a frequency variation of less than or equal to ±0.000001% over a particular time interval, then the frequency of the LO light 430 may vary by less than or equal to approximately ±1.94 MHz over the time interval.

In particular embodiments, the average optical power for LO light 430 may be set to a particular value based at least in part on a saturation value of a receiver 140. For example, a seed laser 450 may be configured to emit LO light 430 having an average optical power that is less than a saturation value of a receiver 140 (e.g., less than a saturation value of a detector 340 or an amplifier 350 of the receiver 140). If a receiver 140 receives an input optical signal (e.g., combined beam 422) that exceeds an optical-power saturation value of the detector 340, then the detector 340 may saturate or produce a photocurrent i that is different from or distorted with respect to the input optical signal. A detector 340 may saturate with an input optical power of approximately 0.1 mW, 0.5 mW, 1 mW, 5 mW, 10 mW, 20 mW, or 100 mW. If an amplifier 350 of a receiver 140 receives an input photocurrent i that exceeds an electrical-current saturation value, then the amplifier 350 may saturate or produce a voltage signal 360 that is different from or distorted with respect to the photocurrent signal i. To prevent saturation of the detector 340 or amplifier 350, the optical power of the input beam 135 or of the LO light 430 may be selected to be below a saturation power of the receiver 140. For example, a detector 340 may saturate with an input optical power of 10 mW, and to prevent the detector 340 from saturating, the optical power of a combined beam 422 may be limited to less than 10 mW. In particular embodiments, a limit may be applied to the average power of the LO light 430 to prevent saturation. For example, a detector 340 may saturate with an average optical power of 1 mW, and to prevent the detector 340 from saturating, the average optical power of LO light 430 that is sent to the detector 340 may be configured to be less than 1 mW. As another example, the average optical power of the LO light 430 may be set to a value between 1 μW and 100 μW to prevent saturation effects in a detector 340.

In particular embodiments, the average optical power of LO light 430 may be configured by adjusting or setting (i) an amount of seed current $I_1$ supplied to a seed laser diode 450, (ii) a reflectivity of the back face 451 of the seed laser diode 450, (iii) a reflectivity of a free-space splitter 470, or (iv) an amount of light split off by a fiber-optic or optical-waveguide splitter 470. In the example of FIG. 8 or FIG. 9, the seed current $I_1$ and the reflectivity of the back face 451 of the seed laser diode 450 may be configured so that the average optical power of the LO light 430 is set to a particular value (e.g., a value between 10 μW and 100 μW). In the example of FIG. 10, the seed current $I_1$ and the reflectivity of the splitter 470 may be configured so that the average optical power of the LO light 430 is set to a particular value (e.g., a value below 10 mW). In the example of FIG. 11, the seed current supplied to the seed laser diode 450 and the amount of light split off to output port 2 by the optical-waveguide splitter 470 may be configured so that the average optical power of the LO light 430 is set to a particular value (e.g., a value below 1 mW).

In FIG. 15, the hatched regions 441 of the seed light 440 correspond to temporal portions of the seed light 440 that are amplified by a SOA 460. The SOA current $I_2$ includes pulses of electrical current, and each pulse of current may cause the SOA 460 to amplify a corresponding temporal portion 441 of the seed light 440 to produce an emitted pulse of light 400. A temporal portion 441 of seed light 440 may refer to a portion of the seed light 440 located in a particular interval of time over which a pulse of current $I_2$ is applied to a SOA 460. For example, the portion of seed light 440 located in the time interval between times $t_a$ and $t_b$ in FIG. 15 corresponds to one temporal portion 441 of the seed light 440. The corresponding pulse of SOA current between the times $t_a$ and $t_b$ results in the amplification of the temporal portion 441 and the emission of a pulse of light 400. The duration of a temporal portion 441 (e.g., as represented by $t_b-t_a$) or the duration of a SOA current pulse may be approximately 0.5 ns, 1 ns, 2 ns, 5 ns, 10 ns, 20 ns, 50 ns, 100 ns, or any other suitable duration.

Each emitted pulse of light 400 in FIG. 15 may include a temporal portion 441 of seed light 440 that is amplified by a SOA 460, and during the time period between successive pulses of SOA current $I_2$, the seed light 440 may be substantially absorbed by the SOA 460. The emitted pulses of light 400 are part of an output beam 125 and have a pulse duration of Δτ and a pulse period of τ. For example, the emitted pulses of light 400 may have a pulse period of approximately 100 ns, 200 ns, 500 ns, 1 μs, 2 μs, 5 μs, 10 μs, or any other suitable pulse period. As another example, the emitted pulses of light 400 may have a pulse duration of 1-10 ns and a pulse period of 0.5-2.0 μs. In particular embodiments, when a current pulse is applied to a SOA 460, there may be a time delay until the optical gain of the SOA 460 builds up to exceed the optical loss of the SOA 460. As a result, the pulse duration Δτ of an emitted pulse of light 400 may be less than or equal to the duration of a corresponding pulse of SOA current $I_2$. For example, a SOA current pulse with a duration of 8 ns may produce an emitted pulse of light 400 with a duration of 6 ns. In the example of FIG. 15, the emitted pulses of light 400 may have a duration of approximately 5 ns, and the SOA current pulses may have a duration (e.g., as represented by $t_b-t_a$) of approximately 5 ns to 10 ns.

Figure 16:
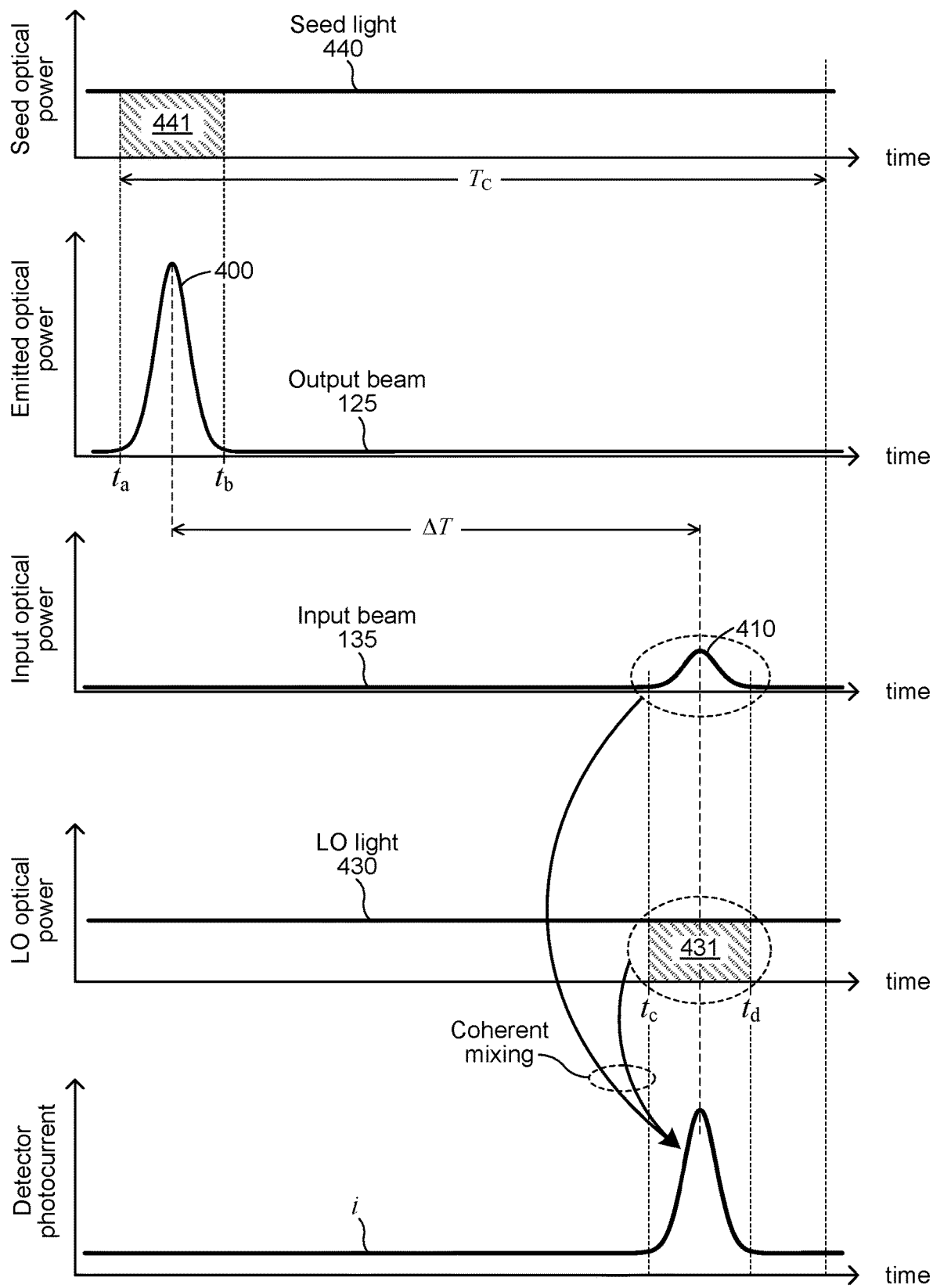
FIG. 16 illustrates example graphs of seed light, an emitted optical pulse, a received optical pulse, LO light, and detector photocurrent.

FIG. 16 illustrates example graphs of seed light 440, an emitted optical pulse 400, a received optical pulse 410, LO light 430, and detector photocurrent i. Each of the parameters (seed light 440, emitted optical pulse 400, received optical pulse 410, LO light 430, and photocurrent i) in FIG. 15 is plotted versus time. The seed light 440 may include CW light or light having a substantially constant optical power, and the temporal portion 441 of the seed light 440 may be amplified by a SOA 460 to produce the emitted pulse of light 400. The emitted pulse of light 400 is part of output beam 125, and the received pulse of light 410 is part of input beam 135. The received pulse of light 410, which is received a time interval ΔT after the pulse of light 400 is emitted, may include light from the emitted optical pulse 400 that is scattered by a target 130. The distance D from the lidar system 100 to the target 130 may be determined from the expression D=c·ΔT/2.

In particular embodiments, a received pulse of light 410 and LO light 430 may be combined and coherently mixed together at one or more detectors 340 of a receiver 140. Each detector 340 may produce a photocurrent signal i that corresponds to coherent mixing of the received pulse of light 410 and the LO light 430. In FIG. 16, the received pulse of light 410 is coherently mixed with a temporal portion 431 of the LO light 430 to produce a corresponding pulse of detector photocurrent i. A temporal portion 431 of LO light 430 may refer to a portion of the LO light 430 that is coincident with a received pulse of light 410. In FIG. 16, temporal portion 431 and the received pulse of light 410 are each located in the time interval between times $t_c$ and $t_d$. The coherent mixing of the pulse of light 410 and the temporal portion 431 may occur at a detector 340 of the receiver 140, and the detector 340 may produce a pulse of detector photocurrent i in response to the coherent mixing. Coherent mixing of two optical signals (e.g., a received pulse of light 410 and LO light 430) may be referred to as optical mixing, mixing, optical interfering, coherent combining, coherent detection, homodyne detection, or heterodyne detection.

In particular embodiments, coherent mixing may occur when two optical signals that are coherent with one another are optically combined and then detected by a detector 340. If two optical signals can be coherently mixed together, the two optical signals may be referred to as being coherent with one another. Two optical signals being coherent with one another may include two optical signals (i) that have approximately the same optical frequency, (ii) that have a particular optical frequency offset (Δf), or (iii) that each have a substantially fixed or stable optical frequency over a particular period of time. For example, seed light 440 and LO light 430 in FIG. 16 may be coherent with one another since they may have approximately the same optical frequency or each of their frequencies may be substantially fixed over a time period approximately equal to coherence time $T_c$. As another example, the emitted pulse of light 400 and the temporal portion 431 of LO light 430 in FIG. 16 may be coherent with one another. And since the received pulse of light 410 may include a portion of the emitted pulse of light 400, the received pulse of light 410 and the temporal portion 431 may also be coherent with one another.

In particular embodiments, if two optical signals each have a stable frequency over a particular period of time, then the two optical signals may be (i) optically combined together and (ii) coherently mixed at a detector 340. Optically combining two optical signals (e.g., an input beam 135 and LO light 430) may refer to combining two optical signals so that their respective electric fields are summed together. Optically combining two optical signals may include overlapping the two optical signals (e.g., with an optical combiner 420) so that they are substantially coaxial and travel together in the same direction and along approximately the same optical path. Alternatively, optically combining two optical signals may include directing the two optical signals to a detector 340 (e.g., without using an optical combiner) so that the two optical signals overlap at or within the detector 340. Additionally, optically combining two optical signals may include overlapping the two optical signals so that at least a portion of their respective polarizations have the same orientation. Once the two optical signals are optically combined, they may be coherently mixed at a detector 340, and the detector 340 may produce a photocurrent signal i corresponding to the summed electrical fields of the two optical signals.

In particular embodiments, a portion of seed light 440 may be coherent with a portion of LO light 430. For example, LO light 430 and seed light 440 may be coherent with one another over a time period approximately equal to the coherence time $T_c$. In each of FIGS. 8-11, the LO light 430 and the seed light 440 may be coherent with one another since the two optical signals are derived from the same seed laser diode 450. In FIG. 12, the LO light 430 and the seed light 440 may be coherent with one another since the two optical signals may have a particular frequency offset. In FIG. 16, the temporal portion 441 of the seed light 440 may be coherent with the temporal portion 431 of the LO light 430. Additionally, the temporal portion 441 may be coherent with any portion of the LO light 430 extending over at least the time interval $\Delta T$ or $T_c$ (e.g., from approximately time $t_a$ to at least time $t_d$). The coherence time $T_c$ may correspond to a time over which light emitted by a seed laser diode 450 is coherent (e.g., the emitted light may have a substantially fixed or stable frequency over a time interval of $T_c$). The coherence length $L_c$ is the distance over which the light from a seed laser diode 450 is coherent, and the coherence time and coherence length may be related by the expression $L_c = c \cdot T_c$. For example, a seed laser diode 450 may have a coherence length of approximately 500 m, which corresponds to a coherence time of approximately 1.67 µs. The seed light 440 and LO light 430 emitted by a seed laser diode 450 may have a coherence length of approximately 1 m, 10 m, 50 m, 100 m, 300 m, 500 m, 1 km, or any other suitable coherence length. Similarly, the seed light 440 and LO light 430 may have a coherence time of approximately 3 ns, 30 ns, 150 ns, 300 ns, 1 µs, 1.5 µs, 3 µs, or any other suitable coherence time.

In particular embodiments, each emitted pulse of light 400 may be coherent with a corresponding temporal portion of LO light 430. In FIG. 16, the corresponding portion of the LO light 430 may include any portion of the LO light 430 (including temporal portion 431) extending from approximately time $t_a$ to at least time $t_d$, and the emitted pulse of light 400 may be coherent with any portion of the LO light 430 from time $t_a$ to time $t_d$. In FIG. 15, each emitted pulse of light 400 may be coherent with the LO light 430 over a time period from when the pulse of light 400 is emitted until at least a time τ (the pulse period) after the pulse is emitted. Similarly, in each of FIGS. 8-11, the emitted pulse of light 400 may be coherent with the LO light 430 for at least a time τ after the pulse 400 is emitted. In FIG. 13, the fiber-optic amplifier 500 may preserve the coherence of the pulse of light 400*a*, and the emitted pulse of light 400*b* may be coherent with the LO light 430 for at least a time τ after the pulse 400*b* is emitted.

In particular embodiments, each emitted pulse of light 400 may include a temporal portion 441 of the seed light 440 that is amplified by a SOA 460, and the amplification process may be a coherent amplification process that preserves the coherence of the temporal portion 441. Since the temporal portion 441 may be coherent with a corresponding portion of the LO light 430, the emitted pulse of light 400 may also be coherent with the same portion of the LO light 430. An emitted pulse of light 400 being coherent with a corresponding portion of LO light 430 may correspond to temporal portion 441 being coherent with the corresponding portion of the LO light 430. In the example of FIG. 16, the temporal portion 441 may be coherent with the LO light 430 over at least the time interval $\Delta T$ or $T_c$ (e.g., from approximately time $t_a$ to at least time $t_d$). Since the emitted pulse of light 400 may be coherent with the temporal portion 441, the emitted pulse of light 400 may also be coherent with any portion of the LO light 430 (including the temporal portion 431) from approximately time $t_a$ until at least time $t_d$. An emitted pulse of light 400 being coherent with any portion of LO light 430 in the time period from time $t_a$ until at least time $t_a$ indicates that the emitted pulse of light 400 may be coherently mixed with any portion of the LO light 430 (including the temporal portion 431) over this same time period. The received pulse of light 410 includes light from the emitted pulse of light 400 (e.g., light from the emitted pulse of light 400 that is scattered by a target 130), and so the received pulse of light 410 may be coherent with the emitted pulse of light 400. Based on this, the received pulse of light 410 may also be coherently mixed with any portion of the LO light 430 over the $t_a$ to $t_a$ time period.

In particular embodiments, an emitted pulse of light 400 being coherent with a corresponding portion of LO light 430 may correspond to the LO light 430 having a coherence length greater than or equal to $2 \times D_{OP}$, where $D_{OP}$ is an operating distance of the lidar system 100. The coherence length $L_c$ being greater than or equal to $2 \times D_{OP}$ corresponds to the coherence time $T_c$ being greater than or equal to $2 \times D_{OP}/c$. Since the quantity $2 \times D_{OP}/c$ may be approximately equal to the pulse period τ, the coherence length $L_c$ being greater than or equal to $2 \times D_{OP}$ may correspond to the coherence time $T_c$ being greater than or equal the pulse period τ. The LO light 430 and the seed light 440 may be coherent with one another over the coherence time $T_c$, which corresponds to the temporal portion 441 in FIG. 16 being coherent with the LO light 430 over the coherence time $T_c$. Similarly, the emitted pulse of light 400, which includes the temporal portion 441 amplified by the SOA 460, may be coherent with the LO light 430 over the coherence time $T_c$. If the coherence length of the LO light 430 is greater than or equal to $2 \times D_{OP}$ (or, if $T_c$ is greater than or equal to τ), then an emitted pulse of light 400 may be coherent with any portion of the LO light 430 (including the temporal portion 431) from a time when the pulse of light 400 is emitted until at least a time τ after the pulse is emitted. This indicates that a received pulse of light 410 (which includes light from the emitted pulse of light 400 scattered from a target 130) may be coherently mixed with the LO light 430 as long as the distance D to the target 130 is within the operating distance of the lidar system 100 (e.g., $D \leq D_{OP}$).

In particular embodiments, each emitted pulse of light 400 may be coherent with a corresponding portion of LO light 430, and the corresponding portion of the LO light 430 may include temporal portion 431 of the LO light 430. The temporal portion 431 represents the portion of the LO light 430 that is detected by a receiver 140 at the time when the received pulse of light 410 is detected by the receiver 140. In FIG. 16, the temporal portion 431 is coincident with the received pulse of light 410, and both optical signals are located between times $t_c$ and $t_d$. Since the received pulse of light 410 includes scattered light from the emitted pulse of light 400, the received pulse of light 410 may be coherent with the temporal portion 431 of the LO light 430. The received pulse of light 410 and the temporal portion 431 may be coherently mixed together at a detector 340 of the receiver, and the coherent mixing may result in a pulse of detector photocurrent i, as illustrated in FIG. 16.

In particular embodiments, a received pulse of light 410 may be coherent with a temporal portion 431 of LO light 430. In FIG. 16, the received pulse of light 410 and the temporal portion 431, which are coherently mixed together, are coherent with one another. In particular embodiments, the coherent mixing of a received pulse of light 410 and a temporal portion 431 may not require that the coherence time $T_c$ associated with seed light 440 or LO light 430 be greater than or equal to the pulse period τ. For example, the received pulse of light 410 and the temporal portion 431 may be coherently mixed even if the coherence time is less than ΔT or less than the pulse period τ. Coherent mixing may occur if the coherence time $T_c$ associated with the seed light 440 or the LO light 430 is greater than or equal to the duration of the received pulse of light 410 or the duration of the temporal portion 431. If a received pulse of light 410 and a temporal portion 431 each has a substantially fixed or stable frequency over at least the duration of the temporal portion 431, then the received pulse of light 410 and the temporal portion 431 may be coherently mixed together. As long as the received pulse of light 410 and the temporal portion 431 each has an optical frequency that is substantially fixed or stable over the duration of the pulse of light 410 or over the duration of the temporal portion 431, then the two optical signals may be coherently mixed together. In the example of FIG. 16, the received pulse of light 410 and the temporal portion 431 may be coherent over the duration of the temporal portion 431 (e.g., the coherence time $T_c$ may be greater than or equal to $t_d - t_c$), and their electric fields may be coherently combined (e.g., summed together) and coherently mixed together.

Figure 17:
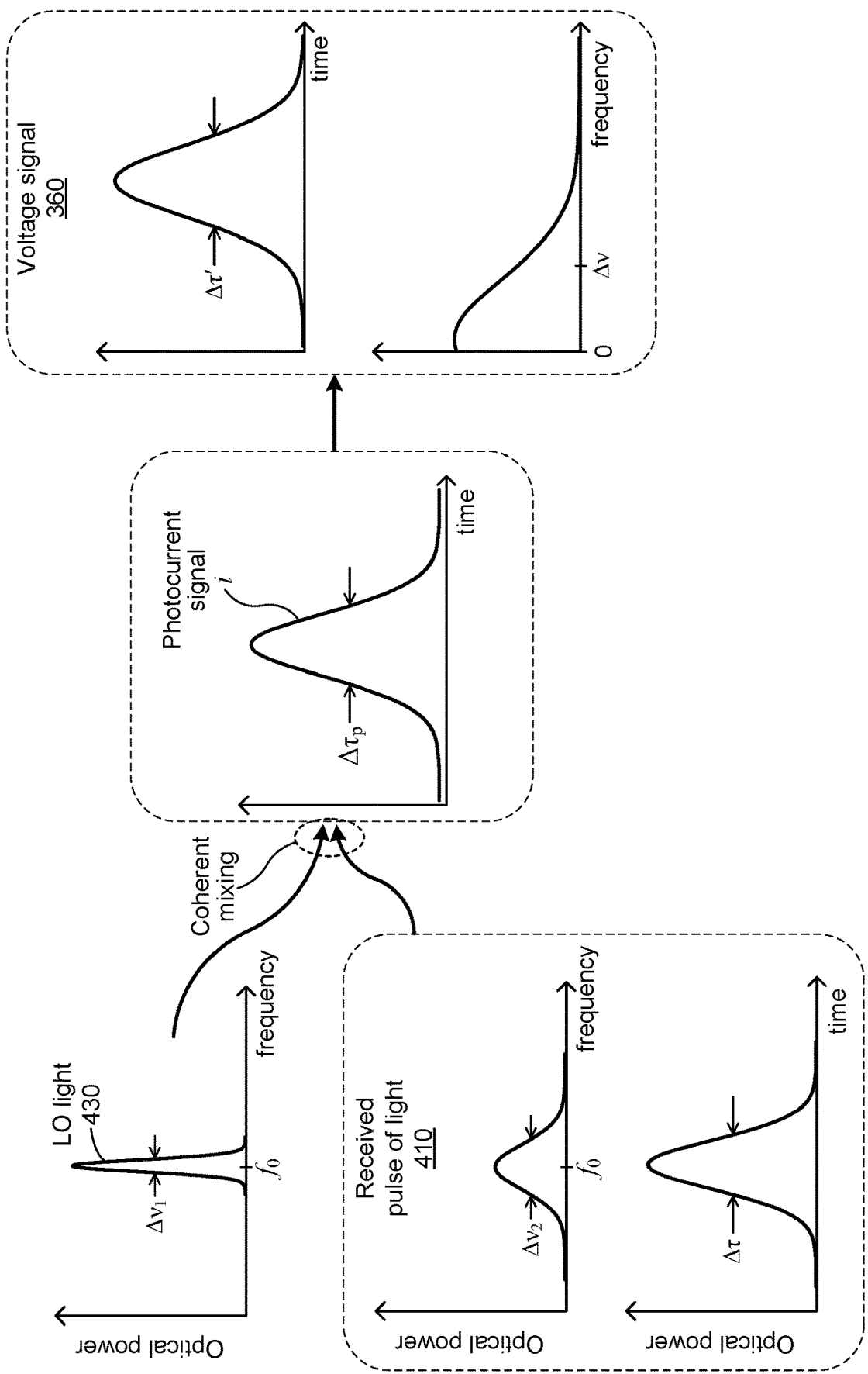
FIG. 17 illustrates an example voltage signal that results from coherent mixing of LO light and a received pulse of light.

FIG. 17 illustrates an example voltage signal 360 that results from coherent mixing of LO light 430 and a received pulse of light 410. The optical spectrum of the LO light 430 is represented by a frequency-domain graph that illustrates relative optical power versus optical frequency. The LO light 430 has a center optical frequency of $f_0$ and a relatively narrow spectral linewidth of $\Delta v_1$. For example, the optical frequency $f_0$ may be approximately 199.2 THz (corresponding to a wavelength of approximately 1505 nm), and the spectral linewidth $\Delta v_1$ may be approximately 2 MHz. The upper frequency-domain graph of the received pulse of light 410 indicates that the received pulse of light 410 has an optical spectrum with approximately the same center frequency $f_0$ and a broader spectral linewidth of $\Delta v_2$. The lower time-domain graph indicates that the received pulse of light 410 has a duration of Δτ. The coherent mixing of the LO light 430 and the received pulse of light 410 at a detector 340 results in a pulse of photocurrent with a duration of $\Delta \tau_p$. The photocurrent signal i may be amplified by an amplifier 350 that produces a corresponding voltage signal 360. The upper voltage-signal graph illustrates the voltage signal 360 in the time domain and includes a pulse of voltage with a duration of Δτ'. The lower voltage-signal graph in FIG. 17 is a frequency-domain graph of the voltage signal 360 that indicates that the voltage signal 360 has an electrical bandwidth of Δv.

A pulse duration (Δτ) and spectral linewidth ($\Delta v_2$) of a pulse of light may have an inverse relationship where the product $\Delta \tau \cdot \Delta v_2$ (which may be referred to as a time-bandwidth product) is equal to a constant value. For example, a pulse of light with a Gaussian temporal shape may have a time-bandwidth product equal to a constant value that is greater than or equal to 0.441. If a Gaussian pulse has a time-bandwidth product that is approximately equal to 0.441, then the pulse may be referred to as a transform-limited pulse. For a transform-limited Gaussian pulse, the pulse duration (Δτ) and spectral linewidth ($\Delta v_2$) may be related by the expression $\Delta \tau \cdot \Delta v_2 = 0.441$. The inverse relationship between pulse duration and spectral linewidth indicates that a shorter-duration pulse has a larger spectral linewidth (and vice versa). For example, the received pulse of light 410 in FIG. 17 may be a transform-limited Gaussian pulse with (i) a pulse duration Δτ of 2 ns and a spectral linewidth $\Delta v_2$ of approximately 220 MHz or (ii) a pulse duration Δτ of 4 ns and a spectral linewidth $\Delta v_2$ of approximately 110 MHz. This inverse relationship between pulse duration and spectral linewidth results from the Fourier-transform relationship between time-domain and frequency-domain representations of a pulse. If a Gaussian pulse of light has a time-bandwidth product that is greater than 0.441, then the pulse of light may be referred to as a non-transform-limited pulse of light. For example, the received pulse of light 410 in FIG. 17 may be a non-transform-limited pulse of light with a time-bandwidth product of 1, and the received pulse of light 410 may have (i) a pulse duration Δτ of 2 ns and a spectral linewidth $\Delta v_2$ of approximately 500 MHz or (ii) a pulse duration Δτ of 4 ns and a spectral linewidth $\Delta v_2$ of approximately 250 MHz.

The duration $\Delta \tau_p$ of a pulse of photocurrent may be greater than or equal to the duration Δτ of the corresponding received pulse of light 410. For example, due at least in part to the finite temporal response of a detector 340, the pulse of photocurrent may have a somewhat longer rise time, fall time, or duration (e.g., a 0% to 20% longer rise time, fall time, or duration) than the received pulse of light 410. Similarly, the duration Δτ' of a voltage pulse may be greater than or equal to the duration $\Delta \tau_p$ of the corresponding pulse of photocurrent. For example, due at least in part to electrical-bandwidth limitations of an electronic amplifier 350, the pulse of voltage may have a somewhat longer rise time, fall time, or duration (e.g., a 0% to 20% longer rise time, fall time, or duration) than the pulse of photocurrent. In FIG. 17, the received pulse of light may have a duration Δτ of approximately 5 ns, the pulse of photocurrent may have a duration $\Delta \tau_p$ of approximately 5.5 ns, and the pulse of voltage may have a duration Δτ' of approximately 6 ns.

In FIG. 17, the LO light 430 has a spectral linewidth of $\Delta v_1$, and the received pulse of light has a spectral linewidth of $\Delta v_2$. The voltage signal 360 has an electrical bandwidth of Δv. A spectral linewidth of an optical signal (e.g., seed light 440, LO light 430, or pulse of light 410) may be referred to as a linewidth, optical linewidth, bandwidth, or optical bandwidth. A spectral linewidth or an electrical bandwidth may refer to an approximate width of a spectrum as measured at the half-power points of the spectrum (which may be referred to as the 3-dB points). A spectral linewidth or an electrical bandwidth may be specified over a particular time period, such as for example, over a period of time approximately equal to a pulse duration (e.g., $\Delta\tau$ or $t_b-t_a$), a temporal-portion duration (e.g., $t_d-t_c$), a pulse period $\tau$, a coherence time $T_c$, or any other suitable period of time. A spectral linewidth or an electrical bandwidth may be specified over a time period of approximately 1 μs, 10 μs, 100 μs, 1 ms, 10 ms, 100 ms, 1 s, 10 s, 100 s, or any other suitable time period. For example, the LO light 430 in FIG. 17 may have a spectral linewidth $\Delta v_1$ of 4 MHz when measured over a 100-ms time interval. A spectral linewidth for an optical signal may be related to a variation in optical frequency of the optical signal. For example, LO light 430 having a spectral linewidth $\Delta v_1$ of 4 MHz may correspond to LO light 430 having an optical-frequency variation of approximately ±2 MHz over a 100-ms time interval.

In particular embodiments, seed light 440 or LO light 430 may have a spectral linewidth $\Delta v_1$ of less than approximately 50 MHz, 10 MHz, 5 MHz, 3 MHz, 1 MHz, 0.5 MHz, 100 kHz, or any other suitable spectral-linewidth value. In the example of FIG. 17, the LO light 430 in FIG. 17 may have a spectral linewidth $\Delta v_1$ of approximately 3 MHz, and the corresponding seed light (not illustrated in FIG. 17) may have approximately the same spectral linewidth. When a temporal portion 441 of the seed light 440 is amplified to produce an emitted pulse of light 400, the spectral linewidth of the emitted pulse of light 400 may have a broadened linewidth $\Delta v_2$ that is greater than $\Delta v_1$. For example, an emitted pulse of light 400 and a corresponding received pulse of light 410 may each have spectral linewidth $\Delta v_2$ of approximately 10 MHz, 50 MHz, 100 MHz, 200 MHz, 300 MHz, 500 MHz, 1 GHz, 10 GHz, 50 GHz, or any other suitable linewidth. As another example, the LO light 430 in FIG. 17 may have a spectral linewidth $\Delta v_1$ of 5 MHz, and the received pulse of light 410 in FIG. 17 may have a spectral linewidth $\Delta v_2$ of 100 MHz. As another example, the received pulse of light 410 in FIG. 17 may have a duration $\Delta\tau$ of approximately 3-6 ns and a spectral linewidth $\Delta v_2$ of approximately 75-150 MHz.

In particular embodiments, an electrical bandwidth $\Delta v$ of a voltage signal 360 may be approximately equal to a numeric combination of the linewidths of the corresponding LO light 430 and received pulse of light 410. The electrical bandwidth $\Delta v$ may be greater than both of the linewidths $\Delta v_1$ and $\Delta v_2$. For example, the electrical bandwidth $\Delta v$ may be approximately equal to the sum of the linewidths of the LO light 430 and the received pulse of light 410 (e.g., $\Delta v \cong \Delta v_1 + \Delta v_2$). As another example, the electrical bandwidth $\Delta v$ may be approximately equal to $\sqrt{\Delta v_1^2 + \Delta v_2^2}$. In FIG. 17, the LO light 430 may have a spectral linewidth $\Delta v_1$ of approximately 3 MHz, and the received pulse of light 410 may have a spectral linewidth $\Delta v_2$ of approximately 150 MHz. The electrical bandwidth $\Delta v$ of the voltage signal 360 may be approximately equal to the sum of the two linewidths, or 153 MHz.

In particular embodiments, a photocurrent signal i produced by a detector 340 in response to coherent mixing of LO light 430 and a received pulse of light 410 may be expressed as $i(t)=k|\varepsilon_{Rx}(t)+\varepsilon_{LO}(t)|^2$, where the variable t represents time. The parameter k is a constant, and k may account for the responsivity of the detector 340 as well as other constant parameters or conversion factors. For clarity, the constant k or other constants (e.g., conversion constants or factors of 2 or 4) may be excluded from expressions herein related to a photocurrent signal i. For example, the photocurrent signal i, which is proportional to $|\varepsilon_{Rx}(t)+\varepsilon_{LO}(t)|^2$, may be written as $i(t)=|\varepsilon_{Rx}(t)+\varepsilon_{LO}(t)|^2$, with the proportionality constant k removed from the expression for clarity. In the expression for i(t), $\varepsilon_{Rx}(t)$ represents the electric field of the received pulse of light 410, and $\varepsilon_{LO}(t)$ represents the electric field of the LO light 430. The electric field of the received pulse of light 410 may be expressed as $|\varepsilon_{RX} \cos[\omega_{Rx}t+\phi_{Rx}(t)]$, where $E_{Rx}$ is the amplitude of the electric field of the received pulse of light 410. The amplitude of the electric field of the received pulse of light 410, which may be expressed as $|\varepsilon_{Rx}(t)|$, $E_{Rx}(t)$, or $E_{Rx}$, may vary with time (e.g., the electric-field amplitude may have a time dependence corresponding to the temporal shape of the received pulse of light). Similarly, the electric field of the LO light 430 may be expressed as $E_{Lo} \cos[\omega_{LO}t+\phi_{LO}(t)]$, where $E_{LO}$ is the amplitude of the electric field of the LO light 430. The amplitude of the electric field of the LO light 430, which may be expressed as $|\varepsilon_{LO}(t)|$, $E_{LO}(t)$, or $E_{LO}$, may vary with time or may be substantially constant (e.g., corresponding to the substantially constant optical power of the LO light). The frequency $\omega_{Rx}$ represents the optical frequency of the electric field of the received pulse of light 410, and $\omega_{LO}$ represents the optical frequency of the electric field of the LO light 430. A frequency represented by $\omega$ is a radial frequency (with units radians/s) and is related to the frequency f (with units cycles/s) by the expression $\omega=2\pi f$. Each of the frequencies $\omega_{Rx}$ and $\omega_{LO}$, which may be expressed as $\omega_{Rx}(t)$ or $\omega_{LO}(t)$, may vary with time or may be substantially constant with time. Similarly, a frequency difference (e.g., between a received pulse of light 410 and LO light 430) may be expressed in cycles/s as $\Delta f$ or in radians/s as $\Delta\omega$, where $\Delta\omega=2\pi\Delta f$. The parameter $\phi_{Rx}(t)$ represents the phase of the electric field of the received pulse of light 410, and $\phi_{LO}(t)$ represents the phase of the electric field of the LO light 430. Each of the phases $\phi_{Rx}(t)$ and $\phi_{LO}(t)$, which may be expressed as $\phi_{Rx}$ and $\phi_{LO}$, may vary with time or may be substantially constant with time.

In the expression for the photocurrent signal $i(t)=|\varepsilon_{Rx}(t)+\varepsilon_{LO}(t)|^2$, summing the two electric fields and then taking the square of the magnitude of that sum may correspond to coherent mixing of the LO light 430 and the received pulse of light 410. The first step of summing the two electric fields corresponds to optically combining or overlapping the LO light 430 with the input beam 135 (which includes the received pulse of light 410) so that their electric fields add together. This may include either combining the two beams (LO light 430 and input beam 135) using an optical combiner 420 or combining the two beams at a detector 340 without using an optical combiner 420. Additionally, summing the two electric fields may include using an optical polarization element 465 so that at least portions of the two electric fields are oriented along the same direction. The second step of taking the square of the magnitude of the summed electric fields occurs at the detector 340 and may correspond to the detection by the detector 340 of light corresponding to the summed electric fields (where the summed electric fields correspond to the combined LO light 430 and received pulse of light 410). A detector 340 may produce a photocurrent signal that is proportional to the optical power or intensity of a received optical signal, which in turn is proportional to the square of the electric field of the received optical signal. This indicates that the photocurrent signal i produced by the detector 340 is proportional to the square of the electric field at the detector, and the electric field at the detector includes the sum of the electric fields of the LO light 430 and the received pulse of light 410. The coherent mixing of LO light 430 and a received pulse of light 410 may occur at a receiver 140 of a lidar system 100. If a lidar system 100 includes an optical combiner 420 that combines LO light 430 and input beam 135, the combiner 420 may be considered to be part of the receiver 140. Similarly, if a lidar system 100 includes a polarization element 465 that alters a polarization of the LO light 430 or the input beam 135, the polarization element 465 may be considered to be part of the receiver 140.

The expression for the photocurrent signal $i(t)=|\varepsilon_{Rx}(t)+\varepsilon_{LO}(t)|^2$, may be expanded and written as $i(t)=|\varepsilon_{Rx}(t)|^2+2\cdot|\varepsilon_{Rx}(t)|\cdot|E_{LO}(t)|\cdot\cos[\Delta\omega(t)\cdot t+\Delta\phi(t)]+|\varepsilon_{LO}(t))|^2$. The frequency-difference term $\Delta\omega(t)$ (which may be expressed as $\omega_{Rx}(t)-\omega_{LO}(t)$, $\omega_{Rx}-\omega_{LO}$, or $\Delta\omega$) represents the frequency difference between the electric field of the received pulse of light 410 and the electric field of the LO light 430. The frequency-difference term $\Delta\omega(t)$ may have a value of approximately zero (e.g., if the optical frequencies of the received pulse of light 410 and the LO light 430 are approximately the same), may have an approximately constant non-zero value (e.g., if the optical frequencies have an approximately constant frequency difference), or may vary with time. Similarly, the phase-difference term $\Delta\phi(t)$ (which may be expressed as $\phi_{Rx}(t)-\phi_{LO}(t)$, $\phi_{Rx}-\phi_{LO}$, or $\Delta\phi$) represents the phase difference between the electric field of the received pulse of light 410 and the electric field of the LO light 430. The phase-difference term may have a value of approximately zero, may have an approximately constant non-zero value, or may vary with time.

In the above expanded expression for the photocurrent signal i, the terms $|\varepsilon_{Rx}(t)|$ and $|\varepsilon_{LO}(t)|$ may be written as $E_{Rx}$ and $E_{LO}$, respectively, and the expanded expression for the photocurrent signal i may then be written as $i(t)=E_{Rx}^2+2E_{Rx}E_{LO} \cos[(\omega_{Rx}-\omega_{LO})t+\phi_{Rx}(t)-\phi_{LO}(t)]+E_{LO}^2$. In this expanded expression for the photocurrent signal i(t), the first term EL corresponds to the optical power of the received pulse of light 410, and the first term may be referred to as the pulse term. The third term $E_{LO}^2$ corresponds to the optical power of the LO light 430 and may be referred to as the LO term. If the received pulse of light 410 is a Gaussian pulse with a pulse width of $\Delta\tau$, the first term may be expressed as $E_{Rx}^2(t)=P_{Rx} \exp[-(2\sqrt{\ln 2}t/\Delta\tau)^2]$, where $P_{Rx}$ is the peak power of the received pulse of light 410. If the LO light 430 has a substantially constant optical power, the third term may be expressed as $E_{LO}^2=P_{LO}$, where $P_{LO}$ is the average power of the LO light 430. In particular embodiments, a photocurrent signal i corresponding to the coherent mixing of LO light 430 and a received pulse of light 410 may include a coherent-mixing term. The second term in the above expression, $2E_{Rx}E_{LO} \cos[(\omega_{Rx}-\omega_{LO})t+\phi_{Rx}(t)-\phi_{LO}(t)]$, corresponds to the coherent mixing of LO light 430 and the received pulse of light 410, and the second term may be referred to as a coherent-mixing term or a coherent-mixing cross-product term. If the received pulse of light 410 and the LO light 430 have approximately the same optical frequency, then $\omega_{Rx}$ is approximately equal to $\omega_{LO}$, and the coherent-mixing term may be expressed as $2E_{Rx}E_{LO} \cos[\phi_{Rx}(t)-\phi_{LO}(t)]$. The coherent-mixing term represents coherent mixing between the electric fields of the received pulse of light 410 and the LO light 430. The coherent-mixing term is proportional to $E_{Rx}E_{LO} \cos[(\omega_{Rx}-\omega_{LO})t+\phi_{Rx}(t)-\phi_{LO}(t)]$. Additionally, the coherent-mixing term is proportional to the product of (i) $E_{Rx}$, the amplitude of the electric field of the received pulse of light 410 and (ii) $E_{LO}$, the amplitude of the electric field of the LO light 430. The amplitude of the electric field of the received pulse of light 410 may be time dependent (e.g., corresponding to a Gaussian or other pulse shape), and the $E_{LO}$ term may be substantially constant, corresponding to an optical power of LO light 430 that is substantially constant.

A hybrid pulsed/coherent lidar system 100 as described herein may operate as a combination or "hybrid" of a direct-detection pulsed lidar system and a coherent pulsed lidar system. A hybrid pulsed/coherent lidar system 100 may have two operating regimes depending on the distance or reflectivity of a target 130. For a target 130 located relatively close to the lidar system 100 or having a relatively high reflectivity, the lidar system may act primarily as a direct-detection pulsed lidar system and may detect a received pulse of light 410 primarily based on the first term above $(E_{Rx}^2)$, which corresponds to the power of the received pulse of light 410. For a target 130 located relatively far from the lidar system 100 or having a relatively low reflectivity, the lidar system may act primarily as a coherent pulsed lidar system and may detect a received pulse of light 410 primarily based on the coherent-mixing term $2E_{Rx}E_{LO} \cos[(\omega_{Rx}-\omega_{LO})t+\phi_{Rx}(t)-\phi_{LO}(t)]$, which corresponds to the coherent mixing of LO light 430 and the received pulse of light 410.

A hybrid pulsed/coherent lidar system 100 as described herein may provide a higher sensitivity than a conventional direct-detection pulsed lidar system (which may be referred to as a non-coherent pulsed lidar system). For example, compared to a conventional direct-detection pulsed lidar system, a hybrid lidar system may be able to detect targets 130 that are farther away or that have lower reflectivity. In a conventional direct-detection pulsed lidar system, a received pulse of light may be directly detected by a detector, without LO light and without coherent mixing. The photocurrent signal produced in a conventional direct-detection pulsed lidar system may correspond to the $E_{Rx}^2$ term discussed above, which represents the power of a received pulse of light. The size of the $E_{Rx}^2$ term may be determined primarily by the distance to the target 130 and the reflectivity of the target 130, and aside from boosting the energy of the emitted pulses of light 400, increasing the size of the $E_{Rx}^2$ term may not be practical or feasible. In a hybrid lidar system 100 as discussed herein, the detected signal includes the $E_{Rx}^2$ term as well as the coherent-mixing term, which is proportional to the product of $E_{Rx}$ and $E_{LO}$, and the improved sensitivity of a hybrid lidar system 100 may result from the addition of the coherent-mixing term. While it may not be practical or feasible to increase the amplitude of $E_{Rx}$ for far-away or low-reflectivity targets 130, the amplitude of the $E_{LO}$ term may be increased by increasing the power of the LO light 430. The power of the LO light 430 can be set to a level that results in an effective boosting of the size of the coherent-mixing term, which results in an increased sensitivity of the lidar system 100. In the case of a conventional direct-detection pulsed lidar system, the signal of interest depends on $E_{Rx}^2$, the power of the received pulse of light. In a hybrid pulsed/coherent lidar system 100, the signal of interest, which depends on $E_{Rx}^2$ as well as the product of $E_{Rx}$ and $E_{LO}$, may be increased by increasing the power of the LO light 430. The LO light 430 acts to effectively boost the coherent-mixing term, which may result in an improved sensitivity of the lidar system 100.

Figure 18:
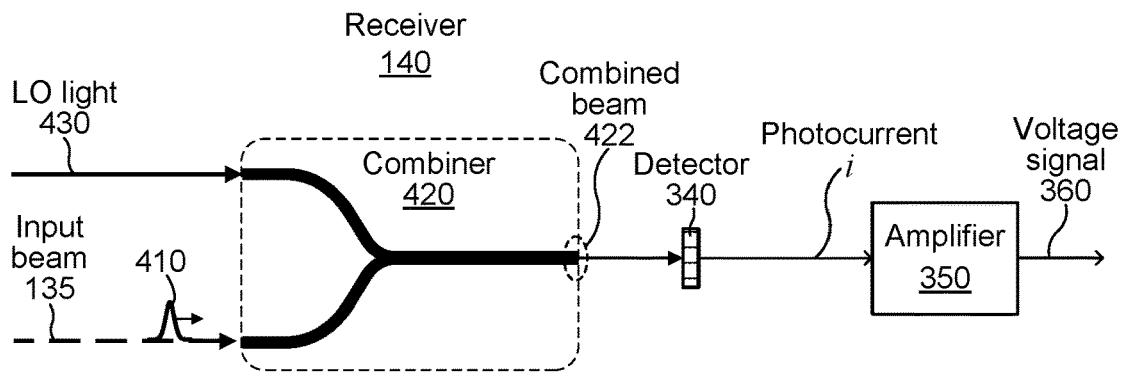
FIGS. 18-20 each illustrates an example receiver that includes an optical combiner.
Figure 19:
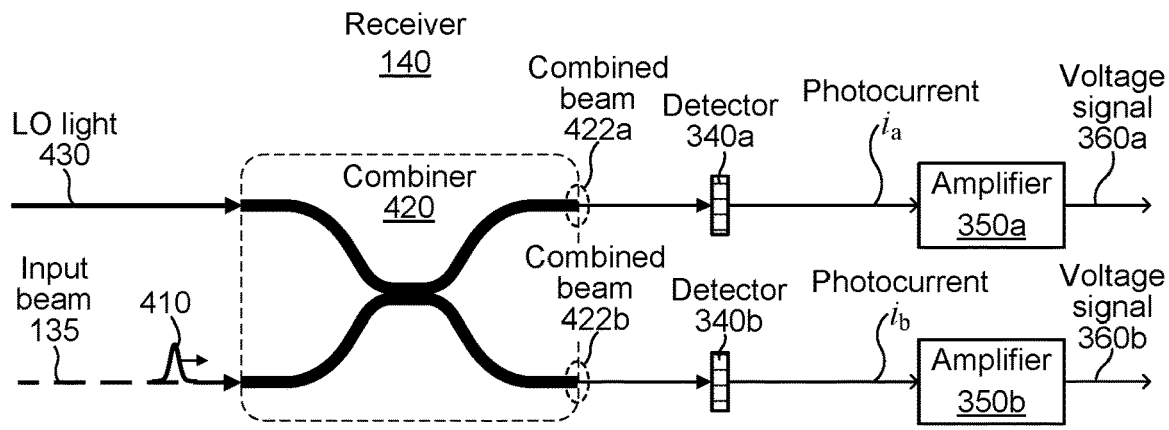
Figure 20:
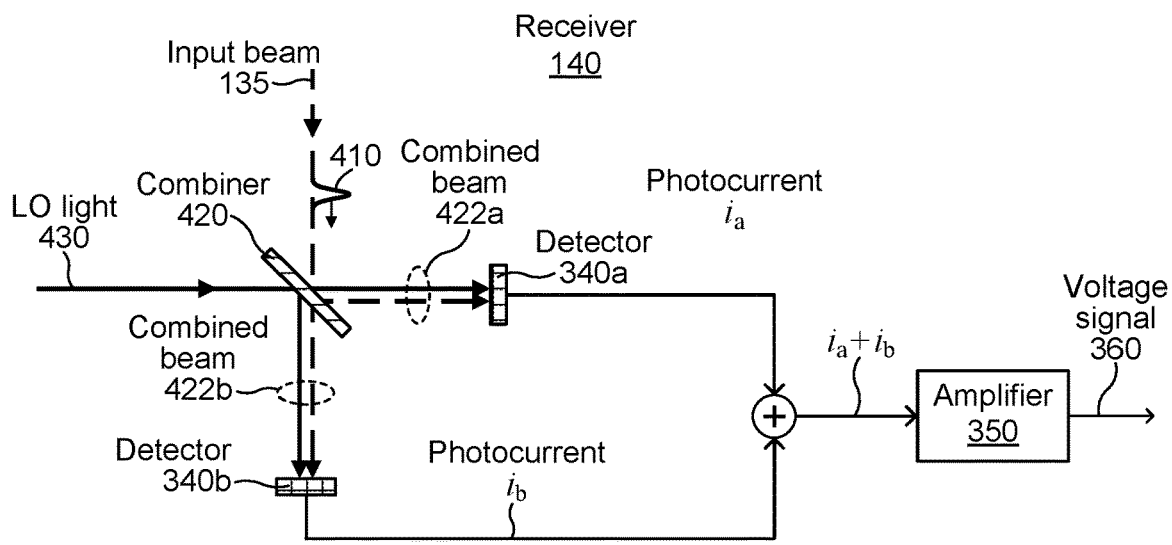

FIGS. 18-20 each illustrates an example receiver 140 that includes an optical combiner 420. In particular embodiments, a receiver 140 of a hybrid pulsed/coherent lidar system 100 may include an optical combiner 420 that (i) combines LO light 430 with a received pulse of light 410

(which is part of an input beam 135) to produce a combined beam 422 and (ii) directs the combined beam 422 to a detector 340. Optically combining LO light 430 with an input beam 135 may include spatially overlapping the LO light 430 with the input beam 135 to produce a combined beam 422. A combined beam 422 may include at least a portion of the LO light 430 and at least a portion of the received pulse of light 410, and the optical combiner 420 may direct the combined beam 422 to a detector 340. For example, an optical combiner 420 may produce one combined beam 422 and direct the combined beam 422 to one detector 340 (e.g., as illustrated in FIG. 18). As another example, an optical combiner 420 may produce one combined beam 422 and direct the combined beam 422 to two or more detectors 340 located in close proximity to one another. As another example, an optical combiner 420 may produce two or more combined beams 422 (each combined beam including a portion of LO light 430 and a portion of a received pulse of light 410) and direct each of the combined beams 422 to one or more detectors 340. In FIGS. 19 and 20, the optical combiner 420 produces two combined beams and directs each of the combined beams to one detector. In an embodiment where each of the combined beams 422 is directed to two or more detectors 340, each of the two of more detectors may be located in close proximity to one another.

An optical combiner 420 (which may be referred to as a combiner, a beam combiner, or an optical beam combiner) may include an integrated-optic component, a fiber-optic component, or a free-space optical component. Each of the optical combiners 420 in FIGS. 18-19 may be an integrated-optic combiner 420 and may be part of a PIC. An integrated-optic combiner 420, which may be referred to as an optical-waveguide combiner, may include optical waveguides that direct, combine, or split light. Alternatively, an optical combiner 420 may be a fiber-optic combiner that includes two input optical fibers (that receive LO light 430 and input beam 135) and one or more output optical fibers to direct one or more combined beams 422 to one or more respective detectors 340. The optical combiner 420 in FIG. 20 is a free-space 2×2 optical combiner that receives two free-space input beams (LO light 430 and input beam 135) and combines the input beams to produce two combined free-space output beams 422a and 422b.

In particular embodiments, a receiver 140 may include a 2×1 optical combiner 420 and one or more detectors 340. The 2×1 optical combiner 420 may include two input ports (that receive the LO light 430 and the input beam 135) and one output port that directs a combined beam 422 to the one or more detectors 340. For example, an optical combiner 420 may be a fiber-optic component that includes two input optical fibers (that receive LO light 430 and input beam 135) and one output optical fiber that directs a combined beam 422 to one or more detectors 340. The receiver 140 in FIG. 18 includes an integrated-optic 2×1 combiner 420 (with two input waveguides and one output waveguide) and one detector 340. The 2×1 optical combiner 420 receives two input beams (LO light 430 and input beam 135) and combines the input beams to produce one combined output beam 422 that is directed to the detector 340. The optical combiner 420 in FIG. 6 may be a free-space 2×1 optical combiner that receives two free-space input beams (LO light 430 and input beam 135) and combines the beams to produce one combined free-space output beam 422.

In particular embodiments, a receiver 140 may include a 2×p optical combiner 420 and p detectors 340, where p is an integer greater than or equal to 2 and represents the number of output ports and detectors. A 2×p optical combiner 420 may have two input ports (that receive LO light 430 and input beam 135) and p output ports. The combiner 420 may produce p combined beams 422, and each output port may direct one of the combined beams to one of the p detectors 340. In FIGS. 19-20, the parameter p is 2, and each of the combiners 420 is a 2×2 optical combiner 420. The receiver 140 in FIG. 19 includes an integrated-optic 2×2 combiner 420 (with two input waveguides and two output waveguides) and two detectors (340a, 340b). The receiver 140 in FIG. 20 includes a free-space 2×2 optical combiner 420 and two detectors. In each of FIGS. 19-20, the 2×2 optical combiner 420 receives two input beams (LO light 430 and input beam 135) and combines the input beams to produce two combined output beams 422a and 422b that are directed to the respective detectors 340a and 340b. Each of the combined beams 422a and 422b may include a portion of the LO light 430 and a portion of the received pulse of light 410. For example, the combiner 420 may distribute the LO light 430 and the input beam 135 approximately equally so that each of the combined beams 422a and 422b includes approximately 50% of the LO light 430 and approximately 50% of the input beam 135.

In particular embodiments, a receiver 140 may include a 2×p optical combiner 420 and p×m detectors 340, where p is an integer greater than or equal to 2. The parameter m is an integer greater than or equal to 1 and represents the number of detectors located at each of the p output ports of the combiner. In FIGS. 19-20, the parameter p is 2 and the parameter m is 1 so that there is one detector located at each of the two output ports. In other embodiments, the parameter m may be greater than or equal to 2, and there may be m detectors located at each output port, where each group of m detectors may be located in close proximity to one another. For example, adjacent detectors in a group of m detectors may be separated by less than a size of the detector active region or by less than a beam diameter of a combined beam 422 at the detector plane.

In particular embodiments, a receiver 140 of a lidar system 100 may include one or more detectors 340 configured to produce one or more respective photocurrent signals i corresponding to coherent mixing of LO light 430 and a received pulse of light 410. The receiver 140 in FIG. 18 includes one detector 340 that detects the combined beam 422. The detector 340 may produce a photocurrent signal i that corresponds to the coherent mixing of the LO light 430 and the received pulse of light 410. As described above, the photocurrent signal may be expressed as $i(t) = E_{Rx}^2 + 2E_{Rx}E_{LO}\cos[(\omega_{Rx} - \omega_{Lo})t + \phi_{Rx}(t) - \phi_{LO}(t)] + E_{LO}^2$. The voltage signal 360 produced by the amplifier 350 may correspond to the photocurrent signal i. For example, the voltage signal 360 may be approximately proportional to the current signal i(t), and the voltage signal 360 may be expressed as $v(t) = G \cdot i(t)$, where G is the electronic gain of the amplifier 350 and has units of volts/ampere.

The receiver 140 in each of FIGS. 19 and 20 includes the two detectors 340a and 340b. The combiner 420 directs a first portion 422a of the combined light to detector 340a and directs a second portion 422b of the combined light to detector 340b. In FIGS. 19 and 20, each of the detectors 340a and 340b produces a respective photocurrent signal $i_a$ and $i_b$. The portions of LO light 430 and received pulse of light 410 that make up the combined beam 422a may be coherently mixed at detector 340a to produce the photocurrent signal $i_a$. Similarly, the portions of LO light 430 and received pulse of light 410 that make up the combined beam 422b may be coherently mixed at detector 340b to produce the photocurrent signal $i_b$. In FIG. 19, each of the photocurrent signals $i_a$ and $i_b$ is sent to one of the electronic amplifiers 350a and 350b. The amplifiers 350a and 350b produce the respective voltage signals 360a and 360b, which may be combined together (e.g., voltage signals 360a and 360b may be added together) to produce a combined voltage signal. The combined voltage signal may correspond to the sum of the photocurrent signals, $i_a+i_b$. For example, the sum of voltage signals 360a and 360b may be approximately proportional to $i_a+i_b$ and may be expressed as $v(t)=G\cdot[i_a(t)+i_b(t)]$, where G is the electronic gain of each of the amplifiers 350a and 350b. Alternatively, the receiver 140 in FIG. 19 may be configured so that the voltage signals 360a and 360b are not combined together (e.g., each voltage signal may be sent separately to a pulse-detection circuit). In FIG. 20, the two photocurrent signals $i_a$ and $i_b$ are first added together, and the combined photocurrent signal $i_a+i_b$ is then sent to one electronic amplifier 350. The combined photocurrent signal may be expressed as $i_a(t)+i_b(t)=+2E_{Rx}^2 E_{LO} \cos[(\omega_{Rx}-\omega_{LO})t+\phi_{Rx}(t)-\phi_{LO}(t)]+E_{LO}^2$. The voltage signal 360 may correspond to the combined photocurrent signal and may be expressed as $v(t)=G\cdot[i_a(t)+i_b(t)]$, where G is the electronic gain of the amplifier 350. In other embodiments, a receiver 140 may be configured so that the photocurrent signals $i_a$ and $i_b$ are subtracted (e.g., to produce a combined photocurrent signal $i_a-i_b$) or so that the voltage signals 360a and 360b are subtracted.

In particular embodiments, a receiver 140 may include one or more lenses. For example, the receiver 140 in FIG. 18 may include one lens (not illustrated in FIG. 18) that focuses the combined beam 422 onto the detector 340. As another example, the receiver 140 in FIG. 18 may include a lens (not illustrated in FIG. 18) that focuses the LO light 430 into an input optical waveguide of the combiner 420. The receiver 140 may also include another lens (not illustrated in FIG. 18) that focuses the input beam 135 into the other input optical waveguide of the combiner 420. As another example, the receiver 140 in FIG. 19 may include one or more lenses (not illustrated in FIG. 19) that focus the combined beam 422a as a free-space optical beam onto the detector 340a or that focus the combined beam 422b as a free-space optical beam onto the detector 340b. Alternatively, each of the detectors 340a and 340b in FIG. 19 may be butt-coupled or affixed to an output port of the combiner 420 without an intervening lens. For example, detectors 340a and 340b may each be positioned close to an output port of the combiner 420 to directly receive the respective combined beams 422a and 422b. In FIG. 19, rather than being free-space optical beams, the combined beams 422a and 422b may primarily be confined beams that propagate through a waveguide of the combiner 420 and are directly coupled, with a minimum of free-space propagation (e.g., less than 1 mm of free-space propagation), onto the detectors 340a and 340b.

Figure 21:
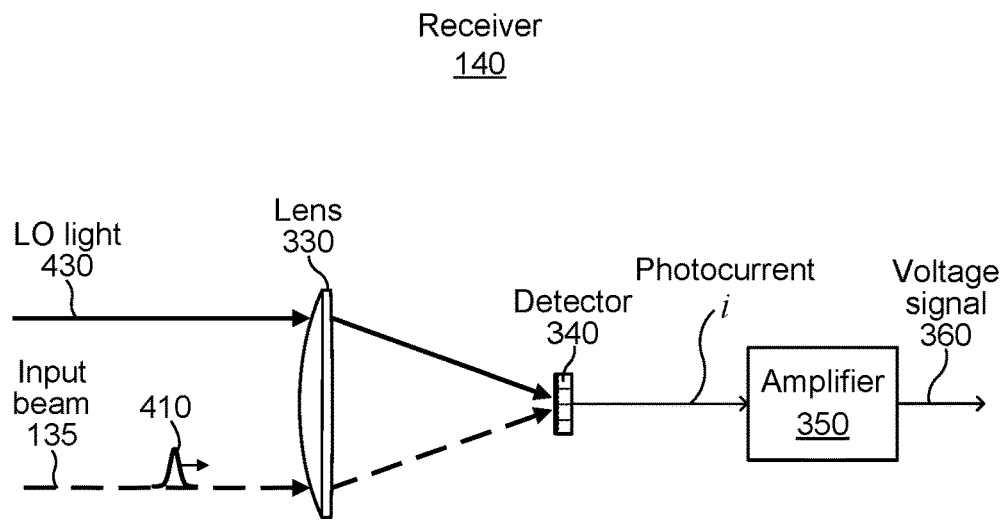
FIG. 21 illustrates an example receiver in which LO light and an input beam are combined at a detector.

FIG. 21 illustrates an example receiver 140 in which LO light 430 and an input beam 135 are combined at a detector 340. In particular embodiments, a receiver 140 may not include a discrete or separate optical combiner. For example, the LO light 430 and the input beam 135 may be directed to a detector 340 (e.g., by one or more mirrors or lenses) as separate beams without first being combined into a combined beam. Additionally, the LO light 430 and the input beam 135 may be directed to the detector 340 so that the two beams are non-collinear, non-coaxial, or incident on the detector at a non-zero angle with respect to one another. The receiver 140 in FIG. 21 does not include an optical combiner, and the LO light 430 and the input beam 135 are combined at the detector 340 (e.g., at or near an input surface of the detector 340 or within the detector 340). The focusing lens 330 receives the LO light 430 and the input beam 135 as non-coaxial beams and focuses each of the two beams onto the detector 340. Additionally, the focusing lens 330 directs the LO light 430 and the input beam 135 to the detector 340 at an angle to one another.

Figure 22:
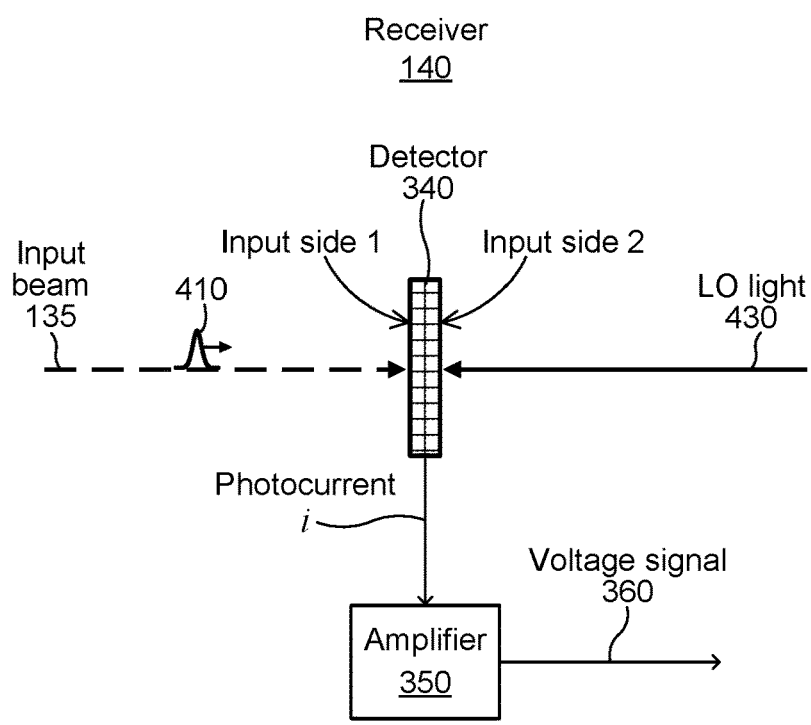
FIG. 22 illustrates an example receiver that includes a two-sided detector.

FIG. 22 illustrates an example receiver 140 that includes a two-sided detector 340. In particular embodiments, a receiver 140 may include a detector 340 that receives an input beam 135 directed to one side of the detector and LO light 430 directed to an opposite side of the detector. A two-sided detector 340 may be referred to as a detector with two-sided illumination, a detector that is illuminated from two sides, a dual-sided detector, a double-sided detector, or a dual-entry detector. In FIG. 22, the detector 340 has two optical-input sides (input side 1 and input side 2), where input side 1 is located opposite input side 2. The input beam 135 with the received pulse of light 410 is incident on input side 1 of the detector, and the LO light 430 is incident on input side 2 of the detector. The receiver 140 in FIG. 22 does not include an optical combiner. The LO light 430 and the input beam 135 are directed to the detector 340 via opposite sides, and the LO light 430 and the input beam 135 are combined within the detector 340. Input sides 1 and 2 may each include a dielectric coating (e.g., an anti-reflection coating, a partially reflective coating, or a high-reflectivity coating). For example, input side 1 may include an anti-reflection coating with a reflectivity of less than 5% at a wavelength of the input beam 135.

Figure 23:
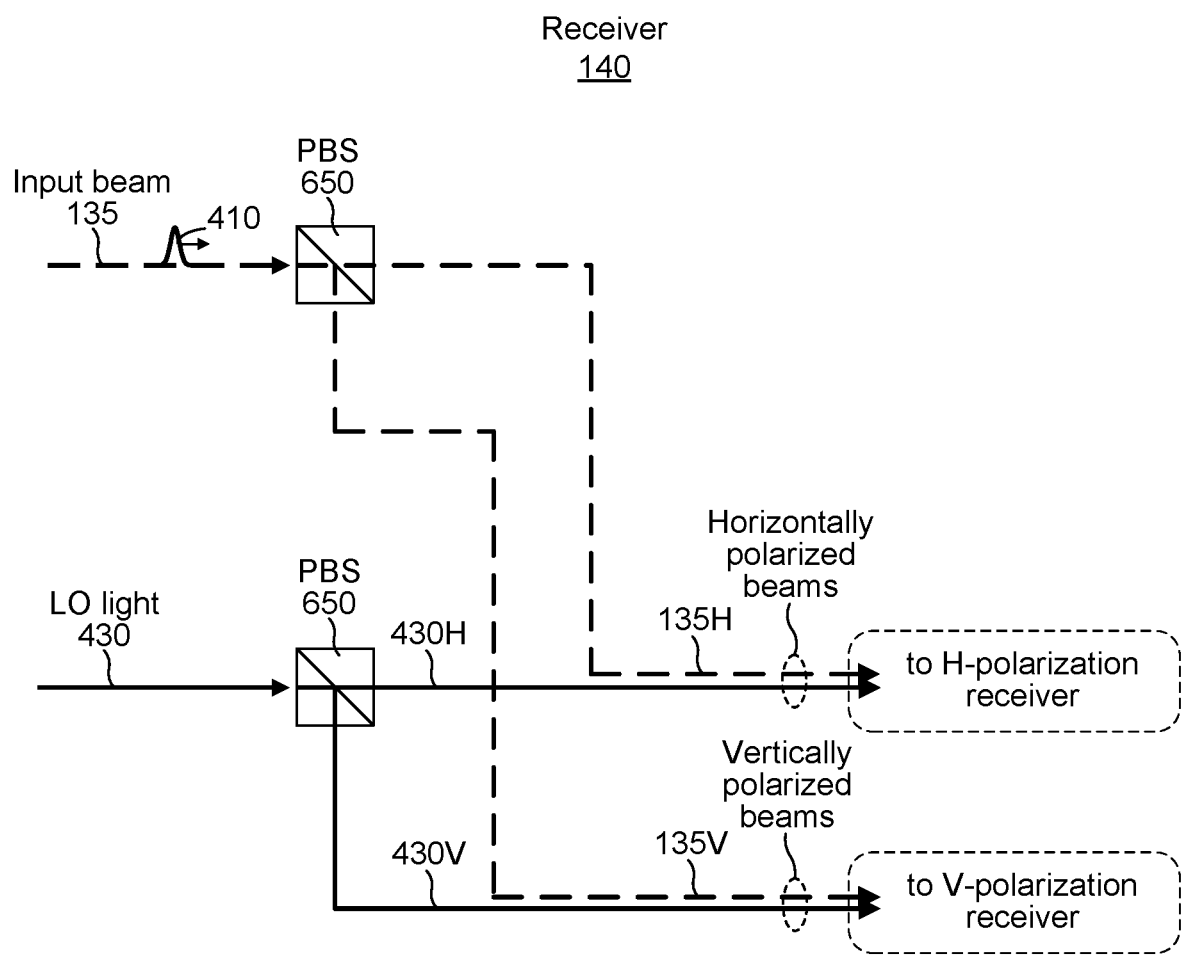
FIG. 23 illustrates an example receiver that includes two polarization beam-splitters.

FIG. 23 illustrates an example receiver 140 that includes two polarization beam-splitters 650. In particular embodiments, a receiver 140 may include a LO-light polarization splitter 650 that splits LO light 430 into two orthogonal polarization components (e.g., horizontal and vertical). Additionally, the receiver 140 may include an input-beam polarization splitter 650 that splits an input beam 135 (which includes a received pulse of light 410) into the same two orthogonal polarization components. In FIG. 23, the LO-light polarization beam-splitter (PBS) 650 splits the LO light 430 into a horizontally polarized LO-light beam 430H and a vertically polarized LO-light beam 430V. Similarly, the input-beam PBS 650 splits the input beam 135 into a horizontally polarized input beam 135H and a vertically polarized input beam 135V. The horizontally polarized beams are directed to a horizontal-polarization receiver, and the vertically polarized beams are directed to a vertical-polarization receiver. The receiver 140 illustrated in FIG. 23 may be referred to as a polarization-insensitive receiver since the receiver 140 may be configured to detect received pulses of light 410 regardless of the polarization of the received pulses of light 410.

In particular embodiments, a polarization-insensitive receiver 140 as illustrated in FIG. 23 may be implemented with free-space components, fiber-optic components, integrated-optic components, or any suitable combination thereof. For example, the two PBSs 650 may be free-space polarization beam-splitting cubes, and the input beam 135 and the LO light 430 may be free-space optical beams. As another example, the two PBSs 650 may be fiber-optic components, and the input beam 135 and the LO light 430 may be conveyed to the PBSs 650 via optical fiber (e.g., single-mode optical fiber or polarization-maintaining optical fiber). Additionally, the horizontally and vertically polarized beams may be conveyed to the respective H-polarization and V-polarization receivers via polarization-maintaining optical fiber.

In particular embodiments, a receiver 140 may include a horizontal-polarization receiver and a vertical-polarization receiver. The H-polarization receiver may combine a horizontally polarized LO-light beam 430H and a horizontally polarized input beam 135H and produce one or more photocurrent signals corresponding to coherent mixing of the two horizontally polarized beams. Similarly, the V-polarization receiver may combine the vertically polarized LO-light beam 430V and the vertically polarized input beam 135V and produce one or more photocurrent signals corresponding to coherent mixing of the two vertically polarized beams. Each of the H-polarization and V-polarization receivers may be similar to one of the receivers 140 illustrated in FIGS. 18-22. The H-polarization and V-polarization receivers may each preserve the polarization of the respective horizontally and vertically polarized beams. For example, the H-polarization and V-polarization receivers may each include polarization-maintaining optical fiber that maintains the polarization of the beams. Additionally or alternatively, the H-polarization and V-polarization receivers may each include a PIC with optical waveguides configured to maintain the polarization of the beams.

The polarization of an input beam 135 may vary with time or may not be controllable by a lidar system 100. For example, the polarization of received pulses of light 410 may vary depending at least in part on (i) the optical properties of a target 130 from which pulses of light 400 are scattered or (ii) atmospheric conditions encountered by pulses of light 400 while propagating to the target 130 and back to the lidar system 100. However, since the LO light 430 is produced and contained within the lidar system 100, the polarization of the LO light 430 may be set to a particular polarization state. For example, the polarization of the LO light 430 sent to the LO-light PBS 650 may be configured so that the LO-light beams 430H and 430V produced by the PBS 650 have approximately the same power. The LO light 430 produced by a seed laser 450 may be linearly polarized, and a half-wave plate may be used to rotate the polarization of the LO light 430 so that it is oriented at approximately 45 degrees with respect to the LO-light PBS 650. The LO-light PBS 650 may split the 45-degree polarized LO light 430 into horizontal and vertical components having approximately the same power. By providing a portion of the LO light 430 to both the H-polarization receiver and the V-polarization receiver, the receiver 140 in FIG. 23 may produce a valid, non-zero output electrical signal regardless of the polarization of the received pulse of light 410.

Coherent mixing of LO light 430 and a received pulse of light 410 may require that the electric fields of the LO light 430 and the received pulse of light 410 are oriented in approximately the same direction. For example, if LO light 430 and input beam 135 are both vertically polarized, then the two beams may be optically combined together and coherently mixed at a detector 340. However, if the two beams are orthogonally polarized (e.g., LO light 430 is vertically polarized and input beam 135 is horizontally polarized), then the two beams may not be coherently mixed, since their electric fields are not oriented in the same direction. Orthogonally polarized beams that are incident on a detector 340 may not be coherently mixed, resulting in little to no output signal from a receiver 140. To mitigate problems with polarization-related signal variation, a lidar system 100 may include a polarization-insensitive receiver 140 (e.g., as illustrated in FIG. 23). Additionally or alternatively, a lidar system 100 may include an optical polarization element 465 to ensure that at least a portion of the LO light 430 and input beam 135 have the same polarization.

A polarization-insensitive receiver 140 as illustrated in FIG. 23 may ensure that the receiver 140 produces a valid, non-zero output electrical signal in response to a received pulse of light 410, regardless of the polarization of the received pulse of light 410. For example, the output electrical signals from the H-polarization and V-polarization receivers may be added together, resulting in a combined output signal that is insensitive to the polarization of the received pulse of light 410. If a received pulse of light 410 is horizontally polarized, then the H-polarization receiver may generate a non-zero output signal and the V-polarization receiver may generate little to no output signal. Similarly, if a received pulse of light 410 is vertically polarized, then the H-polarization receiver may generate little to no output signal and the V-polarization receiver may generate a non-zero output signal. If a received pulse of light 410 has a polarization that includes a vertical component and a horizontal component, then each of the H-polarization and V-polarization receivers may generate a non-zero output signal corresponding to the respective polarization component. By adding together the signals from the H-polarization and V-polarization receivers, a valid, non-zero output electrical signal may be produced by the receiver 140 regardless of the polarization of the received pulse of light 410.

FIGS. 24-27 each illustrates an example light source 110 that includes a seed laser 450, a semiconductor optical amplifier (SOA) 460, and one or more optical modulators 495. In particular embodiments, a light source 110 may include a phase or amplitude modulator 495 configured to change a frequency, phase, or amplitude of seed light 440, LO light 430, or emitted pulse of light 400. An optical phase or amplitude modulator 495 may include an electro-optic modulator (EOM), an acousto-optic modulator (AOM), an electro-absorption modulator, a liquid-crystal modulator, or any other suitable type of optical phase or amplitude modulator. For example, an optical modulator 495 may include an electro-optic phase modulator or an AOM that changes the frequency or phase of seed light 440 or LO light 430. As another example, an optical modulator 495 may include an electro-optic amplitude modulator, an electro-absorption modulator, or a liquid-crystal modulator that changes the amplitude of the seed light 440 or LO light 430. An optical modulator 495 may be a free-space modulator, a fiber-optic modulator (e.g., with fiber-optic input or output ports), or an integrated-optic modulator (e.g., a waveguide-based modulator integrated into a PIC).

In particular embodiments, an optical modulator 495 may be included in a seed laser diode 450 or a SOA 460. For example, a seed laser diode 450 may include a waveguide section to which an external electrical current or electric field may be applied to change the carrier density or refractive index of the waveguide section, resulting in a change in the frequency or phase of seed light 440 or LO light 430. As another example, the frequency, phase, or amplitude of seed light 440 or LO light 430 may be changed by changing or modulating the seed current $I_1$ or the SOA current $I_2$. In this case, the seed laser diode 450 or SOA 460 may not include a separate or discrete modulator, but rather, a modulation function may be distributed within the seed laser diode 450 or SOA 460. For example, the optical frequency of the seed light 440 or LO light 430 may be changed by changing the seed current $I_1$. Changing the seed current $I_1$ may cause a refractive-index change in the seed laser diode 450, which may result in a change in the optical frequency of light produced by the seed laser diode 450.

Figure 24:
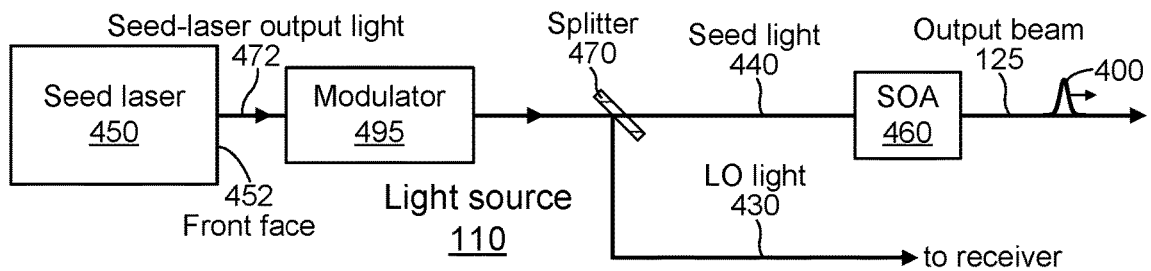
FIGS. 24-27 each illustrates an example light source that includes a seed laser, a semiconductor optical amplifier (SOA), and one or more optical modulators.

In FIG. 24, the light source 110 includes a modulator 495 located between the seed laser 450 and the optical splitter 470. The seed-laser output light 472 passes through the modulator 495 and is then split by the splitter 470 to produce the seed light 440 and LO light 430. The modulator 495 in FIG. 24 may be configured to change a frequency, phase, or amplitude of the seed-laser output light 472. For example, the modulator 495 may be a phase modulator that applies a time-varying phase shift to the seed-laser output light 472, which may result in a frequency change of the seed-laser output light 472. The modulator 495 may be driven in synch with the emitted pulses of light 400 so that the emitted pulses of light 400 and the LO light 430 each have a different frequency change imparted by the modulator 495.

Figure 25:
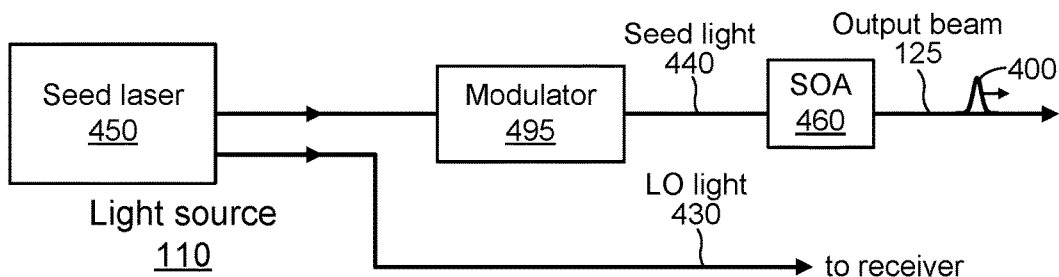
Figure 26:
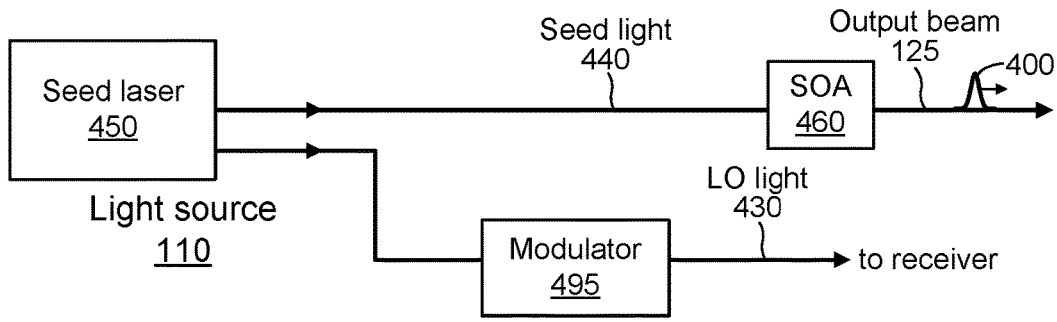

In FIG. 25, the light source 110 includes a modulator 495 located between the seed laser 450 and the SOA 460. The modulator 495 in FIG. 25 may be configured to change a frequency, phase, or amplitude of the seed light 440. For example, since the LO light 430 does not pass through the modulator 495, the modulator 495 may change the optical frequency of the seed light 440 so that it is different from the optical frequency of the LO light 430. In FIG. 26, the light source 110 includes a modulator 495 located in the path of the LO light 430. The modulator 495 in FIG. 26 may be configured to change a frequency, phase, or amplitude of the LO light 430. For example, since the seed light 440 does not pass through the modulator 495, the modulator 495 may change the optical frequency of the LO light 430 so that it is different from the optical frequency of the seed light 440. In FIG. 25 or 26, the seed light 440 and LO light 430 may be produced by an optical splitter 470 that splits seed-laser output light 472 to produce the seed light 440 and the LO light 430. Alternatively, in FIG. 25 or 26, the seed light 440 may be emitted from a front face 452 of a seed laser diode, and the LO light 430 may be emitted from the back face 451 of the seed laser diode.

Figure 27:
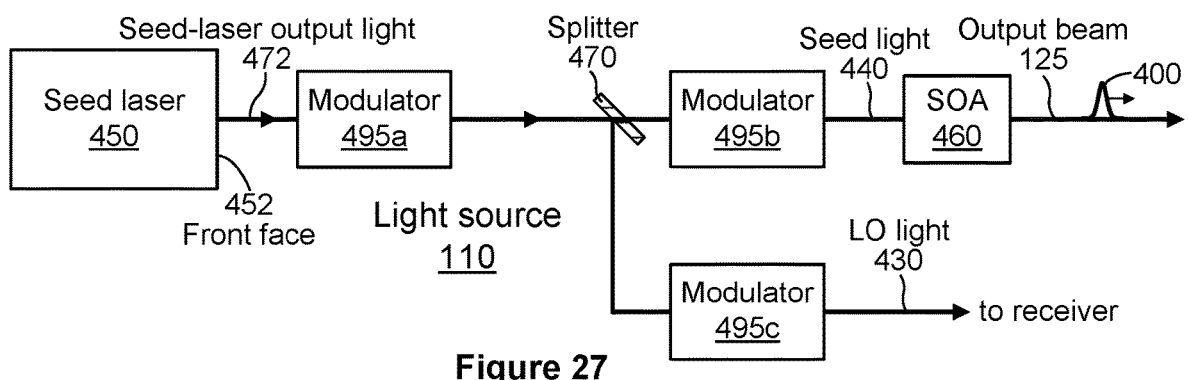

In FIG. 27, the light source 110 includes three optical modulators 495a, 495b, and 495c. In particular embodiments, a light source 110 may include one, two, three, or any other suitable number of modulators 495. Each of the modulators 495a, 495b, and 495c may be configured to change a frequency, phase, or amplitude of the seed-laser output light 472, seed light 440, or LO light 430. For example, modulator 495b may be an amplitude modulator that modulates the amplitude of the seed light 440 before passing through the SOA 460. As another example, modulator 495b may be a phase modulator that changes the frequency of the seed light 440. As another example, modulator 495c may be a phase modulator that changes the frequency of the LO light 430.

Figure 28:
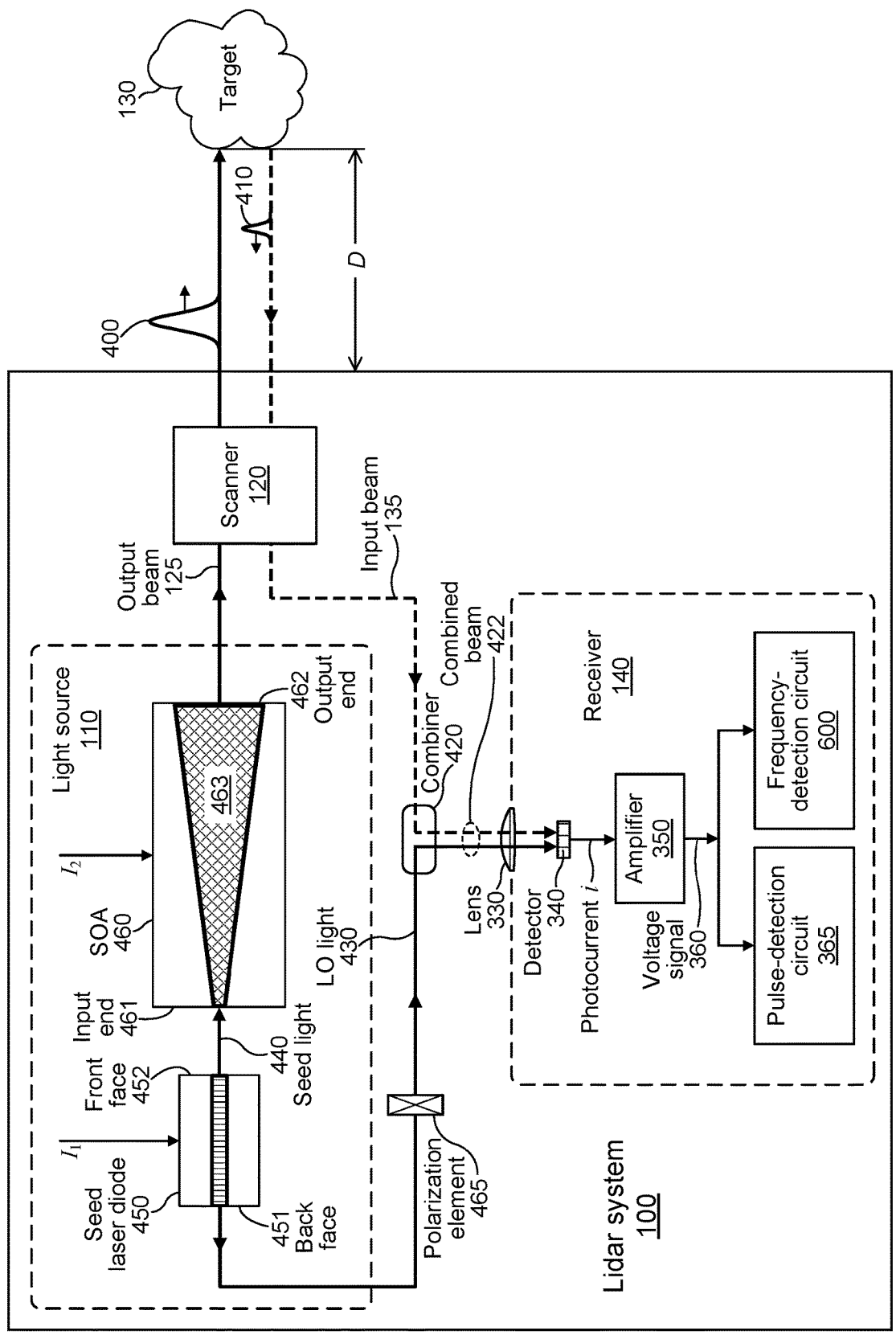
FIG. 28 illustrates an example lidar system with a light source that emits pulses of light and local-oscillator (LO) light.

FIG. 28 illustrates an example lidar system 100 with a light source 110 that emits pulses of light 400 and local-oscillator (LO) light 430. The light source 110 includes a seed laser diode 450 that emits seed light 440 and LO light 430. The SOA 460, which has a tapered waveguide 463 (e.g., a width of the SOA waveguide 463 increases from the input end 461 to the output end 462), amplifies the seed light 440 to produce an output beam 125. For example, the SOA 460 may amplify temporal portions of the seed light 440 to produce an output beam 125 that includes emitted pulses of light 400, where each amplified temporal portion of the seed light 440 corresponds to one of the emitted pulses of light 400. The light source 110 may include an electronic driver 480 (not illustrated in FIG. 28) that (i) supplies a modulated or substantially constant electrical current $I_1$ to the seed laser diode 450 and (ii) supplies pulses of current $I_2$ to the SOA 460. Each pulse of SOA current $I_2$ may cause the SOA 460 to amplify a temporal portion of the seed light 440 to produce an emitted pulse of light 400. Additionally, the electronic driver 480 may impart frequency changes to seed light 440, emitted pulses of light 400, or LO light 430 based on the seed current $I_1$ supplied to the seed laser diode 450 or based on the SOA current $I_2$ supplied to the SOA 460. For example, in addition to amplifying a temporal portion of seed 460, each pulse of SOA current $I_2$ supplied to the SOA 460 may also cause the SOA 460 to impart a spectral signature to the corresponding emitted pulse of light 400. A light source 110 may also include a fiber-optic amplifier 500 (not illustrated in FIG. 28) which may be similar to that illustrated in FIGS. 13-14 and described herein. The fiber-optic amplifier 500 may receive pulses of light from the SOA 460 and further amplify the pulses of light to produce the output beam 125.

In the example of FIG. 28, the light source 110 emits an output beam 125 that includes a pulse of light 400, and the scanner 120 scans the output beam 125 across a field of regard of the lidar system. The receiver 140 detects a combined beam 422 that includes LO light 430 and an input beam 135. The lidar system 100 in FIG. 28 may be referred to as a hybrid pulsed/coherent lidar system in which the light source 110 emits LO light 430 and pulses of light 400, where each emitted pulse of light is coherent with a corresponding temporal portion of the LO light 430. Additionally, the receiver 140 in a hybrid pulsed/coherent lidar system may detect the LO light 430 and a received pulse of light 410, where the received pulse of light 410 includes scattered light from one of the emitted pulses of light 400. The receiver 140 in FIG. 28 includes a detector 340, and the LO light 430 and the received pulse of light 410 are combined by the optical combiner 420 and coherently mixed together at the detector 340 to produce a photocurrent signal i. Herein, a hybrid pulsed/coherent lidar system 100 may be referred to as a hybrid pulsed-coherent lidar system, a hybrid lidar system, or a lidar system. One or more of the lidar systems 100 described or illustrated herein may be configured to operate as a hybrid pulsed/coherent lidar system 100.

A hybrid pulsed/coherent lidar system 100 may include 1, 2, 4, or any other suitable number of detectors 340, and one or more of the detectors may detect at least a portion of LO light 430 and a received pulse of light 410 to produce a corresponding photocurrent signal. The photocurrent signal i produced by a detector 340 of a hybrid pulsed/coherent lidar system 100 may include the sum of three terms: (i) the first term corresponds to an optical property of the received pulse of light 410, (ii) the second term is a coherent-mixing term corresponding to the coherent mixing of the LO light 430 and the received pulse of light 410, and (iii) the third term corresponds to an optical property of the LO light 430. The optical property of the received pulse of light may be the optical power, optical intensity, optical energy, or electric field of the received pulse of light. Similarly, the optical property of the LO light 430 may be the optical power, optical intensity, optical energy, or electric field of the LO light. For example, the first term may correspond to the optical power of the received pulse of light 410 and may be expressed as $|\varepsilon_{Rx}(t)|^2$, $E_{Rx}^2(t)$, or $E_{Rx}^2$. Similarly, the third term may correspond to the optical power of the LO light 430 and may be expressed as $|\varepsilon_{LO}(t)|^2$, $E_{LO}^2(t)$, or $E_{LO}^2$. The coherent-mixing term may be expressed as $2 \cdot |\varepsilon_{Rx}(t)| \cdot |\varepsilon_{LO}(t)| \cdot \cos[\Delta\omega(t) \cdot t + \Delta\phi(t)]$, as $2 \cdot E_{Rx}(t) \cdot E_{LO}(t) \cdot \cos[(\omega_{Rx} - \omega_{LO})t + \phi_{Rx} - \phi_{LO}]$, or as $2 E_{Rx} E_{LO} \cos[\Delta\omega \cdot t + \Delta\phi]$. The photocurrent signal i may also include additional terms which are not included here. For example, the photocurrent signal may include one or more additional terms associated with solar background light, other light sources (e.g., car headlights), interference light from other lidar systems, or electrical noise that induces a current.

The receiver 140 in FIG. 28 includes a pulse-detection circuit 365 that may determine the time-of-arrival for the received pulse of light 410 based on the first term and the second term of the photocurrent signal i. The receiver 140 includes an electronic amplifier 350 that produces a voltage signal 360 corresponding to the photocurrent signal i, and the time-of-arrival for the received pulse of light 410 may be determined from the voltage signal 360. The voltage signal 360, which may be similar to or may be a representation of the photocurrent signal i, may correspond to the three terms of the photocurrent signal i. For example, the first term of the photocurrent signal i may include a pulse of current corresponding to the optical power of the received pulse of light 410, and the voltage signal 360 may include voltage pulse that corresponds to the first term. Similarly, the second term may include a pulse of current that corresponds to coherent mixing of the LO light 430 and the received pulse of light 410, and the voltage signal 360 may include a voltage pulse that corresponds to the second term. Determining the time-of-arrival for the received pulse of light 410 based on the first term and the second term of the photocurrent signal i may include determining the time-of-arrival for the receive pulse of light 410 based on the voltage signal 360, since the voltage signal 360 may be similar to or may be a representation of the photocurrent signal i.

In a hybrid pulsed/coherent lidar system 100, determining the time-of-arrival for a received pulse of light 410 based on the first term and the second term of the photocurrent signal i may include determining the time-of-arrival based on: (i) primarily the first term, (ii) primarily the second term, or (iii) a combination of the first and second terms. For example, the time-of-arrival for a received pulse of light 410 scattered from a nearby target (e.g., D<50 m) or a high-reflectivity target (e.g., R>80%) may be determined primarily based on the first term (e.g., the optical power of the received pulse of light 410). The time-of-arrival for a received pulse of light 410 scattered from a relatively distant target (e.g., D>150 m) or a low-reflectivity target (e.g., R<20%) may be determined primarily based on the second term, the coherent-mixing term. The time-of-arrival for a received pulse of light 410 scattered from a target located at an intermediate distance (e.g., D=150 m) or having an intermediate reflectivity (e.g., R=50%) may be determined based on both the first and second terms (e.g., based on the sum of the first and second terms).

The hybrid pulsed/coherent lidar system 100 in FIG. 28 includes an optical combiner 420 that combines LO light 430 with the input beam 135 and directs the combined beam 422 to the detector 340. The optical combiner 420 in FIG. 28 may be similar to one of the optical combiners 420 described herein or illustrated in FIG. 18, 19, or 20. Alternatively, a hybrid pulsed/coherent lidar system 100 may not include an optical combiner, and the LO light 430 and the input beam 135 may be combined at the detector 340 (e.g., using a technique described herein or illustrated in FIG. 21 or 22).

In particular embodiments, a lidar system 100 may include an optical polarization element 465 that alters the polarization of an emitted pulse of light 400, LO light 430, or a received pulse of light 410. An optical polarization element 465, which may be referred to as a polarization element, may allow the LO light 430 and the received pulse of light 410 to be coherently mixed. For example, an optical polarization element may alter the polarization of the LO light 430 so that, regardless of the polarization of a received pulse of light 410, the LO light 430 and the received pulse of light 410 may be coherently mixed together. The optical polarization element may ensure that at least a portion of the received pulse of light 410 and the LO light 430 have polarizations that are oriented in the same direction. An optical polarization element may include one or more quarter-wave plates, one or more half-wave plates, one or more optical polarizers, one or more optical depolarizers, polarization-maintaining optical fiber, highly birefringent optical fiber, or any suitable combination thereof. For example, an optical polarization element may include a quarter-wave plate that converts the polarization of the LO light 430, the output beam 125, or the input beam 135 to a substantially circular or elliptical polarization. An optical polarization element may include a free-space optical component, a fiber-optic component, an integrated-optic component, or any suitable combination thereof.

An optical polarization element may be included in a receiver 140 as an alternative to configuring a receiver to be a polarization-insensitive receiver. For example, rather than producing horizontally polarized beams and vertically polarized beams and having two receiver channels (e.g., H-polarization receiver and V-polarization receiver) as illustrated in FIG. 23, a receiver 140 may include an optical polarization element that ensures that at least a portion of the LO light 430 and the received pulse of light 410 may be coherently mixed together. An optical polarization element may be included in each of the receivers 140 illustrated in FIGS. 18-22 to allow the receiver to coherently mix the LO light 430 and a received pulse of light 410 regardless of the polarization of the received pulse of light 410.

In particular embodiments, an optical polarization element (e.g., a quarter-wave plate) may convert the polarization of the LO light 430 into circularly or elliptically polarized light. For example, the LO light 430 produced by a seed laser 450 may be linearly polarized, and a quarter-wave plate may convert the linearly polarized LO light 430 into circularly polarized light. The circularly polarized LO light 430 may include both vertical and horizontal polarization components. So, regardless of the polarization of a received pulse of light 410, at least a portion of the circularly polarized LO light 430 may be coherently mixed with the received pulse of light 410. In the example of FIG. 28, the polarization element 465 may include a quarter-wave plate that converts the LO light 430 into circularly polarized light prior to the LO light 430 being combined with the input beam 135.

In particular embodiments, an optical polarization element may include an optical depolarizer that depolarizes the polarization of the LO light 430. For example, the LO light 430 produced by a seed laser 450 may be linearly polarized, and an optical depolarizer may convert the linearly polarized LO light 430 into depolarized light having a polarization that is substantially random or scrambled. The depolarized LO light 430 may include two or more different polarizations so that, regardless of the polarization of a received pulse of light 410, at least a portion of the depolarized LO light 430 may be coherently mixed with the received pulse of light 410. An optical depolarizer may include a Cornu depolarizer, a Lyot depolarizer, a wedge depolarizer, or any other suitable depolarizer element.

Figure 29:
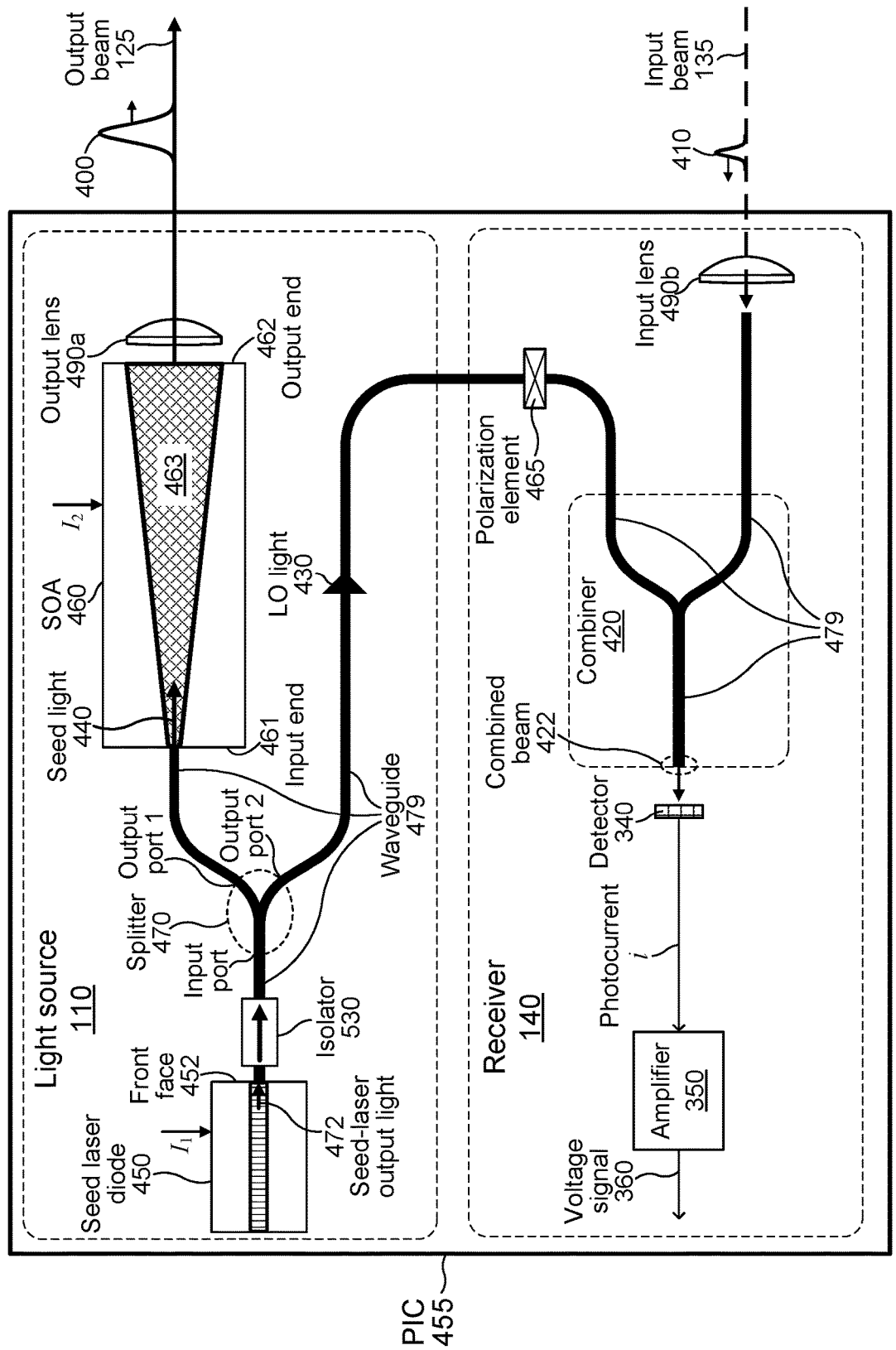
FIG. 29 illustrates an example light source and receiver integrated into a photonic integrated circuit (PIC).

FIG. 29 illustrates an example light source 110 and receiver 140 integrated into a photonic integrated circuit (PIC) 455. The PIC 455 in FIG. 29 may be part of a hybrid pulsed/coherent lidar system 100. In particular embodiments, a hybrid pulsed/coherent lidar system 100 may include a light source 110, a receiver 140, and a processor or controller 150, and at least part of the light source 110 or at least part of the receiver 140 may be disposed on or in a PIC 455. In the example of FIG. 29, both the light source 110 and the receiver 140 are disposed on or in the PIC 455. As another example, the receiver 140 may be disposed on or in the PIC 455, and the light source 110 may be packaged separately from the PIC 455. All or part of a processor or controller 150 may be attached to, electrically coupled to, or located near the PIC 455.

In particular embodiments, a PIC 455 that is part of a lidar system 100 may include one or more seed laser diodes 450, one or more optical waveguides 479, one or more optical isolators 530, one or more splitters 470, one or more SOAs 460, one or more lenses 490, one or more polarization elements 465, one or more combiners 420, or one or more detectors 340. The PIC 455 in FIG. 29 includes the following optical components: seed laser diode 450, optical isolator 530, splitter 470, SOA 460, output lens 490*a*, polarization element 465, input lens 490*b*, combiner 420, detector 340, and amplifier 350. Additionally, the PIC 455 includes optical waveguides 479 that convey light from one optical component to another. The waveguides 479 may be passive optical waveguides formed in a PIC substrate material that includes silicon, InP, glass, polymer, or lithium niobate. The amplifier 350 may be attached to, electrically coupled to, or located near the PIC 455. One or more optical components of the light source 110 or receiver 140 may be fabricated separately and then integrated with the PIC 455. For example, the waveguides 479, splitter 470, and combiner 420 may be fabricated as part of the PIC 455, and the seed laser diode 450, isolator 530, SOA 460, lenses 490*a* and 490*b*, or detector 340 may be fabricated separately and then integrated into the PIC 455. An optical component may be integrated into the PIC 455 by attaching or connecting the optical component to the PIC 455 or to a substrate to which the PIC 455 is also attached. For example, the seed laser diode 450 and the SOA may be attached to the PIC 445 or to a substrate using epoxy, adhesive, or solder.

In particular embodiments, a PIC 455 may include one or more optical waveguides 479, one or more optical splitters 470, or one or more optical combiners 420. The one or more waveguides 479, splitters 470, or combiners 420 may be configured to convey, split, or combine the seed-laser output light 472, seed light 440, LO light 430, emitted pulses of light 400, or received pulses of light 410. In FIG. 29, the optical splitter 470 is an optical-waveguide splitter 470 that splits the seed-laser output light 472 to produce the seed light 440 and the LO light 430. The integrated-optic 2×1 combiner 420 in FIG. 29 (which may be similar to the combiner 420 illustrated in FIG. 18) combines the input beam 135, which includes the received pulse of light 410, with the LO light 430 to produce a combined beam. The LO light 430 and the input beam 135 are each conveyed to the combiner 420 by one or more optical waveguides 479, and the combined beam 422 is conveyed to the detector by a waveguide 479. In other embodiments, a PIC 455 may include an integrated-optic 2×2 combiner 420 (e.g., as illustrated in FIG. 19). The optical waveguides 479 in FIG. 29 may be referred to as passive optical waveguides (e.g., to distinguish them from the waveguide 463 of a SOA 460, which may be referred to as an active optical waveguide).

In particular embodiments, a PIC 455 may include one or more optical waveguides 479 that direct seed light 440 to a SOA 460 or that direct LO light 430 and input light 135 to a receiver 140. For example, a light source 110 may include a PIC 455 with an optical waveguide 479 that receives seed light 440 from a seed laser diode 450 and directs the seed light 440 to a SOA 460. As another example, an optical waveguide 479 may receive seed-laser output light 472 from a seed laser diode 450 and direct a portion of the seed-laser output light 472 (which corresponds to the seed light 440) to a SOA 460. In FIG. 29, an optical waveguide 479 of the PIC 455 receives the seed-laser output light 472 from the front face 452 of the seed laser diode 450 and directs the output light 472 through the isolator 530 and then to the input port of the splitter 470. The splitter 470 splits the seed-laser output light 472 to produce the seed light 440 and the LO light 430. One optical waveguide 479 directs the seed light 440 from output port 1 of the splitter 470 to the SOA 460, and another optical waveguide 479 directs the LO light 430 from output port 2 of the splitter 470 to the combiner 420 of the receiver 140. Alternatively, a PIC 455 may include a light source similar to that illustrated in FIG. 8 or 9, and the PIC may not include a splitter 470. The LO light 430 may be coupled from the back face 451 of the seed laser diode 450 into a waveguide 479 of the PIC 455, and the seed light 440 may be coupled to the SOA 460 either directly (e.g., from the seed laser diode directly to the SOA) or via an optical waveguide 479.

In particular embodiments, a PIC 455 may include one or more lenses 490 configured to collimate light emitted from the PIC 455 or focus light into the PIC 455. A lens 490 may be attached to, connected to, or integrated with the PIC 455. For example, a lens 490 may be fabricated separately and then attached to the PIC 455 (or to a substrate to which the PIC is attached) using epoxy, adhesive, or solder. The output lens 490*a* in FIG. 29 may collimate the emitted pulses of light 400 from the SOA 460 to produce a collimated free-space output beam 125. The output beam 125 may be scanned across a field of regard by a scanner 120 (not illustrated in FIG. 29). Light from an emitted pulse of light 400 may be scattered by a target 130, and a portion of the scattered light may be directed to the receiver 140 as a received pulse of light 410. The input lens 490*b* in FIG. 29 may focus the received pulse of light 410 into a waveguide 479 of the PIC 455, which directs the received pulse of light 410 to the combiner 420. The combiner 420 combines the received pulse of light 410 with the LO light 430 and directs the combined beam 422 to the detector 340 via a waveguide 479. The detector 340 may be butt-coupled or affixed (e.g., with epoxy, adhesive, or solder) to the output waveguide 479 of the combiner 420 so that the combined beam 422 is directly coupled to the detector 340. The LO light 430 and the received pulse of light 410 are coherently mixed together at the detector 340, and the detector 340 produces a photo-current signal i, which is directed to the amplifier 350.

In particular embodiments, a lidar system 100 may include a light source 110 with an optical isolator 530. In FIG. 29, the light source 110 includes a seed laser diode 450, an optical isolator 530, and a SOA 460, where the optical isolator 530 is located between the seed laser diode 450 and the SOA 460. The optical isolator 530 may be an integrated-optic isolator, a fiber-optic isolator, or a free-space isolator. The isolator 530 in FIG. 29 may include a Faraday-type isolator or a filter-type isolator and may be configured to (i) transmit seed light 440 to the SOA 460 and (ii) reduce an amount of light that propagates from the SOA 460 toward the seed laser diode 450.

The optical polarization element 465 in FIG. 29 may alter the polarization of the LO light 430 so that the LO light 430 and the received pulse of light 410 may be coherently mixed. The polarization element 465 may ensure that at least a portion of the received pulse of light 410 and at least a portion of the LO light 430 have polarizations that are oriented in the same direction. The polarization element 465 may include one or more quarter-wave plates, one or more half-wave plates, one or more optical polarizers, one or more optical depolarizers, or any suitable combination thereof. For example, the polarization element 465 may include a quarter-wave plate that converts linearly polarized LO light 430 produced by the seed laser diode 450 into circular or elliptically polarized light. In the example of FIG. 29, the polarization element 465 may be an integrated-optic component that is fabricated as part of the PIC, or the polarization element 465 may be fabricated separately and then attached to the PIC 455 (or to a substrate to which the PIC is attached) using epoxy, adhesive, or solder.

Figure 30:
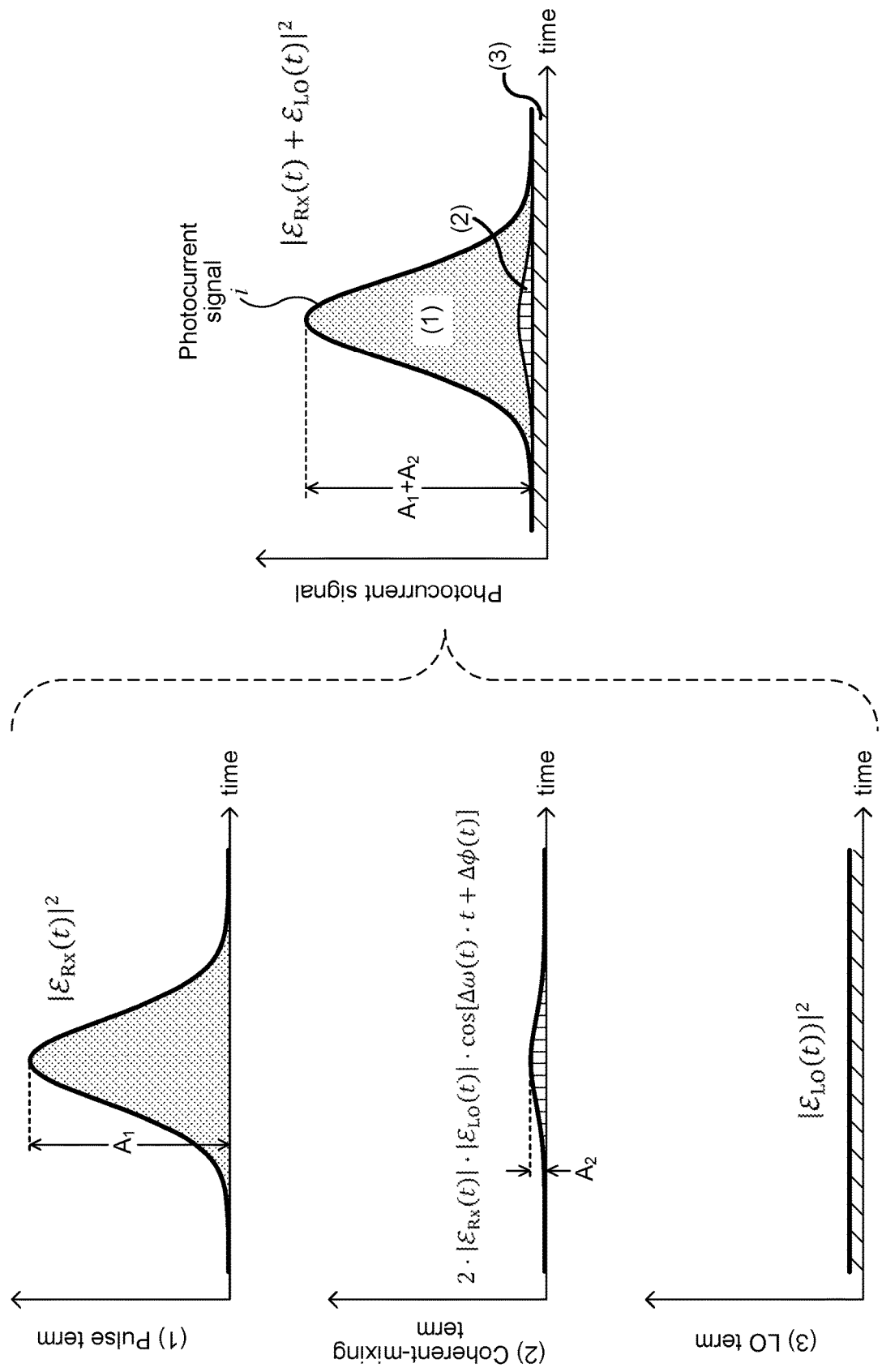
FIGS. 30-31 each illustrates an example photocurrent signal that includes a pulse term, a coherent-mixing term, and a local-oscillator (LO) term.
Figure 31:
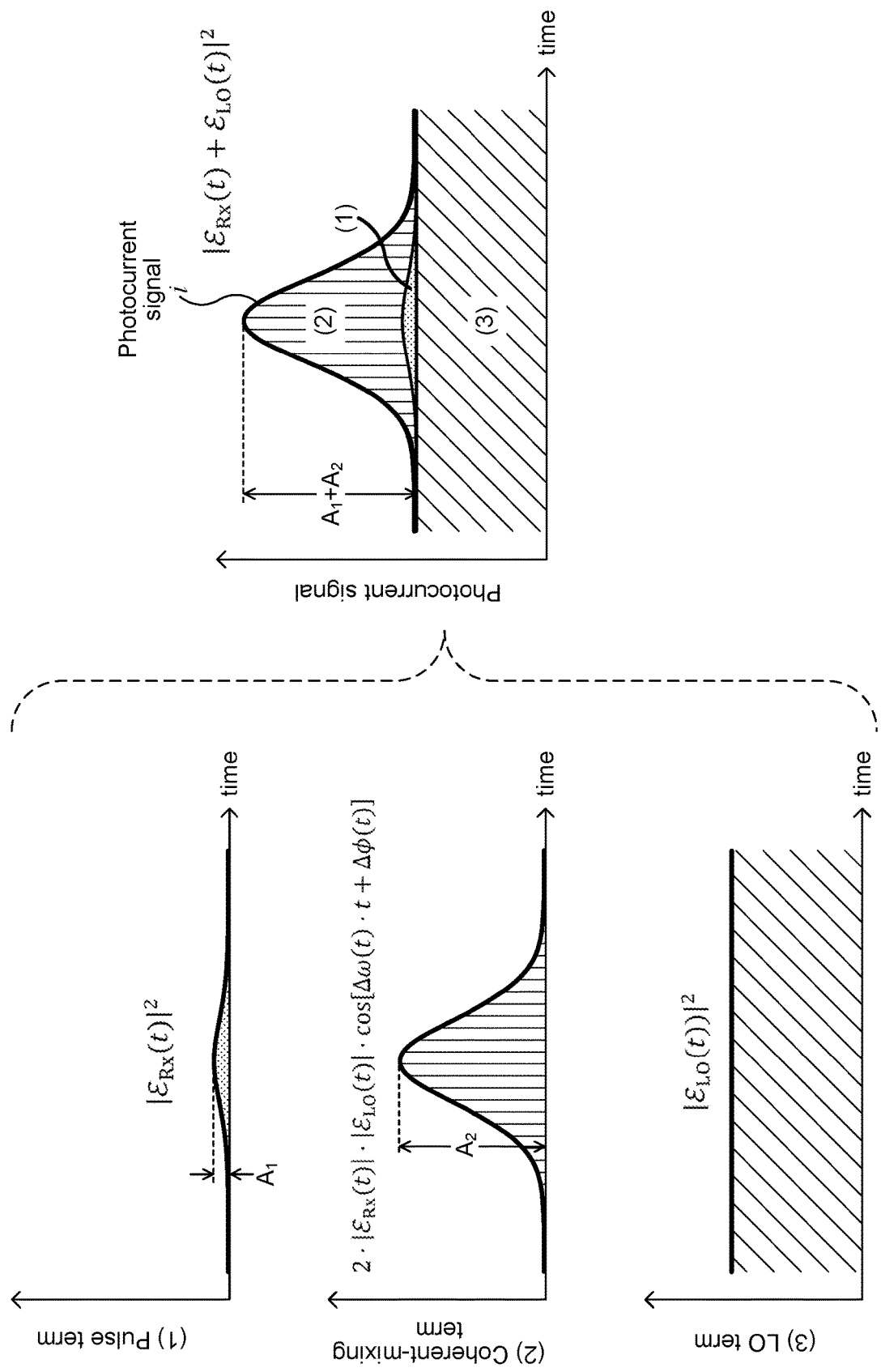

FIGS. 30-31 each illustrates an example photocurrent signal i that includes a pulse term, a coherent-mixing term, and a local-oscillator (LO) term. The pulse term, coherent-mixing term, and the LO term may be referred to as the first term, second term, and third term, respectively. The three graphs on the left in each of FIGS. 30-31 illustrate example temporal behavior of each of the three terms separately: (1) the pulse term, $|\varepsilon_{Rx}(t)|^2$, (2) the coherent-mixing term, $2 \cdot |\varepsilon_{Rx}(t)| \cdot |\varepsilon_{LO}(t)| \cdot \cos[\Delta\omega(t) \cdot t + \Delta\phi(t)]$, and (3) the LO term, $|\varepsilon_{LO}(t)|^2$. The graph on the right in each of FIGS. 30-31, which corresponds to the photocurrent signal i produced by a detector 340, illustrates the sum of the three terms shown separately on the left. The photocurrent signal i may represent the electrical current produced by a detector 340 in response to detecting a received pulse of light 410. The pulse term and the coherent-mixing term each has a temporal shape of a pulse (e.g., a Gaussian pulse), which may correspond to the temporal shape of the received pulse of light 410. The LO term is substantially constant, which corresponds to the optical power of the LO light 430 being approximately constant.

A voltage signal 360 produced by an electronic amplifier 350 from a photocurrent signal i may have a shape or temporal behavior that is similar to the photocurrent signal. For example, a voltage signal 360 produced from the photocurrent signal i in FIG. 30 may include a relatively large voltage pulse (corresponding to the sum of the first and second terms) and a relatively small offset voltage (corresponding to the third term). One or more of the characteristics of the voltage pulse (e.g., duration, rise time, fall time, or shape) may be somewhat different from the corresponding characteristics of the current pulse in the photocurrent signal i. For example, due to electrical-bandwidth limitations of an amplifier 350, the duration, rise time, or fall time of the voltage pulse may be somewhat longer (e.g., between 0% and 20% longer) than the corresponding characteristic of the current pulse.

The amplitudes shown in FIGS. 30-31 represent a peak height or a difference between maximum and minimum values over a time interval associated with a received pulse of light 410. The amplitude $A_1$ represents the peak height or the difference between maximum and minimum values of the pulse term. Similarly, the amplitude $A_2$ represents the peak height or the difference between maximum and minimum values of the coherent-mixing term. The sum of the two amplitudes $A_1+A_2$ represents the amplitude or the difference between maximum and minimum values of the photocurrent signal i.

In FIG. 30, the amplitude of the pulse term ($A_1$) is significantly larger than the amplitude of the coherent-mixing term ($A_2$). The pulse term being significantly larger than the coherent-mixing term indicates that the photocurrent signal i may correspond to a received pulse of light 410 that is scattered from a nearby target 130 or a high-reflectivity target 130. For example, the photocurrent signal i may be produced by a received pulse of light 410 scattered from a target 130 that is located a distance D of less than 50 meters away and that has a reflectivity greater than 70%. The pulse term being significantly larger than the coherent-mixing term may indicate that the hybrid pulsed/coherent lidar system 100 is operating primarily as a direct-detection pulsed lidar system in which the time-of-arrival for the received pulse of light 410 is determined primarily based on the pulse term (the first term).

In FIG. 31, the amplitude of the coherent-mixing term ($A_2$) is significantly larger than the amplitude of the pulse term ($A_1$). The coherent-mixing term being significantly larger than the pulse term indicates that the photocurrent signal i may correspond to a received pulse of light 410 scattered from a relatively distant target 130 or a low-reflectivity target 130. For example, the photocurrent signal i may be produced by a received pulse of light 410 scattered from a target 130 that is located greater than 150 meters away and that has a reflectivity of less than 20%. The coherent-mixing term being significantly larger than the pulse term may indicate that the hybrid pulsed/coherent lidar system 100 is operating primarily as a coherent pulsed lidar system in which the time-of-arrival for the received pulse of light 410 is determined primarily based on the coherent-mixing term (the second term).

Figures 32, 33:
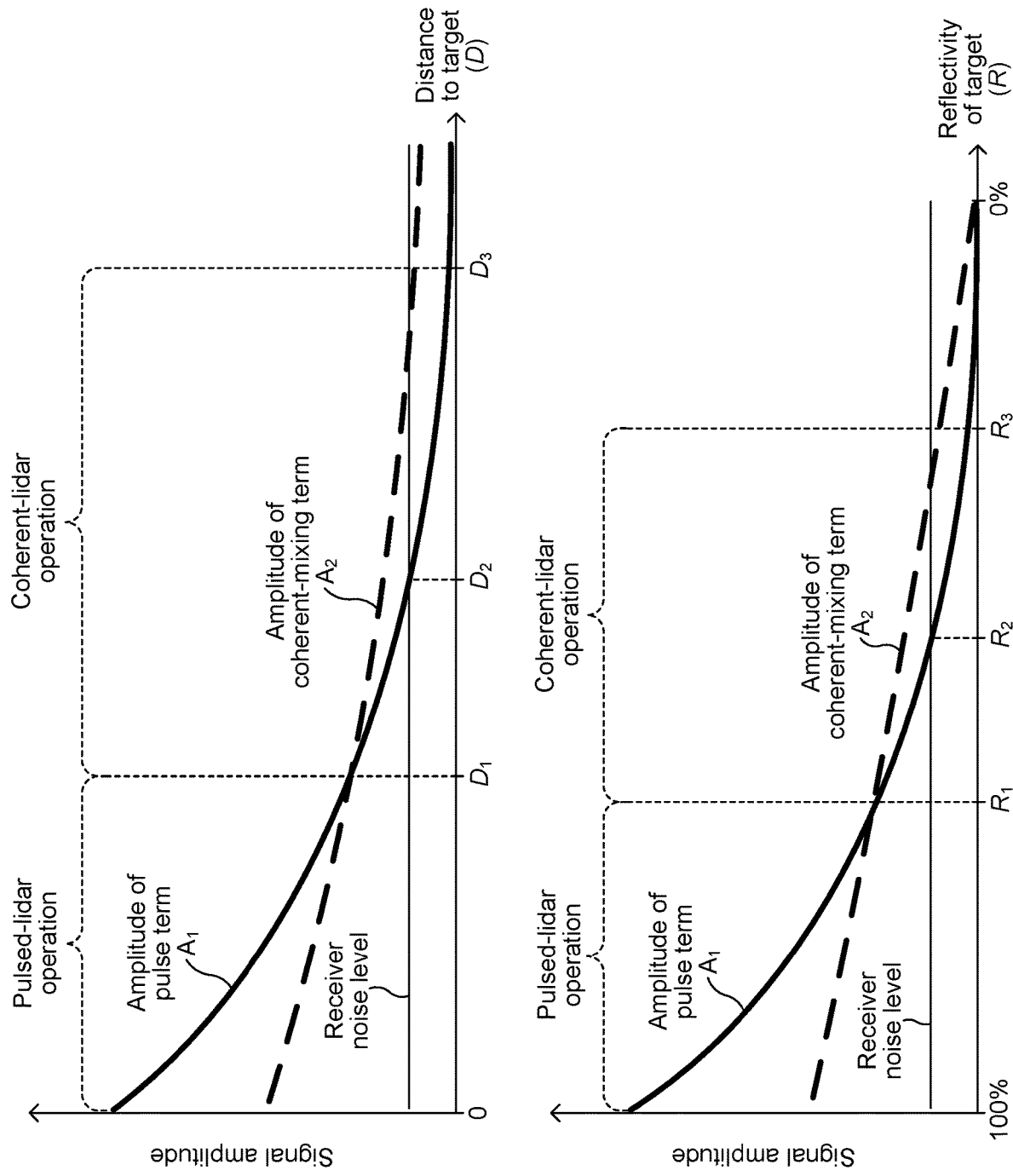
FIG. 32 illustrates an example graph with amplitudes of a pulse term and a coherent-mixing term plotted versus distance to a target.
FIG. 33 illustrates an example graph with amplitudes of a pulse term and a coherent-mixing term plotted versus reflectivity of a target.

FIG. 32 illustrates an example graph with amplitudes of a pulse term and a coherent-mixing term plotted versus distance (D) to a target 130. The pulse term, which is the first term in the expression for photocurrent signal i, may be expressed as $E_{Rx}^2$, and the amplitude $A_1$ of the pulse term corresponds to the peak of the pulse term for a received pulse of light 410. The coherent-mixing term, which is the second term in the expression for photocurrent signal i, may be expressed as $2E_{Rx}E_{LO} \cos[\Delta\omega \cdot t + \Delta\phi]$, and the amplitude $A_2$ of the coherent-mixing term corresponds to the peak of the coherent-mixing term for a received pulse of light 410. The two amplitude curves in FIG. 32 are plotted versus distance, and the values of each curve at a particular distance D correspond to the amplitudes of the pulse and coherent-mixing terms for a received pulse of light 410 scattered from a target 130 located at the distance D. The reflectivity of the target 130 considered in FIG. 32 may be taken as a fixed value (e.g., the target may have a fixed reflectivity of 50%). Both curves in FIG. 32 decrease monotonically with increasing distance to the target 130, indicating that the amplitudes of both the pulse term and the coherent-mixing term decrease as the target gets farther from the lidar system 100.

The sum of the amplitudes of the two curves in FIG. 32 (which corresponds to $A_1+A_2$) represents the amplitude or maximum change of the photocurrent signal i for a received pulse of light 410. The detection and determination of a time-of-arrival for the received pulse of light 410 may be based on the sum of the pulse term and the coherent-mixing term, and the amplitude of this sum corresponds to $A_1+A_2$. For target distances between zero and $D_1$, the pulse term is greater than the coherent-mixing term (so that $A_1>A_2$). In this case (of which FIG. 30 is an example), the time-of-arrival for a received pulse of light 410 may be determined primarily based on the pulse term. While both the pulse term and the coherent-mixing term contribute to the photocurrent signal i and to the detection of a received pulse of light 410, for distances between zero and $D_1$, a hybrid pulsed/coherent lidar system 100 may be referred to as operating primarily as a direct-detection pulsed lidar system, since the pulse term provides a greater contribution to the photocurrent signal i. For target distances between $D_1$ and $D_3$, the coherent-mixing term is greater than the pulse term (so that $A_2 > A_1$). In this case (of which FIG. 31 is an example), the time-of-arrival for a received pulse of light 410 may be determined primarily based on the coherent-mixing term. While both the pulse term and the coherent-mixing term contribute to the photocurrent signal i and to the detection of a received pulse of light 410, for distances between $D_1$ and $D_3$, a hybrid pulsed/coherent lidar system 100 may be referred to as operating primarily as a coherent pulsed lidar system, since the coherent-mixing term provides a greater contribution to the photocurrent signal i.

For distances close to $D_1$, the amplitudes of the pulse term and coherent-mixing term are approximately equal, and the time-of-arrival for a received pulse of light 410 may be determined based on both the pulse term and the coherent-mixing term. In this case, a hybrid pulsed/coherent lidar system 100 may be referred to as operating as both a direct-detection pulsed lidar system and as a coherent pulsed lidar system, since the pulse term and the coherent-mixing term provide approximately equal contributions to the photocurrent signal i. The distance $D_1$ may correspond to a cross-over distance where a hybrid pulsed/coherent lidar system 100 switches from acting primarily as a direct-detection pulsed lidar system (for distances less than $D_1$) to acting primarily as a coherent pulsed lidar system (for distances greater than $D_1$). The cross-over distance $D_1$ may have any suitable value and may depend on the reflectivity of the target 130. For example, $D_1$ may be 30 meters for a target with a reflectivity of 5%, 100 meters for a target with a reflectivity of 50%, and 200 meters for a target with a reflectivity of 80%.

For distances greater than $D_3$, the amplitude of the sum of the pulse term and the coherent-mixing term is less than the noise level of the receiver 140, and the lidar system 100 may not be able to detect a received pulse of light 410 scattered from a target 130 located farther than $D_3$. The detector 340 or electronic amplifier 350 may add electronic noise (e.g., shot noise or thermal noise) to the photocurrent signal i or to the voltage signal 360, and when the level of electronic noise from the receiver 140 exceeds an amplitude that corresponds to $A_1 + A_2$, a lidar system 100 may not be able to detect a received pulse of light 410. The distance $D_3$ may be referred to as the operating distance ($D_{OP}$) of the hybrid pulsed/coherent lidar system 100, and $D_3$ may depend on the target reflectivity R. For example, $D_3$ may be 100 meters for a target with a reflectivity of 5%, 250 meters for a target with a reflectivity of 50%, and 350 meters for a target with a reflectivity of 80%. In FIG. 32, without the coherent-mixing term, the lidar system may operate as a direct-detection pulsed lidar system, and the operating distance may be approximately equal to $D_2$, where the amplitude of the pulse term $A_1$ is equal to the receiver noise level. Operating as a hybrid pulsed/coherent lidar system 100 allows the operating distance to extend beyond $D_2$ to the distance $D_3$. For example, for a target with 80% reflectivity, the distance $D_2$ may be approximately 250 meters, and the distance $D_3$ may be approximately 350 meters, which corresponds to a 100-m increase in operating distance for a hybrid pulsed/coherent lidar system 100 as compared to a direct-detection pulsed lidar system.

FIG. 33 illustrates an example graph with amplitudes of a pulse term and a coherent-mixing term plotted versus reflectivity (R) of a target 130. The two amplitude curves in FIG. 33 are plotted versus target reflectivity, and the values of each curve at a particular reflectivity R correspond to the amplitudes of the pulse and coherent-mixing terms for a received pulse of light 410 scattered from a target 130 having a reflectivity of R. The distance to the target 130 considered in FIG. 33 may be taken as a fixed value (e.g., the target may be located at a fixed distance from the lidar system, such as for example, a distance of 100 meters). Both curves in FIG. 33 decrease monotonically as the target reflectivity decreases, indicating that the amplitudes of both the pulse term and the coherent-mixing term decrease as the reflectivity of the target decreases.

The sum of the amplitudes of the two curves in FIG. 33 (which corresponds to $A_1 + A_2$) represents the amplitude or maximum change of the photocurrent signal i for a received pulse of light 410. The detection and determination of a time-of-arrival for the received pulse of light 410 may be based on the sum of the pulse term and the coherent-mixing term, and the amplitude of this sum corresponds to $A_1 + A_2$. For target reflectivities between 100% and $R_1$, the pulse term is greater than the coherent-mixing term (so that $A_1 > A_2$). In this case (of which FIG. 30 is an example), the time-of-arrival for a received pulse of light 410 may be determined primarily based on the pulse term. For reflectivities between 100% and $R_1$, a hybrid pulsed/coherent lidar system 100 may be referred to as operating primarily as a direct-detection pulsed lidar system, since the pulse term provides a greater contribution to the photocurrent signal i than the coherent-mixing term. For reflectivities between $R_1$ and $R_3$, the coherent-mixing term is greater than the pulse term (so that $A_2 > A_1$). In this case (of which FIG. 31 is an example), the time-of-arrival for a received pulse of light 410 may be determined primarily based on the coherent-mixing term. For reflectivities between $R_1$ and $R_3$, a hybrid pulsed/coherent lidar system 100 may be referred to as operating primarily as a coherent pulsed lidar system, since the coherent-mixing term provides a greater contribution to the photocurrent signal i than the pulse term.

For reflectivities close to $R_1$, the amplitudes of the pulse term and coherent-mixing term are approximately equal, and the time-of-arrival for a received pulse of light 410 may be determined based on both the pulse term and the coherent-mixing term. In this case, a hybrid pulsed/coherent lidar system 100 may be referred to as operating as both a direct-detection pulsed lidar system and as a coherent pulsed lidar system, since the pulse term and the coherent-mixing term provide approximately equal contributions to the photocurrent signal i. The reflectivity $R_1$ may correspond to a cross-over reflectivity where a hybrid pulsed/coherent lidar system 100 switches from acting primarily as a direct-detection pulsed lidar system (for reflectivities greater than $R_1$) to acting primarily as a coherent pulsed lidar system (for reflectivities less than $R_1$). The cross-over reflectivity $R_1$ may have any suitable value and may depend on the distance of the target 130. For example, $R_1$ may be 80% for a target located at 200 meters from the lidar system, 50% for a target located at 100 meters, and 5% for a target located at 30 meters.

For reflectivities less than $R_3$, the amplitude of the sum of the pulse term and the coherent-mixing term is less than the noise level of the receiver 140, and the lidar system 100 may not be able to detect a received pulse of light 410 scattered from a target 130 with a reflectivity less than $R_3$. The reflectivity $R_3$ may be referred to as the operating reflectivity ($R_{OP}$) of the hybrid pulsed/coherent lidar system 100 and may depend on the target distance D. For example, $R_3$ may be 20% for a target located 200 meters from the lidar system, 10% for a target located at 100 meters, and 2% for a target located at 30 meters. In FIG. 33, without the coherent-mixing term, the lidar system may operate as a direct-detection pulsed lidar system, and the operating reflectivity may be approximately equal to $R_2$, where the amplitude of the pulse term $A_1$ is equal to the receiver noise level. Operating as a hybrid pulsed/coherent lidar system 100 allows the operating reflectivity to extend to reflectivities less than $R_2$ to the lower reflectivity value $R_3$. For example, for a target located 200 meters from the lidar system, the reflectivity $R_2$ may be approximately 60%, and the reflectivity $R_3$ may be approximately 20%, which corresponds to an improvement in the sensitivity of the lidar system for low-reflectivity targets.

In particular embodiments, a hybrid pulsed/coherent lidar system 100 may be referred to as operating primarily as a direct-detection pulsed lidar system when a received pulse of light 410 produces a photocurrent signal i where the pulse term (the first term of the photocurrent signal) is greater than the coherent-mixing term (the second term), which corresponds to $A_1 > A_2$. While both the pulse term and the coherent-mixing term contribute to the photocurrent signal i and to the detection of a received pulse of light 410, a hybrid pulsed/coherent lidar system 100 may be referred to as operating primarily as a direct-detection pulsed lidar system when $A_1 > A_2$, since the pulse term provides a greater contribution to the photocurrent signal i. Additionally, the receiver 140 of the lidar system may be referred to as acting as a pulsed-lidar receiver, and the pulse-detection circuit 365 of the receiver (or a controller 150 coupled to the pulse-detection circuit) may be referred to as determining the time-of-arrival for the received pulse of light 410 primarily based on the pulse term. The pulse term being greater than the coherent-mixing term may be associated with the target 130 from which the received pulse of light 410 was scattered (i) being located less than a threshold distance from the lidar system or (ii) having a reflectivity greater than a threshold reflectivity. For example, a hybrid pulsed/coherent lidar system 100 may operate primarily as a direct-detection pulsed lidar system for targets located less than 150 meters from the lidar system and having a reflectivity of greater than 50%. As another example, for a target 130 with a reflectivity of 50%, the lidar system may operate primarily as a direct-detection pulsed lidar system when the target is located less than 150 meters from the lidar system. As another example, for a target 130 located 150 meters from the lidar system, the lidar system may operate primarily as a direct-detection pulsed lidar system when the target reflectivity is greater than 50%.

In particular embodiments, a hybrid pulsed/coherent lidar system 100 may be referred to as operating primarily as a coherent pulsed lidar system when a received pulse of light 410 produces a photocurrent signal i where the coherent-mixing term is greater than the pulse term, which corresponds to $A_2 > A_1$. While both the pulse term and the coherent-mixing term contribute to the photocurrent signal i and to the detection of a received pulse of light 410, a hybrid pulsed/coherent lidar system 100 may be referred to as operating primarily as a coherent pulsed lidar system when $A_2 > A_1$, since the coherent-mixing term provides a greater contribution to the photocurrent signal i. Additionally, the receiver 140 of the lidar system may be referred to as acting as a coherent-lidar receiver, and the pulse-detection circuit 365 of the receiver (or a controller 150 coupled to the pulse-detection circuit) may be referred to as determining the time-of-arrival for the received pulse of light 410 primarily based on the coherent-mixing term. The coherent-mixing term being greater than the pulse term may be associated with the target 130 from which the received pulse of light 410 was scattered (i) being located greater than a threshold distance from the lidar system or (ii) having a reflectivity less than a threshold reflectivity. For example, a hybrid pulsed/coherent lidar system 100 may operate primarily as a coherent pulsed lidar system for targets located more than 150 meters from the lidar system and having a reflectivity of less than 50%. As another example, for a target 130 with a reflectivity of 50%, the lidar system may operate primarily as a coherent pulsed lidar system when the target is located more than 150 meters from the lidar system. As another example, for a target 130 located 150 meters from the lidar system, the lidar system may operate primarily as a coherent pulsed lidar system when the target reflectivity is less than 50%.

Figure 34:
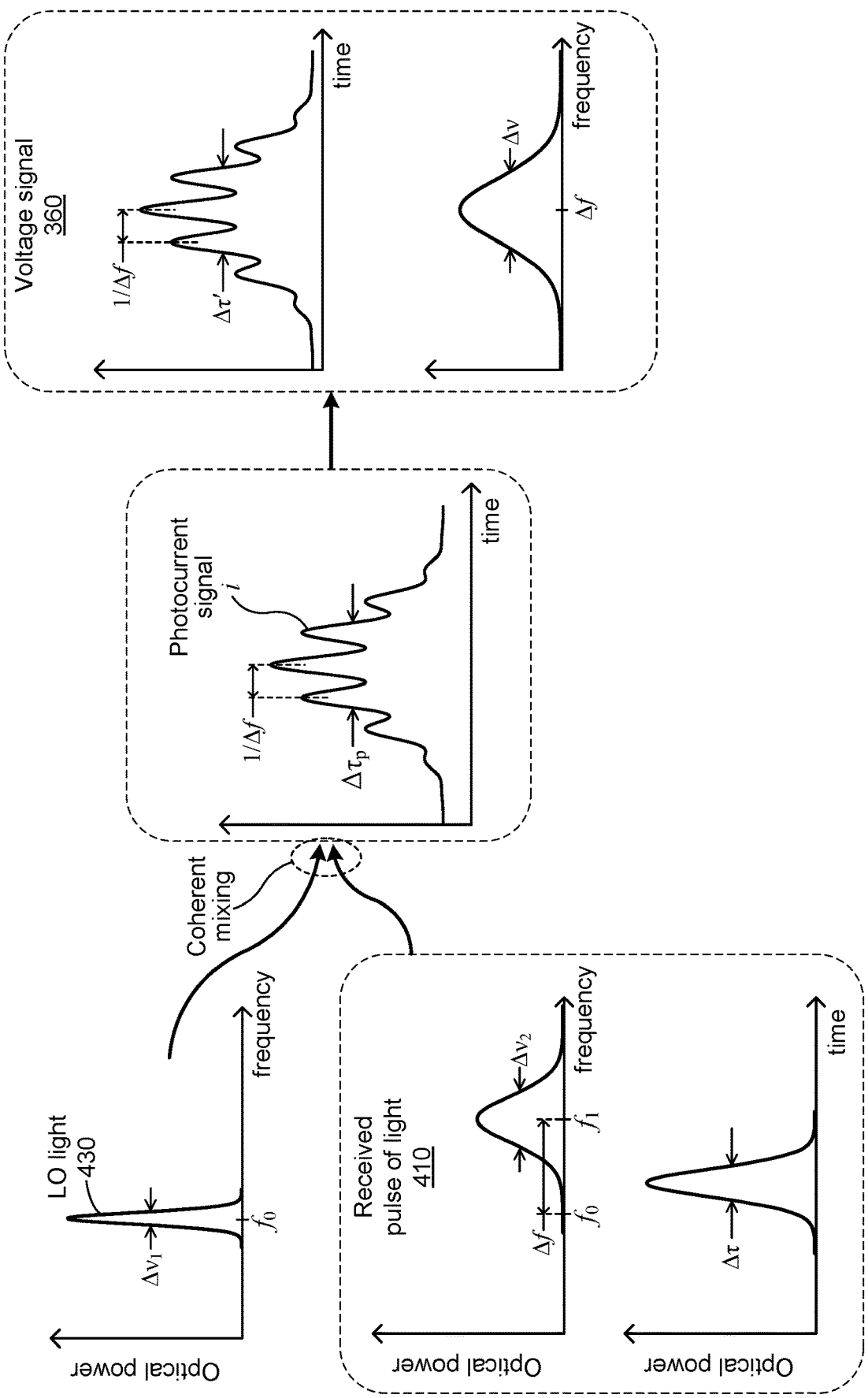
FIG. 34 illustrates an example voltage signal that results from the coherent mixing of LO light and a received pulse of light, where the LO light and the received pulse of light have a frequency difference of $\Delta f$.

FIG. 34 illustrates an example voltage signal 360 that results from the coherent mixing of LO light 430 and a received pulse of light 410, where the LO light and the received pulse of light have a frequency difference of $\Delta f$. The optical spectrum of the LO light 430 indicates that the LO light 430 has a center optical frequency of $f_0$ and a relatively narrow spectral linewidth of $\Delta v_1$. The received pulse of light 410 has a duration of $\Delta \tau$ and an optical spectrum with a center optical frequency of $f_1$ and a broader spectral linewidth of $\Delta v_2$. The optical frequency of the pulse of light 410 is shifted by $\Delta f$ with respect to the frequency of the LO light 430 so that $f_1 = f_0 + \Delta f$. The coherent mixing of the LO light 430 and the received pulse of light 410 at a detector 340 results in a pulse of photocurrent with a duration of $\Delta \tau_p$. The photocurrent signal i may be amplified by an amplifier 350 that produces a corresponding voltage signal 360. The upper voltage-signal graph illustrates the voltage signal 360 in the time domain and includes a pulse of voltage with a duration of $\Delta \tau'$.

In FIG. 34, the photocurrent signal i and the corresponding voltage pulse each includes temporal pulsations (which may be referred to as pulsations or as amplitude modulation). Each pulsation is separated by a time interval $1/\Delta f$, which corresponds to the temporal pulsations occurring at a frequency of $\Delta f$. The lower voltage-signal graph is a frequency-domain graph of the voltage signal 360 that indicates that the voltage signal 360 is centered at a frequency of $\Delta f$ and has an electrical bandwidth of $\Delta v$. The voltage signal 360 being centered at the frequency $\Delta f$ indicates that the voltage signal 360 has a frequency component at approximately $\Delta f$, which corresponds to the periodic time-domain pulsations with time interval $1/\Delta f$. The frequency component $\Delta f$ in the voltage signal 360 arises from the frequency offset of $\Delta f$ between the received pulse of light 410 and the LO light 430. The coherent mixing of LO light 430 and the received pulse of light 410 may result in a photocurrent signal i with a coherent-mixing term that may be expressed as $E_{Rx}E_{LO}\cos[2\pi\cdot\Delta f\cdot t + \phi_{Rx} - \phi_{LO}]$ or as $E_{Rx}E_{LO}\cos[\Delta\omega\cdot t + \phi_{Rx} - \phi_{LO}]$, where $\Delta\omega = 2\phi\Delta f$. Here, since the optical frequencies of the LO light 430 and the received pulse of light 410 are offset by $\Delta f$, the coherent-mixing term varies periodically with a frequency of $\Delta f$. This temporal variation in the coherent-mixing term corresponds to the periodic temporal pulsations and the frequency component of $\Delta f$ in the photocurrent signal i and the voltage signal 360 in FIG. 34. The graphs in FIG. 34 are similar to those in FIG. 17, with the difference being that in FIG. 34, the LO light 430 and the received pulse of light 410 have a frequency difference of $\Delta f$ (which gives rise to the temporal pulsations in the photocurrent signal i and the voltage signal 360).

A frequency difference $\Delta f$ between LO light 430 and a pulse of light (e.g., an emitted pulse of light 400 or a received pulse of light 410) may be referred to as a frequency offset, a frequency shift, a frequency change, or a spectral shift. A frequency difference $\Delta f$ may have any suitable value between approximately 10 MHz and approximately 50 GHz, such as for example a value of approximately 10 MHz, 100 MHz, 200 MHz, 500 MHz, 1 GHz, 2 GHz, 10 GHz, or 50 GHz. The frequency difference $\Delta f$ may be configured to be greater than $1/\Delta \tau$ (where $\Delta \tau$ is the duration of the emitted pulse of light 400 or the received pulse of light 410) or greater than $1/\Delta \tau'$ (where $\Delta \tau'$ is the duration of a voltage pulse corresponding to a received pulse of light 410). For example, the frequency difference $\Delta f$ may be approximately equal to $2/\Delta \tau$, $4/\Delta \tau$, $10/\Delta \tau$, $20/\Delta \tau$, or any other suitable factor of $1/\Delta \tau$. As another example, an emitted pulse of light 400 with a duration $\Delta \tau$ of 5 ns may have a frequency difference $\Delta f$ of greater than 200 MHz. As another example, a light source 110 that emits 5-ns pulses of light 400 may be configured so that the emitted pulses of light have a 1-GHz frequency offset with respect to the LO light 430. Having $\Delta f$ greater than $1/\Delta \tau$ may ensure that voltage signal 360 includes a sufficient number of pulsations that are distinct from the overall pulse envelope of the voltage signal 360. In FIG. 34, $\Delta f$ is approximately equal to $3/\Delta \tau$, and the voltage signal 360 includes approximately seven pulsations superimposed on the pulse envelope. For example, the received pulse of light 410 may have a duration $\Delta \tau$ of 4 ns, and the frequency difference $\Delta f$ may be approximately 750 MHz. This 3× difference between $\Delta f$ and $1/\Delta \tau$ may allow the frequency component $\Delta f$ in the voltage signal 360 to be determined (e.g., by a frequency-detection circuit 600) distinctly from a frequency component associated with the overall pulse envelope of the voltage signal 360. A frequency difference $\Delta f$ may be selected to be less than a maximum electrical bandwidth of a receiver 140 so that the receiver is able to detect the temporal pulsations associated with the frequency difference. For example, the receiver 140 may have an electrical bandwidth from approximately 100 MHz to approximately 1 GHz, and a light source 110 may be configured so that the frequency difference $\Delta f$ is within the 100-MHz to 1-GHz range.

Figure 35:
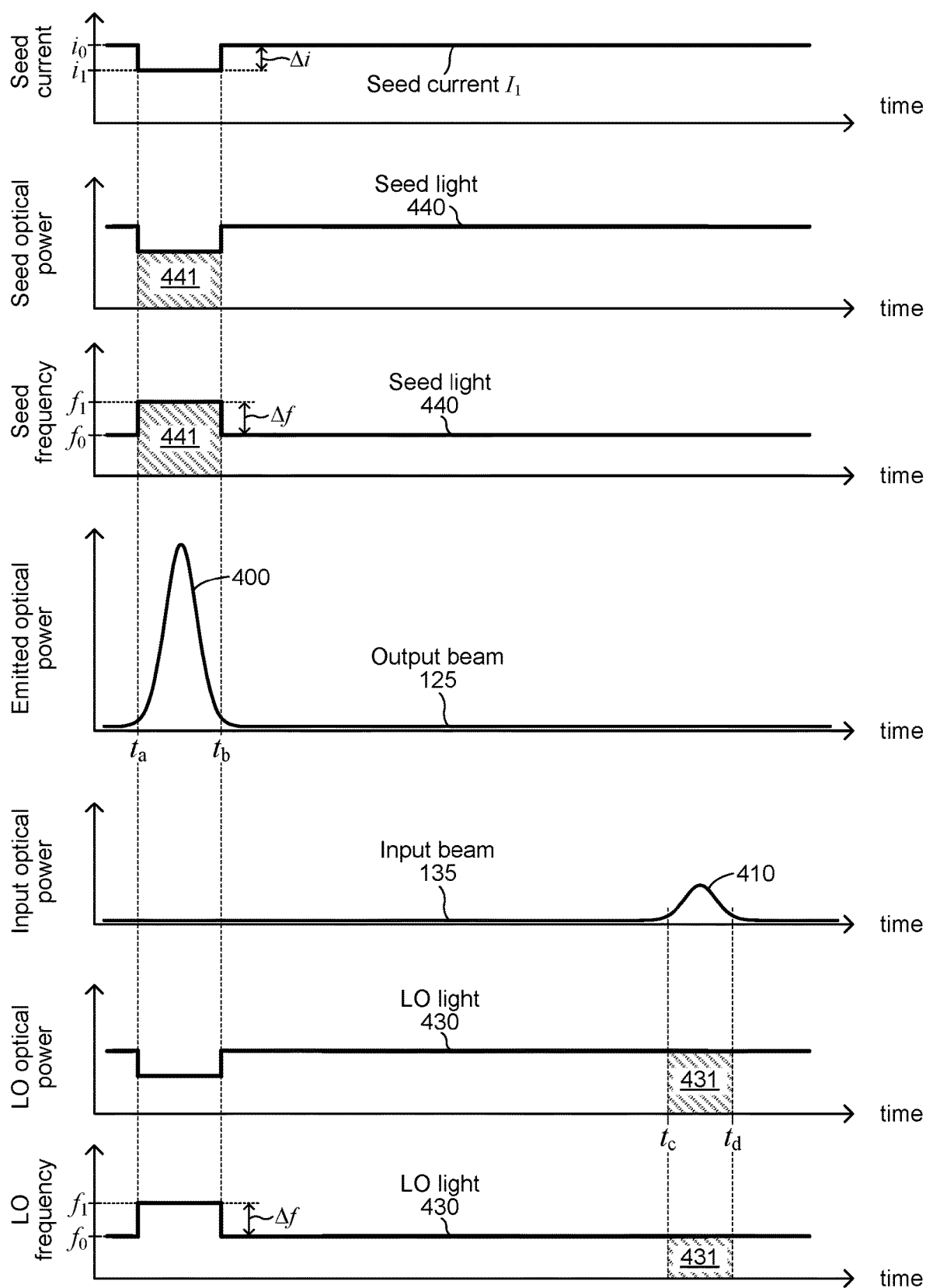
FIG. 35 illustrates example graphs of seed current ($I_1$), seed light, an emitted optical pulse, a received optical pulse, and LO light.

FIG. 35 illustrates example graphs of seed current ($I_1$), seed light 440, an emitted optical pulse 400, a received optical pulse 410, and LO light 430. The graphs in FIG. 35 each illustrates a particular quantity plotted versus time, including the temporal behavior of both the optical power and the optical frequency of the seed light 440 and the LO light 430. In particular embodiments, a light source 110 may change an optical frequency of seed-laser output light 472, seed light 440, LO light 430, or emitted pulses of light 400 by changing the seed current $I_1$ supplied to a seed laser diode 450 or by changing the SOA current $I_2$ supplied to a SOA 460. Rather than incorporating a discrete optical modulator 495 into a light source 110, a light source 110 may impart optical frequency changes based on the electrical current supplied to the seed laser diode 450 or the SOA 460. For example, the light source 110 illustrated in FIG. 6, 8, 9, 10, 11, 12, or 13 may not include a modulator 495 and may impart an optical frequency change based on the electrical current supplied to the seed laser diode 450 or the SOA 460. Changing the electrical current supplied to a seed laser diode 450 or a SOA 460 may cause a corresponding change in the optical frequency of the light emitted by the seed laser diode 450 or the SOA 460 (e.g., the change in optical frequency may result from a change in refractive index, carrier density, or temperature associated with the change in electrical current). For example, an electronic driver 480 may supply a seed laser diode 450 with a time-varying seed current $I_1$ that results in a frequency offset of $\Delta f$ between a received pulse of light 410 and a corresponding temporal portion 431 of LO light 430.

In particular embodiments, a seed current $I_1$ may be alternated between K+1 different current values (where K equals 1, 2, 3, 4, or any other suitable positive integer) so that (i) each temporal portion 441 (and each corresponding emitted pulse of light 400) has a particular optical frequency of K different frequencies and (ii) each corresponding temporal portion 431 of the LO light 430 has one particular optical frequency that is different from each of the other K frequencies. In the example of FIG. 35, the parameter K is 1, and the seed current $I_1$ supplied to a seed laser diode 450 alternates between the two values $i_0$ and $i_1$. The difference of $\Delta i$ (where $\Delta i = i_0 - i_1$) between the two seed-current values may be approximately 1 mA, 2 mA, 5 mA, 10 mA, 20 mA, or any other suitable difference in seed current. For example, an electronic driver 480 may supply seed currents of approximately $i_0 = 102$ mA and $i_1 = 100$ mA, corresponding to a seed-current difference of 2 mA. The seed laser diode 450 produces seed light 440 and LO light 430, and the optical power of the seed light 440 and the LO light 430 may exhibit changes when the seed current $I_1$ is changed. For example, when the seed current $I_1$ is reduced from $i_0$ to $i_1$, the optical power of the seed light 440 or the LO light 430 may be reduced by less than approximately 1 mW, 5 mW, or 10 mW. Additionally, when the seed current $I_1$ is changed between the values $i_0$ and $i_1$, the optical frequency of the seed light 440 and the LO light 430 may change by $\Delta f$ between the respective values $f_0$ and $f_1$. The frequency change $\Delta f$ caused by a change in seed current $I_1$ may be any suitable frequency change between approximately 10 MHz and approximately 50 GHz, such as for example, a frequency change of 100 MHz, 500 MHz, 1 GHz, 2 GHz, or 5 GHz.

In particular embodiments, an electronic driver 480 may (i) supply electrical current $i_1$ to a seed laser diode 450 during a time interval when a pulse of light 400 is emitted by a light source 110 and (ii) supply a different electrical current $i_0$ to the seed laser diode 450 for a period of time after the pulse of light 400 is emitted and prior to the emission of a subsequent pulse of light 400. Switching the electrical current from $i_1$ to $i_0$ may result in a change of the frequency of the LO light 430 by $\Delta f$, where the frequency change is with respect to: (i) the frequency of the seed light 440 or LO light 430 during the time interval when the pulse of light 400 is emitted and (ii) the frequency of the emitted pulse of light 400. A photocurrent signal produced by coherent mixing of a received pulse of light 410 with the LO light 430 may include a frequency component at a frequency of approximately $\Delta f$. In FIG. 35, the seed current $I_1$ is alternated in time between two current values ($i_0$ and $i_1$) so that (i) the temporal portion 441 of the seed light 440 has a frequency $f_1$ and (ii) the LO light 430 (including the temporal portion 431) during a period of time after the pulse of light 400 is emitted has a frequency of $f_0$, where $f_1 = f_0 + \Delta f$. The emitted optical pulse 400 and the received optical pulse 410 may each have optical frequencies of approximately $f_1$, corresponding to the frequency of the temporal portion 441. The received optical pulse 410 may be coherently mixed with the temporal portion 431 of the LO light 430 (which may have a frequency of $f_0$) between the times $t_c$ and $t_d$ to produce a photocurrent signal having temporal pulsations with a frequency of approximately $\Delta f$. The frequency component $\Delta f$ of a corresponding voltage signal 360 may be detected or measured by a frequency-detection circuit 600 to determine a spectral signature of the received optical pulse 410.

In particular embodiments, seed current $I_1$ and SOA current $I_2$ maybe synched together so that (i) the seed current $I_1$ is set to a first value when a pulse of SOA current is supplied to the SOA 460 and (ii) the seed current $I_1$ is set to a second value during the time periods between successive pulses of SOA current. In FIG. 35, when a pulse of light 400 is emitted (between times $t_a$ and $t_b$), the seed current $I_1$ is set to the value $i_1$, and during the time periods between successive pulses of light 400, the seed current $I_1$ is set to the value $i_0$. The seed current $I_1$ may be set to the value $i_0$ for a period of time less than or equal to the pulse period $\tau$, which corresponds to the time between successive pulses of light 400. For example, the seed current $I_1$ may be set to $i_0$ from time $t_b$ until at least time $t_d$. At or before a time when a subsequent pulse of light 400 (not illustrated in FIG. 35) is emitted, the seed current $I_1$ may be switched back to the value $i_1$, which changes the frequency of the seed light 440 and LO light 430 back to $f_1$. After that subsequent pulse of light 400 is emitted, the seed current $I_1$ may again be set to the value $i_0$, which changes the frequency of the LO light 430 by $\Delta f$ to $f_0$.

In particular embodiments, an electronic driver 480 may supply seed current $I_1$ to a seed laser diode 450 where the seed current $I_1$ includes: (i) a substantially constant electrical current (e.g., a DC current) and (ii) a modulated electrical current. The modulated electrical current may include any suitable waveform, such as for example, a sinusoidal, square, pulsed, sawtooth, or triangle waveform. The constant-current portion of the seed current $I_1$ may include a DC current of approximately 50 mA, 100 mA, 200 mA, 500 mA, or any other suitable DC electrical current, and the modulated portion of the seed current $I_1$ may be smaller, with an amplitude of less than or equal to 1 mA, 5 mA, 10 mA, or 20 mA. The modulated portion of the electrical current may produce a corresponding frequency or amplitude modulation in the seed light 440 or the LO light 430. For example, the modulated electrical current may be applied to the seed laser diode 450 when a pulse of light 400 is emitted so that the emitted pulse of light 400 includes a corresponding frequency or amplitude modulation. The modulated electrical current may not be applied during the time period between successive pulses of light 400, and so, during this time the LO light 430 may not include a corresponding frequency or amplitude modulation. When a received pulse of light 410 is coherently mixed with the LO light 430, the photocurrent signal may have a characteristic frequency component corresponding to the frequency or amplitude modulation applied to the emitted pulse of light 400. For example, the characteristic frequency component may be detected or measured by a frequency-detection circuit 600 to determine whether a received pulse of light is a valid received pulse of light.

Figure 36:
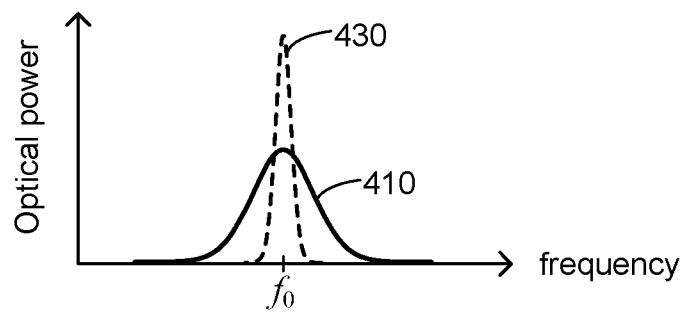
FIGS. 36-38 each illustrates example optical spectra of LO light and a received pulse of light.
Figure 37:
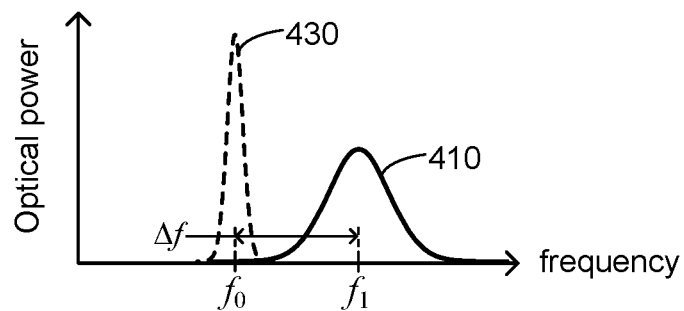
Figure 38:
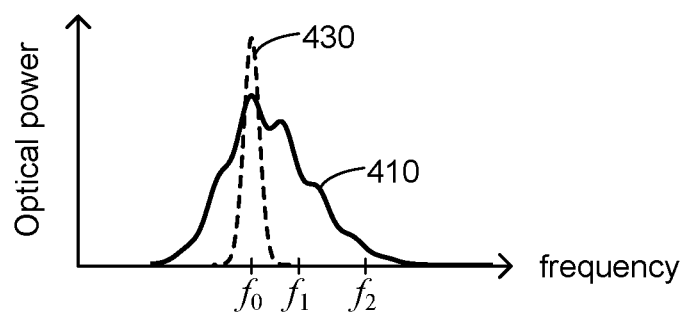
Figure 39:
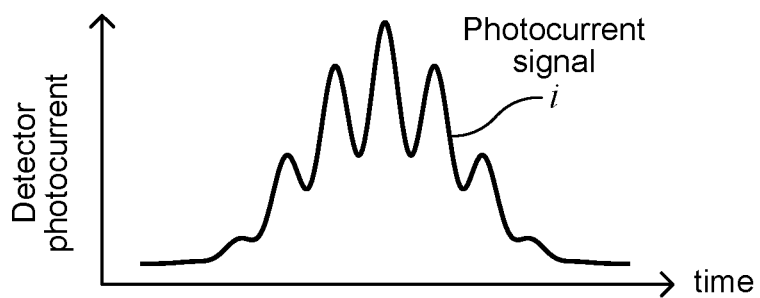
FIGS. 39-41 each illustrates an example photocurrent signal plotted versus time.
Figure 40:
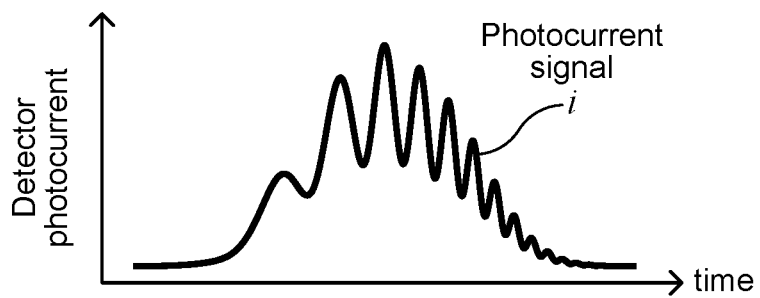
Figure 41:
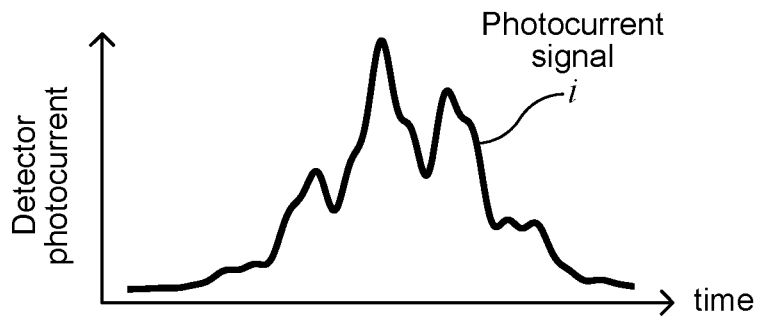

FIGS. 36-38 each illustrates example optical spectra of LO light 430 and a received pulse of light 410. In each of FIGS. 36-38, the optical spectrum of the LO light 430 has a center optical frequency of $f_0$ and a relatively narrow spectral linewidth, and the optical spectrum of the received pulse of light 410 has a broader spectral linewidth. In FIG. 36, the optical spectrum of the received pulse of light 410 also has a center optical frequency of $f_0$, and in FIG. 37, the optical spectrum of the received pulse of light 410 is shifted by $\Delta f$ with respect to the frequency of the LO light 430. The optical spectra in FIG. 36 are similar to those illustrated in FIG. 17, and the optical spectra in FIG. 37 are similar to those illustrated in FIG. 34. In FIG. 38, the optical spectrum of the received pulse of light 410 is nonuniform, having an overall shape that is asymmetric and including some variation or ripples in the spectrum as a function of frequency. The optical spectra in each of the FIGS. 36-38 may correspond to LO light 430 and a received pulse of light 410 that are coherently mixed together at a detector 340 to produce a photocurrent signal i. In the time domain, the resulting photocurrent signal may include a pulse of current as well as temporal pulsations (e.g., as illustrated in FIGS. 39-41). The LO light 430 and the received pulse of light 410 in FIG. 37 may produce a photocurrent signal with temporal pulsations based on the frequency difference $\Delta f$ (e.g., similar to that illustrated in FIG. 34). In FIGS. 36 and 38, the coherent mixing of the LO light 430 and the received pulse of light 410 may result in a photocurrent signal that includes temporal pulsations, with the temporal pulsations resulting from coherent mixing between (i) frequency components of the LO light 430 located near the center optical frequency $f_0$ and (ii) frequency components of the received pulse of light 410 located away from the optical frequency $f_0$. For example, in FIG. 38, the LO light 430 may be coherently mixed with one or more frequency components of the received pulse of light 410 in the frequency range from $f_1$ to $f_2$ to produce temporal pulsations with one or more frequencies in the range from $f_1-f_0$ to $f_2-f_0$.

FIGS. 39-41 each illustrates an example photocurrent signal i plotted versus time. In particular embodiments, a photocurrent signal i produced by coherent mixing of LO light 430 and a received pulse of light 410 may include a pulse of current and temporal pulsations. In each of FIGS. 39-41, the photocurrent signal i includes a pulse of current along with temporal pulsations in current that are superimposed onto the pulse of current. The pulse of current may correspond to a received pulse of light 410, and the temporal pulsations may result from the coherent mixing of the received pulse of light with LO light 430. The photocurrent signal i in FIG. 39 (which is similar to the photocurrent signal in FIG. 34) includes temporal pulsations that are periodic with an approximately fixed period of time between adjacent pulsations. The photocurrent signal i in FIG. 40 includes periodic temporal pulsations with a period of time between adjacent pulsations that decreases with time (e.g., the frequency of the pulsations increases with time). The photocurrent signal i in FIG. 41 includes a pulse of current with pulsations of nonuniform amplitude and period superimposed onto the current pulse. A photocurrent signal i may include temporal pulsations having any suitable amplitude, shape, frequency, or period. The photocurrent signal i in FIG. 39 may be referred to as having uniform periodic temporal pulsations with a fixed frequency, and the photocurrent signal i in FIG. 40 may be referred to as having uniform periodic temporal pulsations with a changing frequency. The photocurrent signal i in FIG. 41 may be referred to as having nonuniform temporal pulsations of varying amplitude and period.

In particular embodiments, a light source 110 of a hybrid pulsed/coherent lidar system 100 may impart a spectral signature to an emitted pulse of light 400. The light source 110 may emit LO light 430 and pulses of light 400, where each emitted pulse of light 400 includes a spectral signature of one or more different spectral signatures. A spectral signature (which may be referred to as a frequency signature, frequency tag, or frequency change) may correspond to the presence or absence of particular frequency components that are imparted to an emitted pulse of light 400. The LO light 430 may have a relatively narrow spectral linewidth centered at a particular optical frequency, and a spectral signature imparted to an emitted pulse of light 400 may correspond to a difference (e.g., a broadening or a shifting) in the optical spectrum of the emitted pulse of light with respect to the LO light. A spectral signature of an emitted pulse of light 400 may include one or more of (i) a spectral linewidth that is broadened with respect to the spectral linewidth of LO light 430 and (ii) a spectral linewidth that is shifted with respect to the LO light 430. The spectral signature of a received pulse of light 410 that includes scattered light from a corresponding emitted pulse of light 400 may be substantially the same as or may be similar to the spectral signature of the corresponding emitted pulse of light. The optical spectrum of each of the received pulses of light 410 in FIGS. 36-38 are broadened with respect to the LO light optical spectrum. For example, LO light 430 may have a spectral linewidth of <10 MHz, and a received pulse of light 410 may have a spectral linewidth of >50 MHz. A broadened optical spectrum may include an optical spectrum that is broadened substantially uniformly or symmetrically (e.g., as illustrated in FIGS. 36-37) or that is broadened nonuniformly or asymmetrically or that includes variation or ripples in the optical spectrum (e.g., as illustrated in FIG. 38). In addition to being broadened, the optical spectrum of the received pulse of light 410 in FIG. 37 is shifted by $\Delta f$ with respect to the LO light optical spectrum. A spectral shift may be achieved by (i) shifting the optical spectrum of LO light 430, (ii) shifting the optical spectrum of an emitted pulse of light 400, or (iii) shifting both optical spectra. For example, in FIG. 37, a light source 110 may (i) shift the spectrum of the LO light 430 by $-\Delta f$ with respect to an emitted pulse of light 400 (which corresponds to the received pulse of light 410), (ii) shift the spectrum of the emitted pulse of light 400 by $+\Delta f$ with respect to the LO light 430, or (iii) shift the spectrum of the LO light by $-\Delta f/2$ and shift the spectrum of the emitted pulse of light 400 by $+\Delta f/2$.

In particular embodiments, LO light 430 may act as a reference optical signal, and coherent mixing of a received pulse of light 410 with LO light may allow the spectral signature of the received pulse of light to be determined. Coherent mixing of LO light 430 and a received pulse of light 410 may be viewed as a down-conversion or heterodyne process that shifts the spectral signature of a received pulse of light from an optical frequency range (e.g., 150-350 THz) down to an electronic frequency range (e.g., 10 MHz-50 GHz). By shifting the spectral signature into an electronic frequency range, the spectral signature may be determined using an electronic measurement technique. A spectral signature may include a broadening or shifting of the optical spectrum of an emitted pulse of light 400 with respect to LO light 430, which corresponds to a signature that is primarily associated with the frequency domain (rather than the time domain). That is, an emitted pulse of light that includes a spectral signature may have a time-domain pulse shape (e.g., a Gaussian pulse) that does not include a significant amount of amplitude modulation superimposed onto the temporal pulse shape. In a hybrid pulsed/coherent lidar system with spectral signatures, the spectral signatures may be encoded primarily onto the optical spectrum of an emitted pulse of light rather than encoding an amplitude-modulation-type signature onto the temporal shape of the pulse of light. When a received pulse of light 410 that includes a spectral signature is coherently mixed with LO light 430, the resulting coherent-mixing term may include temporal pulsations that arise from the spectral signature. In this way, an optical frequency-domain signal (the spectral signature) may be converted into an electronic time-domain signal (the temporal pulsations), which may be measured using a time-domain-based electronic-measurement technique. Thus, while a spectral signature may be considered primarily to be part of the optical spectrum or frequency domain of a pulse of light, in a hybrid pulsed/coherent lidar system 100, the determination of the spectral signature of a pulse of light may be based primarily on a time-domain measurement of temporal pulsations resulting from coherent mixing.

In particular embodiments, a light source 110 may impart a spectral signature to an emitted pulse of light 400 using one or more of: (i) an optical modulator 495, (ii) based on seed current $I_1$ supplied to a seed laser diode 450, (iii) based on SOA current $I_2$ supplied to a SOA 460. For example, an optical modulator 495 (e.g., as illustrated in FIGS. 24-27) or seed current $I_1$ (e.g., as illustrated in FIG. 35) may be used to shift the optical frequency of an emitted pulse of light 400 with respect to LO light 430. Additionally or alternatively, a pulse of SOA current $I_2$ supplied to a SOA 460 may be used to impart a spectral signature to an emitted pulse of light 400.

In particular embodiments, a light source 110 may impart a spectral signature to an emitted pulse of light 400 using an optical modulator 495. For example, a light source 110 may include an optical modulator 495 similar to that illustrated in FIG. 24, 25, 26, or 27. A phase modulator may impart a spectral signature to an emitted pulse of light 400 by shifting the frequency of LO light 430 or seed light 440. For example, the modulator 495 in FIG. 25 may be an electro-optic phase modulator that applies a time-varying phase shift to the seed light 440, which may result in a frequency shift of the seed light 440 with respect to the LO light 430. The resulting emitted pulse of light 400 may include approximately the same frequency shift with respect to the LO light 430. As another example, the modulator 495 in FIG. 26 may be a phase modulator that shifts the frequency of the LO light 430 with respect to the seed light 440.

In particular embodiments, a light source 110 may impart a spectral signature to an emitted pulse of light 400 based on seed current $I_1$ supplied to a seed laser diode 450. For example, a light source 110 may include (i) a seed laser diode 440 that produces seed light 440 and LO light 430 and (ii) a SOA 460 that amplifies temporal portions of the seed light 440 to produce emitted pulses of light 440. A spectral signature imparted to an emitted pulse of light 400 may include a shifted optical spectrum in which the emitted pulse of light 400 and the LO light 430 are offset by a frequency difference of $\Delta f$. An electronic driver 480 may supply seed current $I_1$ to the seed laser diode 450, and (as illustrated in FIG. 35) the optical frequency of the seed light 440 may be changed by changing the seed current $I_1$ by a particular amount ($\Delta i$) to cause a frequency difference of $\Delta f$ between the emitted pulse of light 400 and the LO light 430. In FIG. 35, the electrical current supplied to the seed laser diode is $i_1$ when the seed laser diode produces temporal portion 441 that is amplified to produce the emitted pulse of light 400. After the temporal portion 441 of the seed light 440 is produced, the electrical current supplied to the seed laser diode is changed to $i_0$, where $\Delta i = i_0 - i_1$. The SOA 460, which amplifies the temporal portion 441 of the seed light 440 to produce the emitted pulse of light 400, may substantially maintain the optical frequency of the seed light 440. As a result, the emitted pulse of light 400 or the corresponding received pulse of light 410 may also have approximately the same optical frequency offset of $\Delta f$ with respect to the LO light 430.

In particular embodiments, a light source 110 may impart a spectral signature to an emitted pulse of light 400 based on SOA current $I_2$ supplied to a SOA 460. For example, in addition to or instead of imparting a frequency change to an emitted pulse of light 400 based on the seed current $I_1$, a light source 110 may impart a frequency change to an emitted pulse of light based on the SOA current $I_2$ supplied to a SOA 460. A light source 110 may include (i) a seed laser diode 440 that produces seed light 440 and LO light 430 and (ii) a SOA 460 that amplifies temporal portions of the seed light 440 to produce emitted pulses of light 440. An electronic driver 480 may supply (i) a substantially constant seed current $I_1$ to the seed laser diode and (ii) pulses of electrical current $I_2$ to the SOA 460, where each pulse of current causes the SOA 460 to amplify a temporal portion 441 of the seed light 440 to produce a corresponding emitted pulse of light 400. In addition to amplifying the temporal portion 441, the pulse of current may also cause the SOA 460 to impart a spectral signature to the amplified temporal portion so that the corresponding emitted pulse of light 400 includes the spectral signature. A spectral signature may be imparted to a temporal portion 441 while propagating through and being amplified by the SOA 460, resulting in an emitted pulse of light 400 that includes the spectral signature.

Seed light 440 may have a relatively narrow spectral linewidth that is approximately equal to the spectral linewidth of the LO light 430 (e.g., $\Delta v_1$ in FIG. 34), and amplifying a temporal portion 441 of seed light 440 may result in the linewidth being broadened according to the inverse relationship between pulse duration and spectral linewidth. For example, in FIG. 34, the pulse duration ($\Delta \tau$) and the spectral linewidth ($\Delta v_2$) of the received pulse of light 410 may be related by the expression $\Delta \tau \cdot \Delta v_2 \geq 0.441$. For example, if the pulse duration $\Delta \tau$ is 2 ns, then the spectral linewidth $\Delta v_2$ may be greater than approximately 220 MHz. At least part of a spectral signature imparted to an emitted pulse of light may result from spectral broadening due to the time-bandwidth relationship between pulse duration and spectral linewidth. In addition to broadening the spectral linewidth of an emitted pulse of light 400 based on the time-bandwidth relationship, a light source 110 may also impart at least part of a spectral signature to the emitted pulse of light 400 through one or more nonlinear optical effects. For example, in a light source 110 that includes a seed laser diode 450 and a SOA 460, one or more of the following effects occurring in the seed laser diode 450 or the SOA 460 may impart a spectral signature to an emitted pulse of light: four-wave mixing, Kerr nonlinear optical effect, self-phase modulation, coupled-cavity effects between the seed laser diode and the SOA, stimulated Raman scattering (SRS), stimulated Brillouin scattering (SBS), and plasma dispersion effect. A spectral signature associated with one or more nonlinear optical effects may cause a broadening of the spectral linewidth of an emitted pulse of light 400 or may cause a shift in the optical frequency of an emitted pulse of light 400. A pulse of SOA current $I_2$ may include an amplitude modulation (e.g., a linear or sinusoidal current variation added to the current pulse), and a spectral signature may be imparted to an emitted pulse of light 400 based at least in part on the amplitude modulation of the current pulse. Alternatively, a pulse of SOA current $I_2$ may not include any additional modulation so that the pulse of SOA current increases approximately monotonically, may be held approximately constant for some time, and then decreases approximately monotonically (e.g., as illustrated by the SOA current graph in FIG. 15), and a spectral signature may be imparted to an emitted pulse of light 400 based on (i) the time-bandwidth relationship between pulse duration and spectral linewidth or (ii) one or more nonlinear optical effects.

In particular embodiments, one or more characteristics of a spectral signature imparted to an emitted pulse of light 400 may depend on an amplitude, duration, rise time, fall time, or shape of a corresponding pulse of electrical current supplied to the SOA 460. For example, a spectral signature may include a broadening of the spectral linewidth of an emitted pulse of light 400 with respect to the spectral linewidth of LO light 430, and the amount of spectral broadening may depend at least in part on the amplitude, duration, rise time, fall time, or shape of the corresponding pulse of SOA current $I_2$. A pulse of SOA current with a shorter duration, a shorter rise time, or a shorter fall time may be associated with a greater amount of spectral broadening. As another example, a spectral signature may include a shift in the optical frequency of an emitted pulse of light 400, and the amount of spectral shift may depend at least in part on the amplitude, duration, rise time, fall time, or shape of the corresponding pulse of SOA current. A pulse of SOA current with a shorter duration, a shorter rise time, or a shorter fall time may be associated with a greater amount of spectral shift. In particular embodiments, an electronic driver 480 may be configured to supply pulses of current $I_2$ to a SOA 460, where each pulse of current imparts to each corresponding emitted pulse of light 400 a spectral signature of two or more different spectral signatures. For example, an electronic driver 480 may supply electrical current pulses having two or more different durations or rise times, and each current-pulse duration or rise time may result in an emitted pulse of light 400 having a particular pulse duration and a corresponding particular spectral linewidth. Current pulses with shorter durations or shorter rise times may result in emitted pulses of light 400 having shorter pulse durations and broader spectral linewidths.

Figure 42:
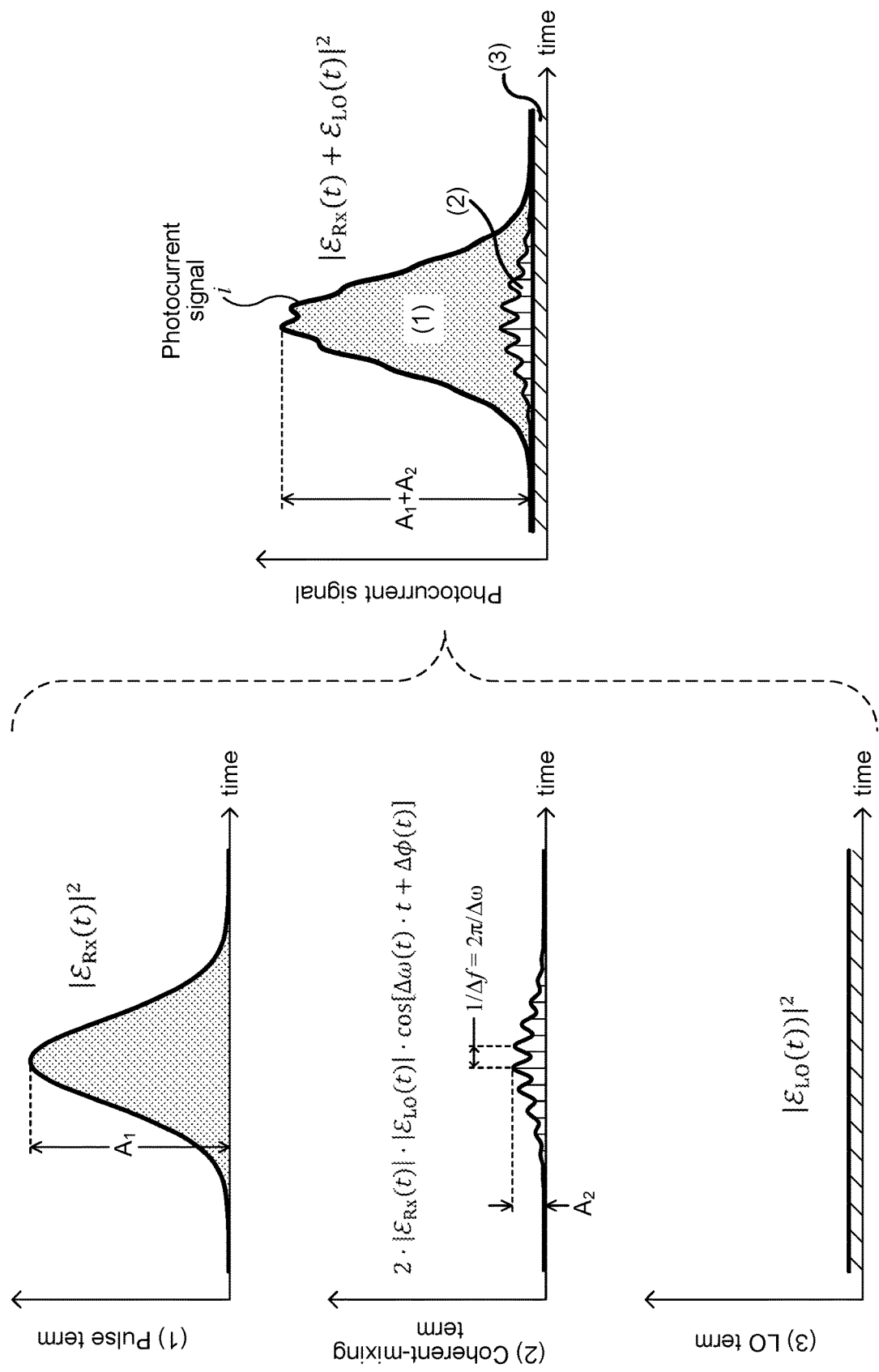
FIGS. 42-43 each illustrates an example photocurrent signal that includes a pulse term, a coherent-mixing term, and a local-oscillator (LO) term.
Figure 43:
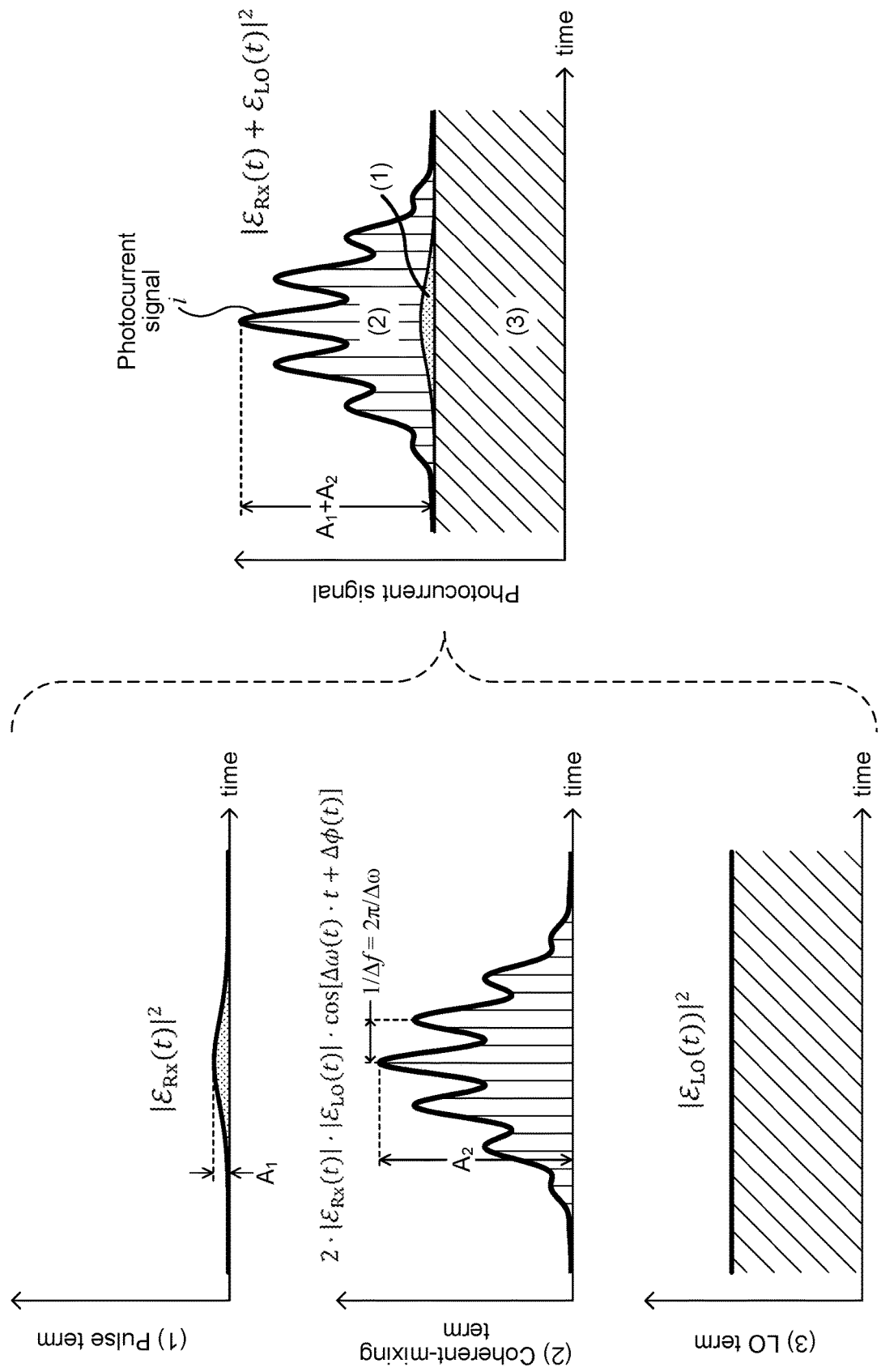

FIGS. 42-43 each illustrates an example photocurrent signal i that includes a pulse term, a coherent-mixing term, and a local-oscillator (LO) term. The three graphs on the left in each of FIGS. 42-43 illustrate example temporal behavior of each of the three terms separately: (1) the pulse term, $|\varepsilon_{Rx}(t)|^2$, (2) the coherent-mixing term, $2 \cdot |\varepsilon_{Rx}(t)| \cdot |E_{LO}(t)| \cdot \cos[\Delta \omega(t) \cdot t + \Delta \phi(t)]$, and (3) the LO term, $|\varepsilon_{LO}(t)|^2$. The graph on the right in each of FIGS. 42-43, which corresponds to the photocurrent signal i produced by a detector 340, illustrates the sum of the three terms shown separately on the left. The photocurrent signal i may represent the electrical current produced by a detector 340 in response to detecting a received pulse of light 410. The pulse term has a temporal shape of a pulse (e.g., a Gaussian pulse), which may correspond to the temporal shape of the received pulse of light. The LO term is substantially constant, which corresponds to the optical power of the LO light 430 being approximately constant. The coherent-mixing term in each of FIGS. 42-43 includes a time varying amplitude modulation superimposed onto a temporal shape of a pulse. The amplitude modulation (which may be referred to as temporal pulsations) of the coherent-mixing term may correspond to a spectral signature of the received pulse of light 410. The temporal pulsations of the coherent-mixing term are also included in the corresponding photocurrent signal i, which equals the sum of the pulse term, coherent-mixing term, and LO term. The graphs in FIGS. 42-43 are similar to the graphs in FIGS. 30-31, except the coherent-mixing term and the photocurrent signal in each of FIGS. 42-43 include temporal pulsations that may correspond to a spectral signature. The photocurrent signal in FIG. 43 is similar to the photocurrent signal in FIG. 34.

The amplitude of the pulse term ($A_1$) in FIG. 42 is significantly larger than the amplitude of the coherent-mixing term ($A_2$), which may correspond to a received pulse of light 410 that is scattered from a nearby target 130 or a high-reflectivity target 130. In this case, a hybrid pulsed/coherent lidar system 100 may be operating primarily as a direct-detection pulsed lidar system. The amplitude of the coherent-mixing term ($A_2$) in FIG. 43 is significantly larger than the amplitude of pulse term ($A_1$), which may correspond to a received pulse of light 410 that is scattered from a relatively distant target 130 or a low-reflectivity target 130. In this case, a hybrid pulsed/coherent lidar system 100 may be operating primarily as a coherent pulsed lidar system.

A voltage signal 360 produced by an electronic amplifier 350 from the photocurrent signal in FIGS. 42-43 may have a shape or temporal behavior that is similar to the photocurrent signal. For example, a voltage signal 360 produced from the photocurrent signal i in FIG. 42 may include a pulse shape with relatively small temporal pulsations corresponding to the temporal pulsations of the coherent-mixing term. As another example, a voltage signal 360 produced from the photocurrent signal i in FIG. 43 may include a pulse shape with relatively large temporal pulsations corresponding to the temporal pulsations of the coherent-mixing term.

In particular embodiments, a receiver 140 of a hybrid pulsed/coherent lidar system 100 may include a pulse-detection circuit 365 that determines a time-of-arrival for a received pulse of light 410. The time-of-arrival may be determined based on the first term (the pulse term) and the second term (the coherent-mixing term) of a photocurrent signal i produced by a detector 340. Additionally, a receiver 140 of a hybrid pulsed/coherent lidar system 100 may include a frequency-detection circuit 600 that determines a spectral signature of the received pulse of light 410. The spectral signature of the received pulse of light 410 may be determined based on the second term (the coherent-mixing term) of the photocurrent signal i. The second term of the photocurrent signal i (as well as the corresponding voltage signal 360) may include temporal pulsations (which may be referred to as amplitude modulation) that correspond to the spectral signature of the received pulse of light 410. The frequency-detection circuit 600 may determine the spectral signature of the received pulse of light 410 based on the temporal pulsations of the corresponding voltage signal 360. For example, the frequency-detection circuit 600 may determine a frequency or amplitude of one or more frequency components associated with the temporal pulsations. One frequency component of the temporal pulsations may be approximately equal to a frequency difference $\Delta f$ between the received pulse of light and the LO light 430, and the frequency-detection circuit may determine the spectral signature of the received pulse of light by determining the frequency $\Delta f$ of the temporal pulsations or by determining an amplitude of the frequency component at the frequency $\Delta f$.

In particular embodiments, a frequency-detection circuit 600 may include multiple parallel frequency-measurement channels, where each frequency-measurement channel includes an electronic band-pass filter 610 and a corresponding amplitude detector 620 (e.g., as illustrated in FIG. 7). A spectral signature of a received pulse of light 410 may include one or more frequency components, and the corresponding photocurrent signal i and voltage signal 360 may include substantially the same frequency components. The frequency-detection circuit 600 may determine a spectral signature of a received pulse of light 410 by determining the frequency or amplitude of one or more frequency components of a voltage signal 360, where the voltage signal corresponds to a photocurrent signal i associated with the received pulse of light. For example, the photocurrent signal i in FIG. 34 may have a frequency component with a frequency of $\Delta f$, and a frequency-detection circuit 600 may include a frequency-measurement channel with a band-pass filter 610 with a center frequency of approximately $\Delta f$. As another example, the photocurrent signal i in FIG. 40 may have multiple frequency components or a range of frequency components from approximately 400 MHz to approximately 1 GHz, and a frequency-detection circuit 600 may include multiple band-pass filters 610 with center frequencies distributed in the 400-MHz to 1-GHz range. As another example, the photocurrent signal i in FIG. 41 may have two or more distinct frequency components, and a frequency-detection circuit 600 may include two frequency-measurement channels configured to determine an amplitude of each of the frequency components.

The frequency-detection circuit 600 illustrated in FIG. 7 may be used to determine the spectral signature of a received pulse of light 410 by determining the frequency or amplitude of one or more frequency components of a photocurrent signal i associated with the received pulse of light. For example, a frequency-detection circuit 600 may determine whether a voltage signal 360 includes one or more particular frequency components, where each of the frequency components corresponds to one of the frequency-measurement channels of the frequency-detection circuit 600. Additionally, the frequency-detection circuit 600 may determine an amplitude of each of the one or more particular frequency components. The spectral signature of the received pulse of light 410 as determined by the frequency-detection circuit 600 may include a list of one or more frequency components in the voltage signal 360. Additionally, the spectral-signature list may include an amplitude of each of the frequency components in the voltage signal 360. In the example of FIG. 7, the frequency-detection circuit 600 includes M band-pass filters 610 and M amplitude detectors 620. Each band-pass filter 610 has a center frequency corresponding to a particular frequency component (from $f_a$ to $f_M$), and each amplitude detector 620 may produce a signal corresponding to the amplitude of the particular frequency component. The frequency-detection output signal produced by the frequency-detection circuit 600 may include M digital values corresponding to the amplitudes of the M frequency components. For example, a frequency-detection circuit 600 may include 10 band-pass filters 610, each filter having a center frequency of 100 MHz, 200 MHz, . . . , 900 MHz, or 1 GHz, and the frequency-detection output signal may include 10 digital values corresponding to the amplitudes of each of the 10 frequency components.

In particular embodiments, a hybrid pulsed/coherent lidar system 100 may include a controller 150 (which may be referred to as a processor) that determines whether a spectral signature of a received pulse of light 410 matches a spectral signature of an emitted pulse of light 400. The processor may compare the spectral signature of the received pulse of light 400 to the spectral signature of the emitted pulse of light 400 to determine a spectral-signature score that represents an amount of correlation between the two spectral signatures. If the spectral-signature score is greater than a particular threshold value, then the processor may determine that the two spectral signatures match. The two spectral signatures matching may indicate that the received pulse of light 410 is associated with a particular emitted pulse of light 400, which indicates that the received pulse of light includes light from the emitted pulse of light that was scattered from a target 130. The threshold value for determining that two spectral signatures match may be any suitable value, such as for example, 1.0 (indicating a 100% correlation between the two spectral signatures), 0.9 (indicating a 90% correlation), or 0.8 (indicating an 80% correlation). For example, a frequency-detection circuit 600 may include 10 frequency-measurement channels that measure 10 different frequency components, and based on the amplitudes of the 10 frequency components, a processor may determine whether a received pulse of light 410 is associated with a particular emitted pulse of light 400. If all 10 frequency components match (e.g., 100% correlation between the two spectral signatures), then the processor may determine that the received pulse of light 410 is associated with the particular emitted pulse of light 400. Alternatively, if 8 or more frequency components match (e.g., ≥80% correlation), then the processor may determine that the received pulse of light 410 is associated with the particular emitted pulse of light 400.

In particular embodiments, a controller 150 may determine, based on the amplitudes of one or more frequency components associated with a received pulse of light 410, whether the received pulse of light 410 is associated with a particular emitted pulse of light 400. If one or more frequency components of a received pulse of light 410 match a spectral signature of a particular emitted pulse of light 400, then the controller 150 may determine that the received pulse of light 410 is associated with the particular emitted pulse of light 400. A received pulse of light 410 being associated with an emitted pulse of light 400 may refer to the received pulse of light including a portion light from the emitted pulse of light (e.g., the received pulse of light includes light from the emitted pulse of light that was scattered from a target 130). Otherwise, if the frequency components do not match, then the controller 150 may determine that the received pulse of light 410 is not associated with the particular emitted pulse of light 400 (e.g., the received pulse of light 410 does not include scattered light from the emitted pulse of light 400). For example, the received pulse of light 410 may be associated with a different pulse of light 400 emitted by the light source 110 of the lidar system 100, or the received pulse of light 410 may be associated with an interfering optical signal emitted by a different light source external to the lidar system 100. As another example, a particular pulse of light 400 emitted by the light source 110 may include a spectral signature that produces a coherent-mixing term with an amplitude modulation at one or more particular frequencies (e.g., 600 MHz and 1 GHz), and a frequency-detection circuit 600 may include filters 610 and amplitude detectors 620 that determine the amplitude of the frequency components for a received pulse of light 410. If the amplitudes of the two frequency components are each greater than a particular threshold value (or within a range of two particular threshold values), then the controller 150 may determine that the received pulse of light 410 is associated with and includes light from the particular emitted pulse of light 400. Otherwise, if the amplitude one or both frequency components are less than the particular threshold value, then the controller 150 may determine that the received pulse of light 410 is not associated with and does not include light from the particular emitted pulse of light 400. Additionally or alternatively, if the amplitude of a different frequency component (e.g., a 0.8-GHz frequency component) that is not part of a particular spectral signature is greater than a particular threshold value, then the controller may determine that the received pulse of light 400 is not associated with an emitted pulse of light 400 having that particular spectral signature.

In particular embodiments, a spectral signature of a received pulse of light 410 matching a spectral signature of an emitted pulse of light 400 may correspond to the spectral signature of the received pulse of light including at least a particular minimum amount of frequency components associated with the spectral signature of the emitted pulse of light. Determining whether two spectral signatures match may require that some minimum number (e.g., greater than 2, 4, or 8) or some minimum percentage (e.g., greater than 50%, 75%, or 90%) of the frequency components are included in each of the spectral signatures. For example, an emitted pulse of light 400 may include a spectral signature associated with the four frequency components 400 MHz, 500 MHz, 600 MHz, and 700 MHz. A received pulse of light 410 with a spectral signature that includes all of the four frequency components (e.g., 100% of the frequency components) may be determined to match the spectral signature of the emitted pulse of light 400. Alternatively, a received pulse of light 410 with a spectral signature that includes at least three of the four frequency components (e.g., at least 75% of the frequency components) may be determined to match the spectral signature of the emitted pulse of light 400. Additionally, a spectral signature of a received pulse of light 410 matching a spectral signature of an emitted pulse of light 400 may further correspond to the spectral signature of the received pulse of light including less than a particular maximum amount of frequency components that are not associated with the spectral signature of the emitted pulse of light. In addition to a requirement that some minimum number or percentage of frequency components are included in each of the spectral signatures, determining whether two spectral signatures match may also require the occurrence of less than some maximum number (e.g., less than 1, 2, or 3) or percentage (e.g., less than 5%, 10%, or 20%) of non-matching frequency components. For the emitted pulse of light 400 that includes a spectral signature associated with the four frequency components 400 MHz, 500 MHz, 600 MHz, and 700 MHz, if the received pulse of light 410 also includes two non-matching frequency components (e.g., at 200 MHz and 900 MHz), then the two spectral signatures may be determined not to match (e.g., the criteria may require no more than one non-matching frequency component). Alternatively, the criteria may require zero non-matching frequency components, and if the received pulse of light 410 also includes one non-matching frequency component, then the two spectral signatures may be determined not to match. Determining whether two spectral signatures match based on the presence of a particular number or percentage of frequency components may be referred to as determining a spectral-signature score, where the spectral signature score represents an amount of correlation between the two spectral signatures.

In particular embodiments, a frequency-detection circuit 600 may include a matched filter. The matched filter may be used to compare the spectral signature of an emitted pulse of light 400 with the spectral signature of a received pulse of light 410 to determine a spectral-signature score representing an amount of correlation between the two spectral signatures.

Figure 44:
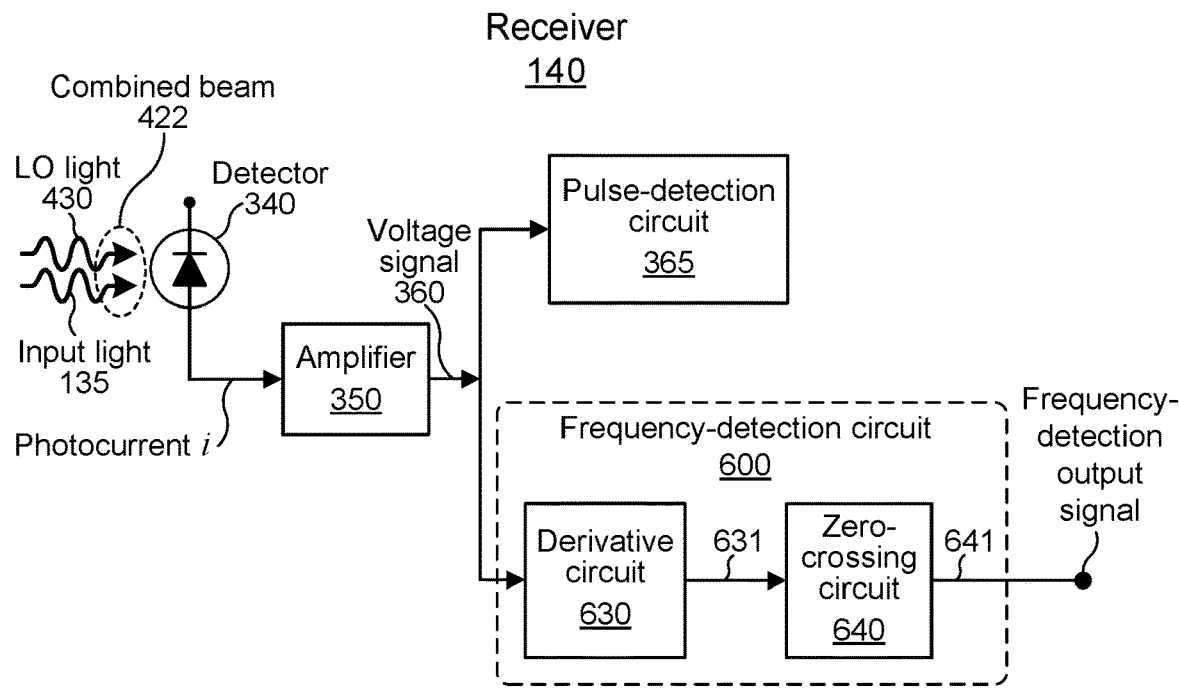
FIG. 44 illustrates an example receiver that includes a frequency-detection circuit with a derivative circuit and a zero-crossing circuit.

FIG. 44 illustrates an example receiver 140 that includes a frequency-detection circuit 600 with a derivative circuit 630 and a zero-crossing circuit 640. In particular embodiments, a hybrid pulsed/coherent lidar system 100 may include a receiver 140 with a frequency-detection circuit 600 that includes a derivative circuit 630 and a zero-crossing circuit 640. The derivative circuit 630 may receive a voltage signal 360 and produce a derivative signal 631 corresponding to a first derivative with respect to time of the voltage signal. The voltage signal 360 may correspond to the photocurrent signal i, and the derivative signal 631 may correspond to a first derivative of the photocurrent signal i. The derivative circuit 630 may include an analog differentiator, such as for example, an operational amplifier with a series capacitor located at the inverting input terminal and a resistor located across the operational amplifier to provide negative feedback. The derivative signal 631 may be an analog voltage signal that is proportional to the first derivative with respect to time of the voltage signal 360. The zero-crossing circuit 640 may determine two or more zero crossings 641 of the derivative signal 631. Each zero crossing may include a time value indicating a time at which the derivative signal 631 crosses the x-axis, where the x-axis corresponds to a value of zero volts for the derivative signal. The zero-crossing circuit 640 may include a comparator 370 followed by a timer circuit (e.g., a TDC 380), and the threshold voltage for the comparator may be set to approximately zero volts. When the derivative signal 631 crosses zero volts, the comparator 370 may produce an electrical-edge signal, and the timer circuit may produce a digital value that represents a time when the edge signal is received from the comparator. The frequency-detection output signal may include two or more digital time values, each time value corresponding to one of the zero crossings 641.

Figure 45:
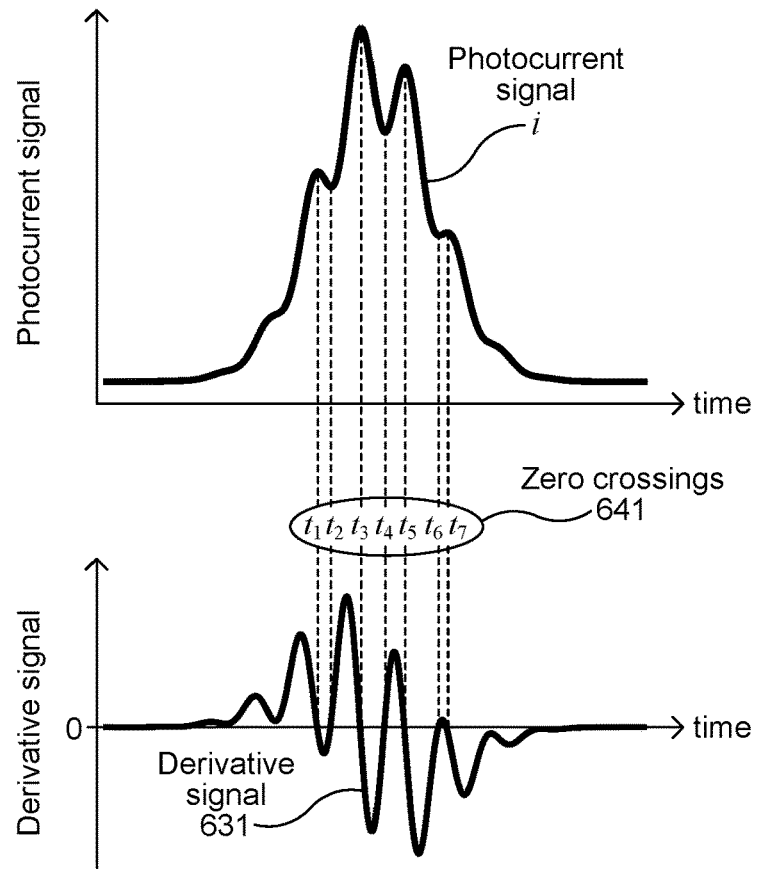
FIG. 45 illustrates an example photocurrent signal and a corresponding derivative signal.

FIG. 45 illustrates an example photocurrent signal i and a corresponding derivative signal 631. The photocurrent signal i includes temporal pulsations that may correspond to a spectral signature, and the derivative signal 631 represents a first derivative of the photocurrent signal. Each zero crossing 641 of the derivative signal 631 corresponds to a peak or valley (e.g., a point with zero slope) of the photocurrent signal i. The derivative signal 631 in FIG. 45 includes seven zero crossings 641, represented by the seven time values $t_1$, $t_2$, $t_3$, $t_4$, $t_5$, $t_6$, and $t_7$. The zero crossings 641 may be referred to as a spectral-signature pattern and may represent the spectral signature of a received pulse of light 410 corresponding to the photocurrent signal i.

The frequency-detection circuit 600 in FIG. 44 may send a frequency-detection output signal that includes the time values of the zero crossings 641 to a controller 150. Based on the zero crossings 641, the controller 150 may determine whether the spectral signature of a received pulse of light 410 matches a spectral signature of an emitted pulse of light 400. Determining whether the two spectral signatures match may include comparing or correlating the zero crossings 641 associated with the received pulse of light 410 with zero crossings associated with the emitted pulse of light 400. The processor may compare the zero crossings 641 of the received pulse of light 410 to the zero crossings of the emitted pulse of light to determine a spectral-signature score that represents an amount of correlation between the two spectral signatures. If the spectral-signature score is greater than a particular threshold value, then the processor may determine that the two spectral signatures match. Determining that two spectral signatures match may require greater than 70% correlation, 80% correlation, 90% correlation, or any other suitable amount of correlation between zero-crossing values associated with the two spectral signatures. For example, if 8 out of 10 zero-crossing values match (indicating an 80% correlation), then the processor may determine that the two spectral signatures match. Alternatively, if 7 out of 10 zero-crossing values match (indicating less than 80% correlation), then the processor may determine that the two spectral signatures do not match. Comparing two sets of zero crossings 641 may include a direct comparison of time values (e.g., compare the time intervals $t_2-t_1$, $t_3-t_1$, $t_4-t_1$, etc. of the received pulse of light 410 with corresponding time intervals of the emitted pulse of light 400). Alternatively, comparing two sets of zero crossings 641 may include comparing ratios of time intervals, which may allow for scaling, distortion, or stretching of one set of zero crossings with respect to another (e.g., due to a Doppler shift). For example, the scaled time-interval values $(t_3-t_1)/(t_2-t_1)$, $(t_4-t_1)/(t_2-t_1)$, $(t_5-t_1)/(t_2-t_1)$, etc. of the received pulse of light 410 may be compared with corresponding scaled time-interval values of the emitted pulse of light 400.

In particular embodiments, a light source 110 may impart a spectral signature to emitted pulses of light 400 in a deterministic manner so that each emitted pulse of light includes a predetermined spectral signature. The light source 110 may impart a spectral signature to each emitted pulse of light 400 using an optical modulator 495, seed current $I_1$, or SOA current $I_2$, and each emitted pulse of light may include a predetermined spectral signature of one or more different spectral signatures. The light source 110 may impart substantially the same spectral signature to each of the emitted pulses of light 400, or the light source 110 may impart two or more different spectral signatures so that each emitted pulse of light 400 includes one of the different spectral signatures. For example, a light source 110 may impart a spectral signature to each emitted pulse of light 400 using an optical modulator 495, and the spectral signature imparted to an emitted pulse of light 400 may depend on the electronic drive signal (e.g., RF power or frequency) supplied to the modulator 495. An optical modulator 495 may be operated with the same drive signal for each emitted pulse of light 400, and each emitted pulse of light 400 may have substantially the same spectral signature. Alternatively, an optical modulator 495 may be operated with n different drive signals (where n is an integer greater than or equal to 2), and each emitted pulse of light 400 may have one of n different corresponding spectral signatures. The spectral signatures imparted by the optical modulator 495 may be deterministic in that an imparted spectral signature may be determined primarily based on the drive signal supplied to the modulator. For example, two emitted pulses of light may have substantially the same spectral signature if the same drive parameters are supplied to the optical modulator 495.

In particular embodiments, a light source 110 may impart spectral signatures to emitted pulses of light 400 in a pseudo-random manner so that each emitted pulse of light includes a non-predetermined spectral signature. Pseudo-random spectral signatures (which may be referred to as non-deterministic spectral signatures or random spectral signatures) may be produced through a process that includes at least some random or non-deterministic addition of frequency components to an emitted pulse of light 400. For example, a light source 110 may impart a spectral signature to each emitted pulse of light 400 based on the SOA current $I_2$ supplied to a SOA 460. The particular spectral signature imparted to an emitted pulse of light 400 may depend on the pulse characteristics (e.g., amplitude, duration, rise time, fall time, or shape) of a corresponding pulse of electrical current supplied to the SOA 460. Frequency components may be added to an emitted pulse of light 400 based on the inverse relationship between the duration ($\Delta\tau$) and the spectral linewidth ($\Delta v_2$), and this process may be substantially deterministic (e.g., based on the relationship $\Delta\tau \cdot \Delta v_2 \geq 0.441$). Frequency components may also be added to an emitted pulse of light based on one or more nonlinear optical effects occurring within the seed laser diode 450 or the SOA 460, and these effects may be substantially non-deterministic. That is, due at least in part to the pseudo-random nature of the nonlinear optical effects, two emitted pulses of light 400 produced by two pulses of current with substantially the same pulse characteristics may have different spectral signatures. For example, an electronic driver 480 may supply pulses of current I₂ to a SOA 460, where each pulse of current has substantially the same amplitude, duration, rise time, fall time, and shape, and the corresponding emitted pulses of light 400 may each have a different spectral signature. In case the random variation of spectral signatures may not provide enough variation to differentiate between different pulses of light, an electronic driver 480 may change the pulse characteristics of the pulses of current supplied to the SOA 460. For example, to produce n emitted pulses of light 400 having n significantly different spectral signatures, an electronic driver 480 may supplied pulses of current having n different pulse characteristics (e.g., n different rise times or durations). The n different spectral signatures may be differentiated from one another since they may include different frequency components based on (i) the different pulse characteristics and (ii) the random behavior of nonlinear optical effects.

In particular embodiments, a frequency-detection circuit 600 of a hybrid pulsed/coherent lidar system 100 may determine a spectral signature of an emitted pulse of light 400. In addition to determining the spectral signatures of received pulses of light 410, a frequency-detection circuit 600 may also determine the spectral signatures of one or more of the emitted pulses of light 400. For example, if spectral signatures are imparted to emitted pulses of light 400 in a pseudo-random manner, then the spectral signature of each emitted pulse of light may be determined using a frequency-detection circuit 600. A portion of each emitted pulse of light 400 may be split off and sent to the receiver 140. For example, prior to an emitted pulse of light 400 exiting the lidar system 100, an optical splitter 470 may split off a relatively small portion of the emitted pulse of light 400 (e.g., <10% of the pulse energy may be split off). The receiver 140 may detect LO light 430 and the split-off portion of the emitted pulse of light, and a detector 340 may produce a photocurrent signal corresponding to coherent mixing of the LO light 430 and the split-off portion of the emitted pulse of light. The frequency-detection circuit 600 may determine the spectral signature of the emitted pulse of light based on the second term of the photocurrent signal resulting from coherent mixing of the LO light 430 and the split-off portion of the emitted pulse of light. For example, the frequency-detection circuit 600 may produce a set of zero-crossing values 641 that represent the spectral signature of the emitted pulse of light 400, and a controller 150 may receive and store the set of zero-crossing values. The zero-crossing values for the emitted pulse of light 400 may be compared with zero-crossing values associated with a subsequently received pulse of light 410 to determine whether the spectral signature of the received pulse of light 410 matches the spectral signature of the emitted pulse of light 400. Additionally, the controller 150 may store zero-crossing values associated with the n most recently emitted pulses of light 400, where n is an integer greater than or equal to 2 (e.g., n may have a value of 2, 4, 8, 16, or 50). When a pulse of light is received, the zero-crossing values for the received pulse of light 410 may be compared with each of the zero-crossing values of then most recently emitted pulses of light 400 to determine whether the received pulse of light 410 is associated with one of the recently emitted pulses of light.

Figure 46:
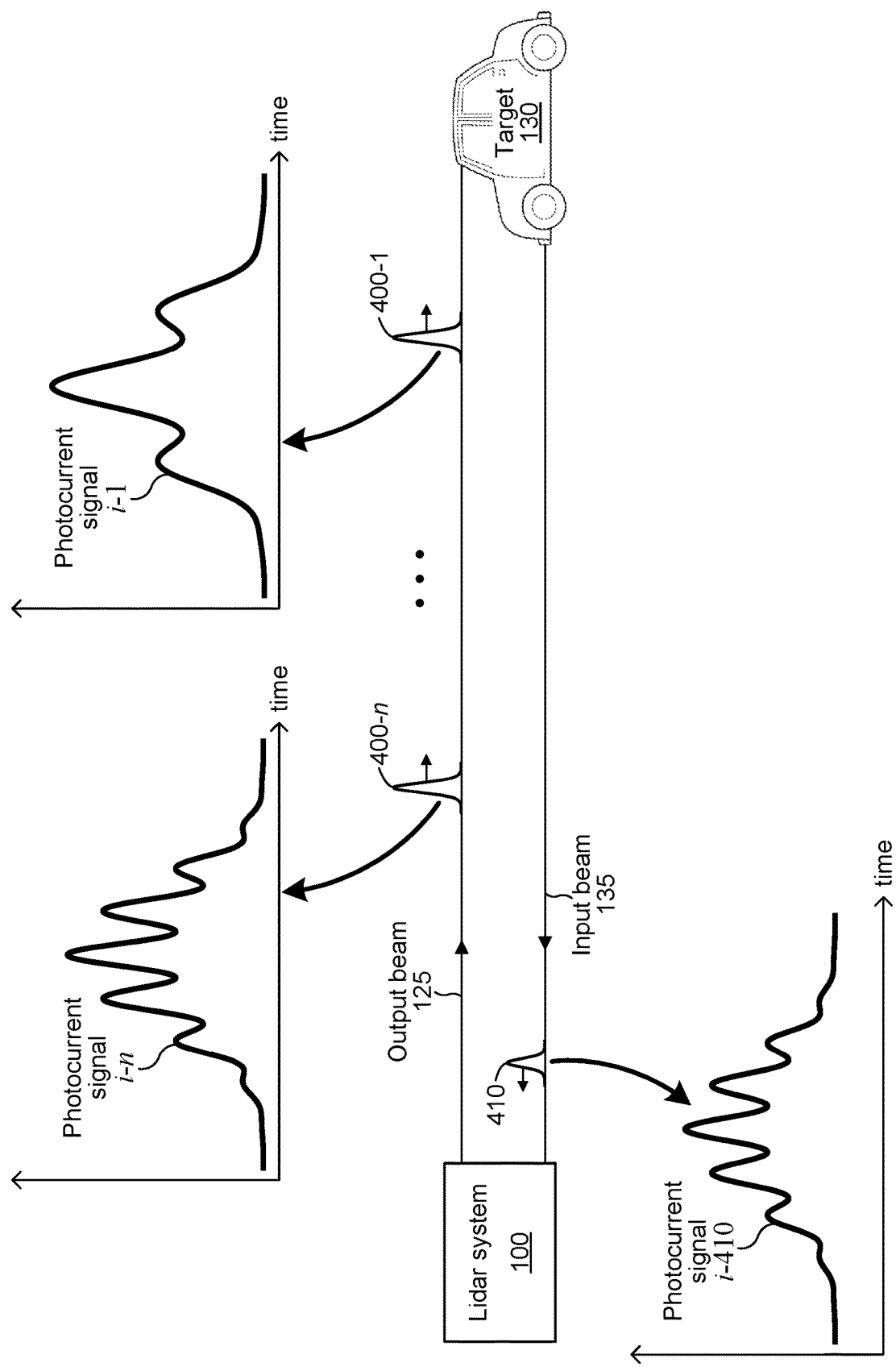
FIG. 46 illustrates an example lidar system that emits n pulses of light having n different respective spectral signatures.

FIG. 46 illustrates an example lidar system 100 that emits n pulses of light 400 having n different respective spectral signatures. In particular embodiments, a light source 110 may emit n pulses of light, where each emitted pulse of light has one of n different spectral signatures, and n is an integer greater than or equal to 2 (e.g., n may have a value of 2, 4, 8, 16, or 50). In FIG. 46, pulse 400-1 has a spectral signature that corresponds to photocurrent signal i–1, and pulse 400-n has a spectral signature that corresponds to photocurrent signal i-n. The n pulses of light may be emitted in a sequence from pulse 400-1 to pulse 400-n, and temporally adjacent pulses of light may be separated by a particular time interval (e.g., a time interval between 20 ns and 5 μs). The n pulses of light may represent the n pulses of light most recently emitted from the lidar system 100.

A controller 150 may store spectral-signature information associated with each of the n emitted pulses of light 400. For example, a processor may store zero-crossing values associated with each of the n emitted pulses of light 400. One of the n pulses of light 400 may scatter from a target 130, and a portion of the scattered light may return to the lidar system as a received pulse of light 410. In FIG. 46, pulse 400-n may scatter from the target 130, and a portion of the scattered light may return to the lidar system 100 as received pulse of light 410 with a spectral signature that corresponds to photocurrent signal i-410. A frequency-detection circuit 600 may determine the spectral signature of the received pulse of light 410 (e.g., based on determining zero-crossing values associated with the received pulse of light), and the processor may compare the spectral-signature information of the received pulse of light 410 to the stored spectral-signature information for each of the n emitted pulses of light. For example, the processor may determine n spectral-signature scores, where each score represents an amount of correlation between the spectral signature of the received pulse of light 410 and the spectral signature of one of the n emitted pulses of light 400. The processor may determine that the spectral signature of the received pulse of light 410 matches the spectral signature of a particular emitted pulse of light, based on the particular emitted pulse of light having the highest spectral-signature score (which indicates that the received pulse of light 410 is associated with the particular emitted pulse of light). If none of the n spectral-signature scores exceeds a particular threshold value (e.g., a threshold value of 80% correlation), then the processor may determine that the spectral signature of the received pulse of light 410 does not match any of the n different spectral signatures (e.g., the received pulse of light 410 may be an interfering optical signal originating from a source outside the lidar system). In FIG. 46, the spectral signature of the received pulse of light 410 (which corresponds to photocurrent signal i-410) may be determined to match the spectral signature of emitted pulse of light 400-n.

In particular embodiments, a light source 110 of a hybrid pulsed/coherent lidar system 100 may emit LO light 430 and pulses of light 400, each emitted pulse of light having a spectral signature of one or more different spectral signatures. The spectral signatures may include one spectral signature (e.g., each emitted pulse of light 400 may have the same spectral signature) or multiple different spectral signatures, and the spectral signatures may be imparted to the emitted pulses of light 400 in a deterministic manner or in a pseudo-random manner. One emitted pulse of light 400 with a particular spectral signature of the one or more different spectral signatures may scatter from a target 130, and a portion of the scattered light may return to the lidar system as a received pulse of light 410. A detector 340 may produce a photocurrent signal corresponding to coherent mixing of the LO light 430 and the received pulse of light 410, and the coherent-mixing term of the photocurrent signal may include temporal pulsations. A frequency-detection circuit 600 may determine a spectral signature of the received pulse of light 410 based on the coherent-mixing term, and a processor (e.g., controller 150) may determine whether the spectral signature of the received pulse of light 410 matches the particular spectral signature of the emitted pulse of light. For example, the spectral signature of the received pulse of light 410 may be substantially the same as or may be similar to the particular spectral signature of the emitted pulse of light. The two spectral signatures may be determined to match based on a spectral-signature score being greater than a particular threshold value, the spectral-signature score representing an amount of correlation between the two spectral signatures. In response to determining that the spectral signature of the received pulse of light 410 matches the particular spectral signature of the emitted pulse of light 400, the processor may determine that the received pulse of light 410 is associated with the emitted pulse of light 400, which indicates that the received pulse of light includes a scattered portion of light from the emitted pulse of light. Additionally or alternatively, in response to determining that the spectral signature of the received pulse of light 410 matches the particular spectral signature of the emitted pulse of light 400, the processor may determine the distance (D) from the lidar system 100 to the target 130 (e.g., based on the expression $D = c \cdot \Delta T/2$).

In particular embodiments, a light source 110 of a hybrid pulsed/coherent lidar system 100 may emit a pulse of light 400 having a particular spectral signature. The emitted pulse of light 400 may scatter from a target 130, and a portion of the scattered light may return to the lidar system as a first received pulse of light 410. Additionally, a second received pulse of light 410 may be detected by the receiver 140 of the lidar system 100, and the second received pulse of light 410 may have a second spectral signature that is different from the particular spectral signature of the emitted pulse of light 400. A frequency-detection circuit 600 may determine the second spectral signature of the second received pulse of light 410 based on a coherent-mixing term resulting from coherent mixing of the LO light and the second received pulse of light 410. A processor may determine that the second received pulse of light 410 is not associated with the emitted pulse of light 400 based on the second spectral signature of the second received pulse of light not matching the particular spectral signature of the emitted pulse of light. For example, the two spectral signatures may be determined to not match based on a spectral-signature score being less than a particular threshold value, the spectral-signature score representing an amount of correlation between the two spectral signatures.

In particular embodiments, a light source 110 of a hybrid pulsed/coherent lidar system 100 may emit a first pulse of light having a first spectral signature and a second pulse of light having a second spectral signature different from the first spectral signature. The two emitted pulses of light may scatter from one or more targets 130, and a portion of scattered light may return to the lidar system as a first received pulse of light and a second received pulse of light. A frequency-detection circuit 600 may determine a spectral signature of the second received pulse of light based on a coherent-mixing term resulting from coherent mixing of the LO light and the second received pulse of light. A processor may determine that the second received pulse of light 410 is not associated with the first emitted pulse of light based on the spectral signature of the second received pulse of light not matching the first spectral signature of the first emitted pulse of light. Additionally or alternatively, the processor may determine that the second received pulse of light 410 is associated with the second emitted pulse of light based on the spectral signature of the second received pulse of light matching the second spectral signature of the second emitted pulse of light.

In particular embodiments, a receiver 140 or a controller 150 may determine whether a received pulse of light 410 (i) is a valid received pulse of light that is associated with one of the pulses of light 400 emitted by the lidar source 110, (ii) is a valid received pulse of light that is associated with a particular emitted pulse of light 400, or (iii) is an interfering optical signal that is not associated with any of the emitted pulses of light 400. A light source 110 may emit pulses of light 400 where each emitted pulse of light 400 has a particular spectral signature of one or more different spectral signatures. The spectral signatures may be used to determine whether a received pulse of light 410 is a valid received pulse of light that is associated with an emitted pulse of light 400. A valid received pulse of light 410 may refer to a received pulse of light that includes scattered light from a pulse of light 400 that was emitted by the light source 110. For example, a light source 110 may emit pulses of light 400 that each include the same spectral signature. If a received pulse of light 410 matches that same spectral signature, then the received pulse of light may be determined to be a valid received pulse of light that is associated with an emitted pulse of light 400. As another example, a light source 110 may emit pulses of light 400 that each include one spectral signature of two or more different spectral signatures. The light source 110 may emit pulses of light 400 with spectral signatures that alternate (e.g., sequentially or in a pseudo-random manner) between two, three, four, or any other suitable number of different spectral signatures. If a received pulse of light 410 matches a particular spectral signature of one of the emitted pulses of light, then the received pulse of light may be determined to be a valid received pulse of light 410 that is associated with that emitted pulse of light 400. Emitting pulses of light 400 that have different spectral signatures may allow a frequency-detection circuit 600 and controller 150 to prevent problems with ambiguity as to which emitted pulse of light a received pulse of light 410 is associated with. A received pulse of light 410 may be unambiguously associated with an emitted pulse of light 400 based on the spectral signature of the received pulse of light 410 matching the spectral signature of the emitted pulse of light 400.

If the spectral signature of a received pulse of light 410 does not match any of one or more different spectral signatures imparted to emitted pulses of light 400, then a controller 150 may determine that the received pulse of light is invalid or is not associated with any of the emitted pulses of light. For example, the received pulse of light may be an interfering optical signal sent from a light source external to the lidar system 100. An interfering optical signal may refer to an optical signal that is sent by a light source external to the lidar system 100. For example, another lidar system may emit a pulse of light that is detected by the receiver 140, and the received pulse of light may be determined to be an interfering optical signal if it does not match any of the spectral signatures of the emitted pulses of light 400. A controller 150 may distinguish valid received pulses of light from interfering pulses by comparing the spectral signature of a received pulse of light with spectral signatures imparted to emitted pulses of light 400. If a received pulse of light is determined to be an interfering optical signal, the interfering optical signal may be discarded or ignored since it is not associated with any of the emitted pulses of light 400. A lidar system 100 may refrain from determining a time-of-arrival or determining a distance to a target 130 until a received pulse of light 410 is determined to be valid. For example, a receiver 140 or controller 150 may first verify that a received pulse of light 410 is valid before determining a time-of-arrival for the received pulse of light or determining a distance to a target 130 associated with the received pulse of light. If a received pulse of light 410 is determined to be an interfering optical signal, the receiver 140 may not perform further analysis to determine the time-of-arrival or to determine a distance to a target.

Figure 47:
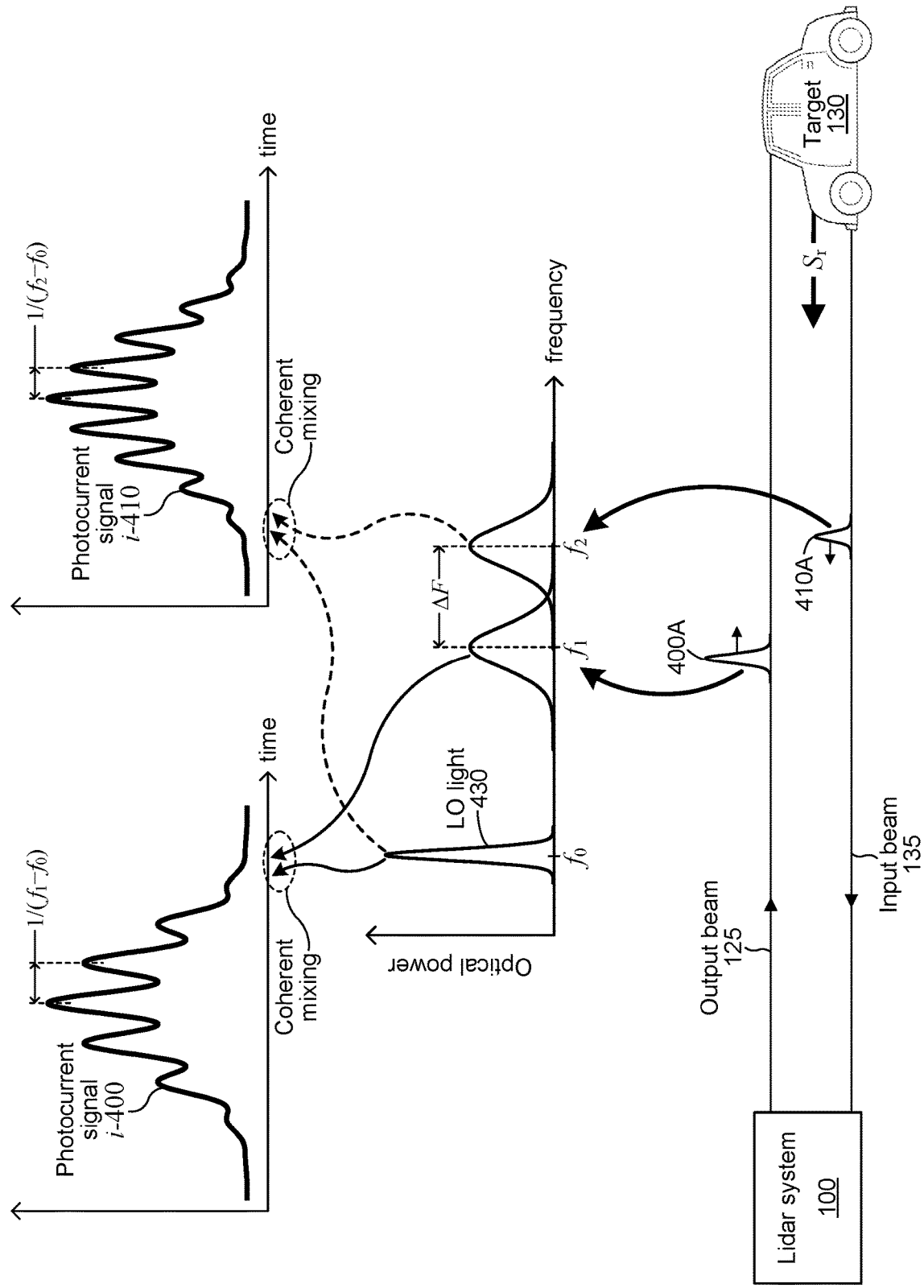
FIG. 47 illustrates an example lidar system configured to determine a relative speed ($S_r$) of a target.

FIG. 47 illustrates an example lidar system 100 configured to determine a relative speed ($S_r$) of a target 130. In particular embodiments, a processor (e.g., controller 150) of a hybrid pulsed/coherent lidar system 100 may determine a speed of a target 130 with respect to the lidar system 100 based on a frequency difference ($\Delta F$) between (i) a spectral signature of an emitted pulse of light 400A and (ii) a spectral signature of a received pulse of light 410A. The speed of the target 130 that is determined may be a radial speed of the target relative to the lidar system as measured along a line from the lidar system 100 to the target, and the radial speed may not include a transverse speed component that is directed orthogonal to the line. A radial speed of a target 130 with respect to the lidar system 100 may refer to the apparent speed of the target 130 from the perspective of the lidar system 100. For example, the radial speed of the target 130 is 10 m/s in each of these scenarios: (i) the target 130 is moving at 10 m/s towards the lidar system 100, and the lidar system 100 is standing still, (ii) the target 130 is standing still, and the lidar system 100 is moving at 10 m/s towards the target 130, (iii) the target 130 and the lidar system 100 are each moving at 5 m/s towards one another, and (iv) the target 130 is moving at 10 m/s away from the lidar system 100, and the lidar system 100 is moving towards the target 130 at 20 m/s. A positive radial speed of the target 130 corresponds to a positive value for the frequency difference $\Delta F$ and corresponds to the target and lidar system 100 moving towards each other. A negative radial speed of the target 130 corresponds to a negative value for $\Delta F$ and corresponds to the target and lidar system 100 moving away from each other.

In FIG. 47, the target 130 is moving towards the lidar system 100 with a speed $S_r$, and an emitted pulse of light 400A scatters from the moving target 130 and produces a scattered pulse of light 410A that is received by the lidar system 100. The LO light 430 has a center optical frequency of $f_0$. The emitted pulse of light 400A has a center optical frequency of $f_1$, and the received pulse of light 410A has a higher center optical frequency of $f_2$ (e.g., $f_2 > f_1$). Because the target 130 is moving towards the lidar system 100, the frequency of the received pulse of light 410A is upshifted with respect to the frequency of the emitted pulse of light 400 due to the Doppler effect, and the amount of upshift is proportional to the relative speed of the target 130. If the target 130 were moving away from the lidar system 100, then the frequency of the received pulse of light 410A would be downshifted so that $f_2 < f_1$. The temporal pulsations of the photocurrent signal i-400 of the emitted pulse of light 400A have a period of $1/(f_1-f_0)$, which corresponds to a pulsation frequency of $(f_1-f_0)$. The temporal pulsations of the photocurrent signal i-410 of the received pulse of light 410A have a period of $1/(f_2-f_0)$, which corresponds to a pulsation frequency of $(f_2-f_0)$. The frequency difference $\Delta F$ between the two photocurrent signals (which may be referred to as a frequency difference between the two spectral signatures) may be expressed as $\Delta F = (f_2-f_0)-(f_1-f_0)$, or $\Delta F = f_2-f_1$. The speed of the target ($S_r$) relative to the lidar system 100 is a radial speed of the target relative to the lidar system and may be determined from the expression $S_r = \Delta F \lambda/2$, where $\lambda$ is a wavelength of the emitted pulse of light.

When an emitted pulse of light 400A is scattered from a target 130 that is moving with respect to the lidar system 100, the resulting scattered pulse of light 410A has its frequency shifted due to the Doppler effect. An emitted pulse of light with a center optical frequency off that is scattered from a target 130 moving with a speed $S_r$ (where $S_r$ is the radial speed of the target 130 relative to the lidar system 100) has its frequency shifted by $\Delta F = 2S_r/c \cdot f$, where c is the speed of light. This expression may be rewritten as $\Delta F = 2S_r/\lambda$, where $\lambda$ is the wavelength of the pulse of light. The frequency difference $\Delta F$ may be determined from the frequencies $(f_2-f_0)$ and $(f_1-f_0)$ of the respective photocurrent signals i-410 and i-400, and the relative radial speed of the target 130 may then be determined from the expression $S_r = \Delta F \lambda/2$. For example, for an emitted pulse of light 400A with a wavelength of 1550 nm, the relationship may be written as $S_r = \Delta F \times [0.775 \text{ (m/s)/MHz}]$. This expression indicates that, for an operating wavelength of 1550 nm, every 1 MHz of frequency shift corresponds to a 0.775-m/s relative speed between the lidar system 100 and the target 130. A frequency difference $\Delta F$ of +32 MHz corresponds to a target 130 moving towards the lidar system 100 with a relative speed of approximately 25 m/s (or, approximately 55 miles per hour). Similarly, a frequency difference of −32 MHz corresponds to the target 130 moving away from the lidar system at a speed of 25 m/s.

Figure 48:
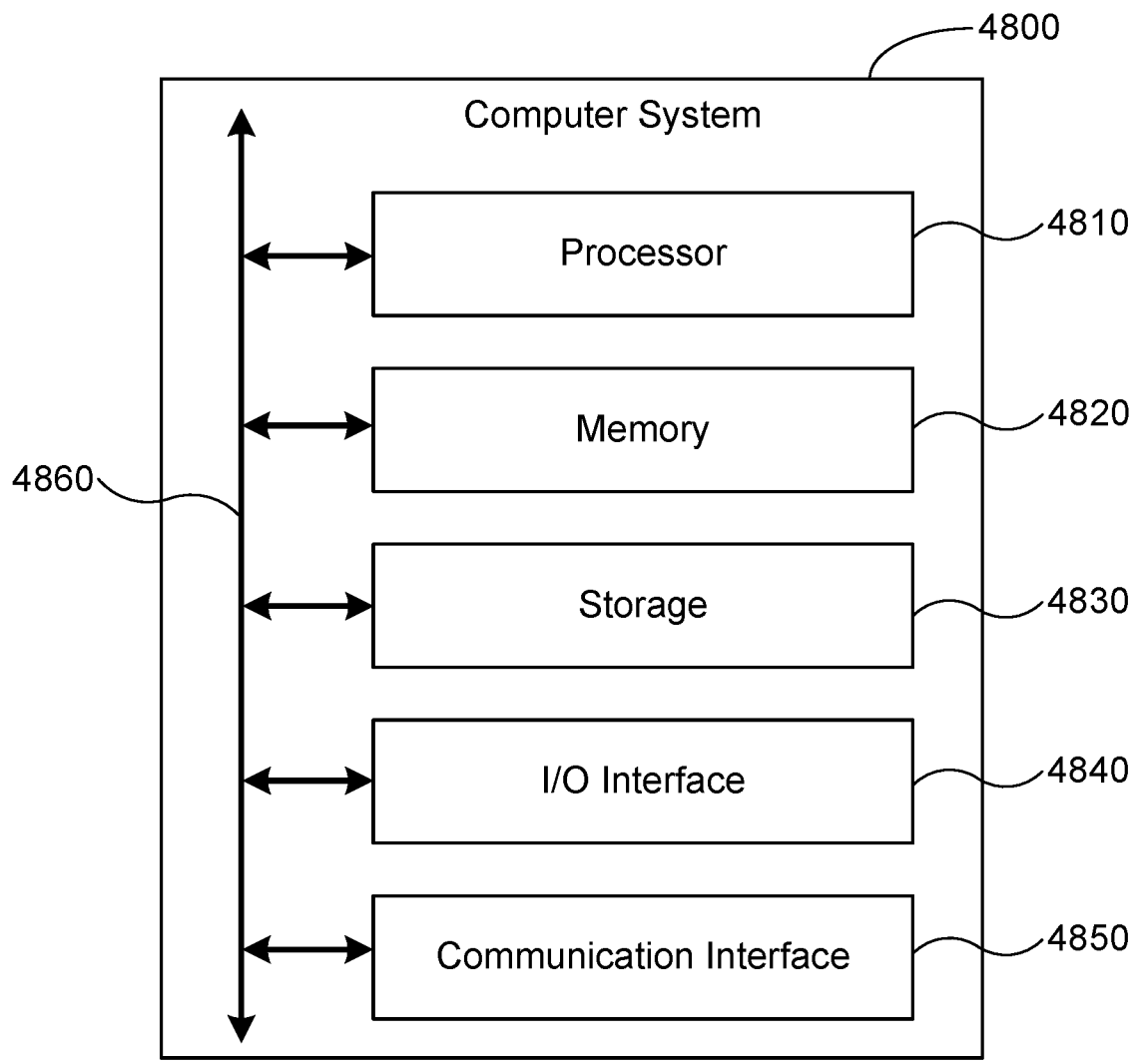
FIG. 48 illustrates an example computer system.

FIG. 48 illustrates an example computer system 4800. In particular embodiments, one or more computer systems 4800 may perform one or more steps of one or more methods described or illustrated herein. In particular embodiments, one or more computer systems 4800 may provide functionality described or illustrated herein. In particular embodiments, software running on one or more computer systems 4800 may perform one or more steps of one or more methods described or illustrated herein or may provide functionality described or illustrated herein. Particular embodiments may include one or more portions of one or more computer systems 4800. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 4800 may take any suitable physical form. As an example, computer system 4800 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 4800 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 4800 may include one or more computer systems 4800; be unitary or distributed; span multiple locations; span multiple machines; span multiple data centers; or reside in a cloud, which may include one or more cloud components in one or more networks. Where appropriate, one or more computer systems 4800 may perform without substantial spatial or temporal limitation one or more steps of one or more methods described or illustrated herein. As an example, one or more computer systems 4800 may perform in real time or in batch mode one or more steps of one or more methods described or illustrated herein. One or more computer systems 4800 may perform at different times or at different locations one or more steps of one or more methods described or illustrated herein, where appropriate.

As illustrated in the example of FIG. 48, computer system 4800 may include a processor 4810, memory 4820, storage 4830, an input/output (I/O) interface 4840, a communication interface 4850, or a bus 4860. Computer system 4800 may include any suitable number of any suitable components in any suitable arrangement.

In particular embodiments, processor 4810 may include hardware for executing instructions, such as those making up a computer program. As an example, to execute instructions, processor 4810 may retrieve (or fetch) the instructions from an internal register, an internal cache, memory 4820, or storage 4830; decode and execute them; and then write one or more results to an internal register, an internal cache, memory 4820, or storage 4830. In particular embodiments, processor 4810 may include one or more internal caches for data, instructions, or addresses. Processor 4810 may include any suitable number of any suitable internal caches, where appropriate. As an example, processor 4810 may include one or more instruction caches, one or more data caches, or one or more translation lookaside buffers (TLBs). Instructions in the instruction caches may be copies of instructions in memory 4820 or storage 4830, and the instruction caches may speed up retrieval of those instructions by processor 4810. Data in the data caches may be copies of data in memory 4820 or storage 4830 for instructions executing at processor 4810 to operate on; the results of previous instructions executed at processor 4810 for access by subsequent instructions executing at processor 4810 or for writing to memory 4820 or storage 4830; or other suitable data. The data caches may speed up read or write operations by processor 4810. The TLBs may speed up virtual-address translation for processor 4810. In particular embodiments, processor 4810 may include one or more internal registers for data, instructions, or addresses. Processor 4810 may include any suitable number of any suitable internal registers, where appropriate. Where appropriate, processor 4810 may include one or more arithmetic logic units (ALUs); may be a multi-core processor; or may include one or more processors 4810.

In particular embodiments, memory 4820 may include main memory for storing instructions for processor 4810 to execute or data for processor 4810 to operate on. As an example, computer system 4800 may load instructions from storage 4830 or another source (such as, for example, another computer system 4800) to memory 4820. Processor 4810 may then load the instructions from memory 4820 to an internal register or internal cache. To execute the instructions, processor 4810 may retrieve the instructions from the internal register or internal cache and decode them. During or after execution of the instructions, processor 4810 may write one or more results (which may be intermediate or final results) to the internal register or internal cache. Processor 4810 may then write one or more of those results to memory 4820. One or more memory buses (which may each include an address bus and a data bus) may couple processor 4810 to memory 4820. Bus 4860 may include one or more memory buses. In particular embodiments, one or more memory management units (MMUs) may reside between processor 4810 and memory 4820 and facilitate accesses to memory 4820 requested by processor 4810. In particular embodiments, memory 4820 may include random access memory (RAM). This RAM may be volatile memory, where appropriate. Where appropriate, this RAM may be dynamic RAM (DRAM) or static RAM (SRAM). Memory 4820 may include one or more memories 4820, where appropriate.

In particular embodiments, storage 4830 may include mass storage for data or instructions. As an example, storage 4830 may include a hard disk drive (HDD), a floppy disk drive, flash memory, an optical disc, a magneto-optical disc, magnetic tape, or a Universal Serial Bus (USB) drive or a combination of two or more of these. Storage 4830 may include removable or non-removable (or fixed) media, where appropriate. Storage 4830 may be internal or external to computer system 4800, where appropriate. In particular embodiments, storage 4830 may be non-volatile, solid-state memory. In particular embodiments, storage 4830 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 4830 may include one or more storage control units facilitating communication between processor 4810 and storage 4830, where appropriate. Where appropriate, storage 4830 may include one or more storages 4830.

In particular embodiments, I/O interface 4840 may include hardware, software, or both, providing one or more interfaces for communication between computer system 4800 and one or more I/O devices. Computer system 4800 may include one or more of these I/O devices, where appropriate. One or more of these I/O devices may enable communication between a person and computer system 4800. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 4840 may include one or more device or software drivers enabling processor 4810 to drive one or more of these I/O devices. I/O interface 4840 may include one or more I/O interfaces 4840, where appropriate.

In particular embodiments, communication interface 4850 may include hardware, software, or both providing one or more interfaces for communication (such as, for example, packet-based communication) between computer system 4800 and one or more other computer systems 4800 or one or more networks. As an example, communication interface 4850 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 4800 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 4800 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 4800 may communicate using fiber-optic communication based on 100 Gigabit Ethernet (100 GbE), 10 Gigabit Ethernet (10 GbE), or Synchronous Optical Networking (SONET). Computer system 4800 may include any suitable communication interface 4850 for any of these networks, where appropriate. Communication interface 4850 may include one or more communication interfaces 4850, where appropriate.

In particular embodiments, bus 4860 may include hardware, software, or both coupling components of computer system 4800 to each other. As an example, bus 4860 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 4860 may include one or more buses 4860, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 4800. As an example, computer software may include instructions configured to be executed by processor 4810. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%. The term "substantially constant" refers to a value that varies by less than a particular amount over any suitable time interval. For example, a value that is substantially constant may vary by less than or equal to 20%, 10%, 1%, 0.5%, or 0.1% over a time interval of approximately $10^4$ s, $10^3$ s, $10^2$ s, 10 s, 1 s, 100 ms, 10 ms, 1 ms, 100 µs, 10 µs, or 1 µs. The term "substantially constant" may be applied to any suitable value, such as for example, an optical power, a pulse repetition frequency, an electrical current, a wavelength, an optical or electrical frequency, or an optical or electrical phase.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
    a light source configured to:
        emit (i) local-oscillator light and (ii) pulses of light; and
        impart a spectral signature of one or more different spectral signatures to each of the emitted pulses of light, wherein the emitted pulses of light comprise an emitted pulse of light having a particular spectral signature of the one or more different spectral signatures;
    a receiver configured to detect the local-oscillator light and a received pulse of light, the received pulse of light comprising a portion of the emitted pulse of light scattered by a target located a distance from the lidar system, wherein the receiver comprises:
        a detector configured to produce a photocurrent signal corresponding to the local-oscillator light and the received pulse of light, the photocurrent signal comprising a sum of a first term, a second term, and a third term, wherein (i) the first term corresponds to an optical property of the received pulse of light, (ii) the second term corresponds to a coherent mixing of the local-oscillator light and the received pulse of light, and (iii) the third term corresponds to an optical property of the local-oscillator light;
        a pulse-detection circuit configured to determine a time-of-arrival for the received pulse of light based on the first term and the second term; and
        a frequency-detection circuit configured to determine, based on the second term of the photocurrent signal, a spectral signature of the received pulse of light; and
    a processor configured to determine whether the spectral signature of the received pulse of light matches the particular spectral signature of the emitted pulse of light.

2. The lidar system of claim 1, wherein, in response to determining that the spectral signature of the received pulse of light matches the particular spectral signature of the emitted pulse of light, the processor is further configured to determine that the received pulse of light is associated with the emitted pulse of light, wherein the received pulse of light includes a portion of light from the emitted pulse of light.

3. The lidar system of claim 1, wherein, in response to determining that the spectral signature of the received pulse of light matches the particular spectral signature of the emitted pulse of light, the processor is further configured to determine the distance from the lidar system to the target based on a time difference $\Delta T$ between (i) the time-of-arrival for the received pulse of light and (ii) a time-of-emission for the emitted pulse of light, wherein the distance (D) to the target is determined from an expression $D=c \cdot \Delta T/2$ wherein c is a speed of light.

4. The lidar system of claim 1, wherein the spectral signature of the received pulse of light matching the particular spectral signature of the emitted pulse of light corresponds to a spectral-signature score being greater than a particular threshold value, the spectral-signature score representing an amount of correlation between the spectral signature of the received pulse of light and the particular spectral signature.

5. The lidar system of claim 1, wherein:
the receiver is further configured to detect the local-oscillator light and a second received pulse of light having a second spectral signature that is different from the particular spectral signature of the emitted pulse of light; and
the processor is further configured to determine that the second received pulse of light is not associated with the emitted pulse of light based on the second spectral signature of the second received pulse of light not matching the particular spectral signature of the emitted pulse of light.

6. The lidar system of claim 5, wherein the second spectral signature of the second received pulse of light not matching the particular spectral signature of the emitted pulse of light corresponds to a spectral-signature score being less than a particular threshold value, the spectral-signature score representing an amount of correlation between the second spectral signature and the particular spectral signature.

7. The lidar system of claim 1, wherein:
the receiver is further configured to detect the local-oscillator light and a second received pulse of light having a second spectral signature that is different from the particular spectral signature of the emitted pulse of light; and
the processor is further configured to determine that the second received pulse of light is associated with another one of the emitted pulses of light based on the second spectral signature of the second received pulse of light matching a spectral signature of the another one of the emitted pulses of light.

8. The lidar system of claim 1, wherein:
the receiver is further configured to detect the local-oscillator light and a second received pulse of light having a second spectral signature that is different from each of the one or more spectral signatures of the emitted pulses of light; and
the processor is further configured to determine that the second received pulse of light is not associated with any of the emitted pulses of light based on the second spectral signature of the second received pulse of light not matching any of the one or more spectral signatures.

9. The lidar system of claim 8, wherein, in response to determining that the second received pulse of light is not associated with any of the emitted pulses of light, the processor is further configured to discard or ignore the second received pulse of light.

10. The lidar system of claim 1, wherein determining whether the spectral signature of the received pulse of light matches the particular spectral signature of the emitted pulse of light comprises determining a spectral-signature score that represents an amount of correlation between the spectral signature of the received pulse of light and the particular spectral signature.

11. The lidar system of claim 10, wherein determining whether the spectral signature of the received pulse of light matches the particular spectral signature of the emitted pulse of light further comprises:

comparing the spectral signature of the received pulse of light to the particular spectral signature of the emitted pulse of light to determine the spectral-signature score; and
determining that the spectral signature of the received pulse of light matches the particular spectral signature when the spectral-signature score exceeds a particular threshold value.

12. The lidar system of claim 1, wherein:
the emitted pulses of light comprise n emitted pulses of light, each having a different spectral signature, wherein n is an integer greater than or equal to 2, and the emitted pulse of light having the particular spectral signature is one of the n emitted pulses of light; and
the processor is further configured to:
store spectral-signature information associated with each of the n emitted pulses of light;
compare the spectral-signature information of each of the n emitted pulses of light to the spectral signature of the received pulse of light to determine n spectral-signature scores, each spectral-signature score representing an amount of correlation between the spectral-signature information of one of the n emitted pulses of light and the spectral signature of the received pulse of light; and
determine that the spectral signature of the received pulse of light matches the particular spectral signature of the emitted pulse of light based on the spectral-signature score for the emitted pulse of light having a highest value of the n spectral-signature scores.

13. The lidar system of claim 1, wherein the spectral signature of the received pulse of light matching the particular spectral signature corresponds to the spectral signature of the received pulse of light including at least a particular minimum amount of frequency components associated with the particular spectral signature.

14. The lidar system of claim 13, wherein the spectral signature of the received pulse of light matching the particular spectral signature further corresponds to the spectral signature of the received pulse of light including less than a particular maximum amount of frequency components not associated with the particular spectral signature.

15. The lidar system of claim 1, wherein each spectral signature imparted to each of the emitted pulses of light comprises a broadened optical spectrum, wherein a spectral linewidth of each emitted pulse of light is greater than a spectral linewidth of the local-oscillator light.

16. The lidar system of claim 1, wherein each spectral signature imparted to each of the emitted pulses of light comprises a shifted optical spectrum, wherein (i) an optical frequency of each emitted pulse of light and (ii) an optical frequency of the local-oscillator light are offset by a particular frequency difference.

17. The lidar system of claim 16, wherein:
the received pulse of light is offset by a frequency difference of $\Delta f$ with respect to the local-oscillator light; and
the second term of the photocurrent signal corresponding to the coherent mixing of the local-oscillator light and the received pulse of light comprises periodic temporal pulsations separated by a time interval of $1/\Delta f$.

18. The lidar system of claim 16, wherein the particular frequency difference is greater than $1/\Delta \tau$, wherein $\Delta \tau$ is a duration of the emitted pulses of light.

19. The lidar system of claim 16, wherein the particular frequency difference is between 10 MHz and 50 GHz.

20. The lidar system of claim 1, wherein the light source comprises:
- a seed laser diode configured to produce a seed optical signal and the local-oscillator light;
- a semiconductor optical amplifier (SOA) configured to amplify temporal portions of the seed optical signal to produce the emitted pulses of light; and
- an electronic driver configured to:
  - supply an electrical current to the seed laser diode to produce the seed optical signal; and
  - supply pulses of electrical current to the SOA, wherein each pulse of current causes the SOA to amplify one of the temporal portions of the seed optical signal to produce a corresponding pulse of light of the emitted pulses of light.

21. The lidar system of claim 20, wherein one or more characteristics of each spectral signature imparted to each emitted pulse of light depend on one or more of (i) the electrical current supplied to the seed laser diode and (ii) an amplitude, duration, rise time, fall time, or shape of the corresponding pulse of electrical current supplied to the SOA.

22. The lidar system of claim 20, wherein each pulse of current further causes the SOA to impart one of the spectral signatures to the amplified temporal portion of the seed optical signal so that the corresponding pulse of light includes the one of the spectral signatures.

23. The lidar system of claim 20, wherein:
- a particular pulse of electrical current supplied to the SOA by the electronic driver causes the SOA to produce the emitted pulse of light having the particular spectral signature;
- the particular spectral signature imparted to the emitted pulse of light comprises a broadened optical spectrum, wherein a spectral linewidth of the emitted pulse of light is greater than a spectral linewidth of the local-oscillator light; and
- the broadened optical spectrum of the emitted pulse of light depends on one or more of an amplitude, duration, rise time, fall time, and shape of the particular pulse of electrical current.

24. The lidar system of claim 20, wherein:
- the particular spectral signature imparted to the emitted pulse of light comprises a shifted optical spectrum, wherein (i) an optical frequency of the emitted pulse of light and (ii) an optical frequency of the local-oscillator light are offset by a frequency difference of $\Delta f$, and
- the electronic driver is further configured to change the electrical current supplied to the seed laser diode by a particular amount to cause the frequency difference of $\Delta f$ between the optical frequency of the emitted pulse of light and the optical frequency of the local-oscillator light.

25. The lidar system of claim 24, wherein the frequency difference of $\Delta f$ results from a corresponding change of $\Delta i$ in the electrical current supplied to the seed laser diode, wherein:
- the electrical current supplied to the seed laser diode is $i_1$ when the seed laser diode produces a temporal portion of the seed optical signal that is amplified to produce the emitted pulse of light; and
- after the temporal portion of the seed optical signal is produced, the electrical current supplied to the seed laser diode is changed to $i_0$, wherein $\Delta i = i_0 - i_1$.

26. The lidar system of claim 1, wherein the light source imparts the spectral signatures to the emitted pulses of light in a deterministic manner, wherein each emitted pulse of light includes a predetermined spectral signature of the one or more spectral signatures.

27. The lidar system of claim 1, wherein the light source imparts the spectral signatures to the emitted pulses of light in a pseudo-random manner, wherein each emitted pulse of light includes a non-predetermined spectral signature of the one or more spectral signatures.

28. The lidar system of claim 1, wherein:
- the receiver is further configured to detect the local-oscillator light and another portion of the emitted pulse of light, wherein the another portion is produced prior to the emitted pulse of light exiting the lidar system; and
- the frequency-detection circuit is further configured to determine, based on another second term corresponding to a coherent mixing of the local-oscillator light and the another portion of the emitted pulse of light, the particular spectral signature of the emitted pulse of light.

29. The lidar system of claim 1, wherein the second term of the photocurrent signal includes temporal pulsations corresponding to the spectral signature of the received pulse of light.

30. The lidar system of claim 29, wherein a frequency of the temporal pulsations is approximately equal to a frequency difference between an optical frequency of the received pulse of light and an optical frequency of the local-oscillator light.

31. The lidar system of claim 1, wherein:
- the frequency-detection circuit comprises one or more electronic band-pass filters, each band-pass filter having a particular pass-band center frequency; and
- the frequency-detection circuit is configured to determine the spectral signature of the received pulse of light based on determining an amplitude of each of one or more frequency components of the second term of the photocurrent signal.

32. The lidar system of claim 1, wherein the frequency-detection circuit comprises:
- a derivative circuit configured to produce a derivative signal corresponding to a derivative of the photocurrent signal; and
- a zero-crossing circuit configured to determine two or more zero crossings of the derivative signal.

33. The lidar system of claim 1, wherein the frequency-detection circuit comprises a matched filter.

34. The lidar system of claim 1, wherein the processor is further configured to determine, based on a frequency difference between (i) the particular spectral signature of the emitted pulse of light and (ii) the spectral signature of the received pulse of light, a speed of the target relative to the lidar system.

35. The lidar system of claim 34, wherein:
- the frequency difference between the spectral signatures of the received pulse of light and the emitted pulse of light comprises a frequency difference of $\Delta F$; and
- the speed of the target ($S_r$) relative to the lidar system is a radial speed of the target relative to the lidar system and is determined from an expression $S_r = \Delta F \lambda / 2$, wherein $\lambda$ is a wavelength of the emitted pulse of light.

36. The lidar system of claim 1, wherein each emitted pulse of light is coherent with a corresponding temporal portion of the local-oscillator light.

37. The lidar system of claim 1, wherein the local-oscillator light and the received pulse of light are coherently mixed together at the receiver to produce the photocurrent signal.

38. The lidar system of claim 1, wherein the photocurrent signal is proportional to $|\varepsilon_{Rx}(t)+\varepsilon_{LO}(t)|^2$, wherein:

$\Sigma_{Rx}(t)$ represents an electric field of the received pulse of light; and $\Sigma_{LO}(t)$ represents an electric field of the local-oscillator light.

39. The lidar system of claim 38, wherein:

the first term corresponds to an optical power of the received pulse of light and is represented by $|\varepsilon_{Rx}(t)|^2$;

the second term, which corresponds to the coherent mixing of the local-oscillator light and the received pulse of light, is represented by $2 \cdot |\varepsilon_{Rx}(t)| \cdot |\varepsilon_{LO}(t)| \cdot \cos[\Delta\omega(t)+\Delta\phi(t)]$, wherein:

$\Delta\omega(t)$ represents a frequency difference between the electric field of the received pulse of light and the electric field of the local-oscillator light; and $\Delta\phi(t)$ represents a phase difference between the electric field of the received pulse of light and the electric field of the local-oscillator light; and the third term corresponds to an optical power of the local-oscillator light and is represented by $[\varepsilon_{LO}(t)|^2|$.

* * * * *